United States Patent [19]

Frazier

[11] Patent Number: 5,515,480

[45] Date of Patent: May 7, 1996

[54] SYSTEM AND METHOD FOR ENHANCING GRAPHIC FEATURES PRODUCED BY MARKING ENGINES

[75] Inventor: Allen Frazier, Wichita, Kans.

[73] Assignee: DP-Tek, Inc., Wichita, Kans.

[21] Appl. No.: 260,085

[22] Filed: Jun. 15, 1994

[51] Int. Cl.$^6$ .................................................. G06K 15/00
[52] U.S. Cl. .......................................... 395/109; 395/101
[58] Field of Search ................................... 395/109, 108, 395/112, 101, 117, 128, 129, 132; 358/537, 538, 536, 534, 298; 347/186, 188, 190, 195; 346/139 R

[56] References Cited

U.S. PATENT DOCUMENTS

| | | | |
|---|---|---|---|
| 4,622,545 | 11/1986 | Atkinson | 345/91 |
| 4,965,672 | 10/1990 | Duke et al. | 358/298 |
| 5,029,108 | 7/1991 | Lung | 395/109 |
| 5,115,252 | 5/1992 | Sasaki | 358/298 |
| 5,116,150 | 5/1992 | Courtney | 400/320 |
| 5,127,752 | 7/1992 | Courtney | 400/342 |
| 5,144,338 | 9/1992 | Sakano | 358/296 |
| 5,212,742 | 5/1993 | Normile et al. | 382/166 |
| 5,250,960 | 10/1993 | Genovese | 347/120 |
| 5,396,584 | 3/1995 | Lee et al. | 395/132 |

*Primary Examiner*—Mark R. Powell
*Assistant Examiner*—Tracy M. Legree
*Attorney, Agent, or Firm*—Poms, Smith, Lande & Rose

[57] ABSTRACT

Gray scale input data, derived from continuous tone data, is transformed into pulse patterns for driving a marking engine so that a variety of marks of different sizes and shapes are formed in any given pixel region. Gray scale input data is arranged (received) as an array of pixels, in the native engine resolution, including multi-bit per pixel gray level values. A pixel in the array is analyzed in a transformation (window) to determine the pulse pattern output based on the gray level value of the current pixel and on the gray level values of adjacent vertical and horizontal pixels. The pulse pattern output for driving the marking engine in the current pixel location is adjusted by the transformation to produce sub-pixel sized marks of various shapes, sizes, positions, and orientations that, in combination with neighboring marks so produced, provides for the flexible production of marking patterns that contain a number of gray scale levels substantially exceeding the number of gray scale levels contained in the input data, and that enhance the simulation of graphic features produced. The transformation flexibly selects from an optimized subset of pulse patterns available to produce the most accurately calibrated tones and features based on the input data. Hence, gray scale input data is transformed into a pulse pattern output for driving a marking engine.

19 Claims, 5 Drawing Sheets

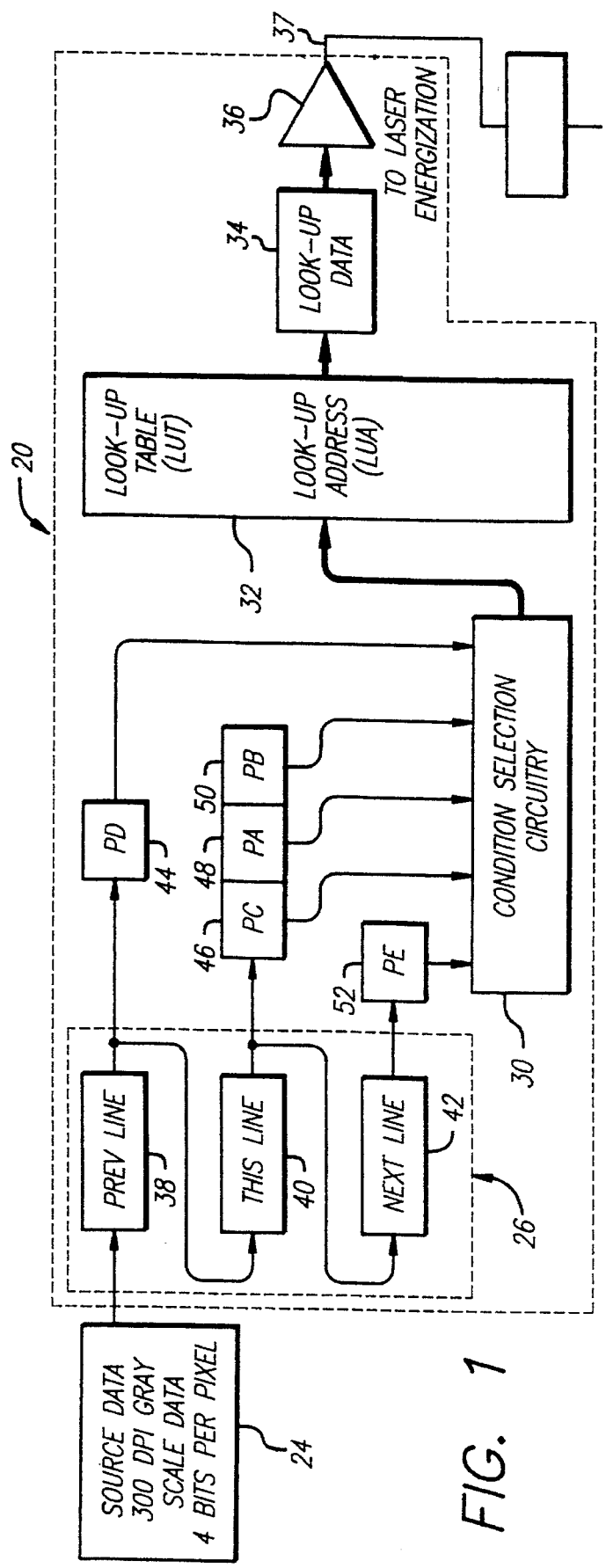
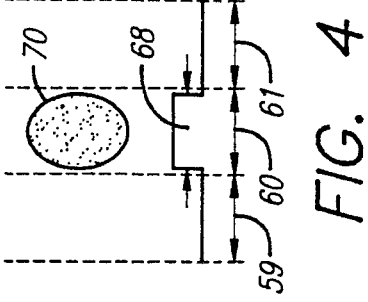
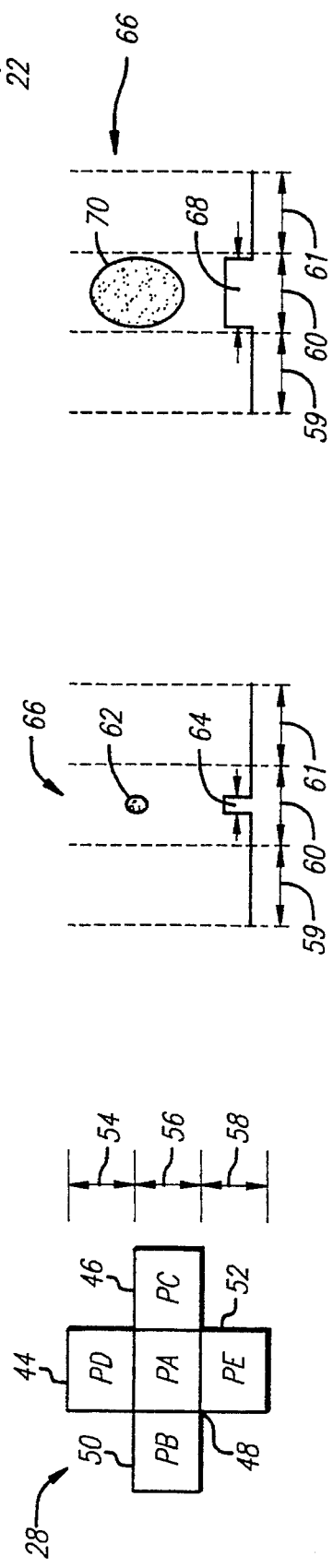
FIG. 1
FIG. 2
FIG. 3
FIG. 4

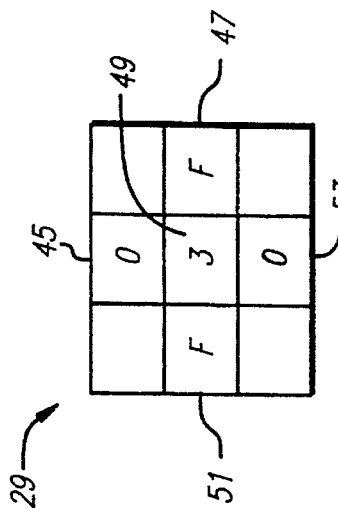
FIG. 10
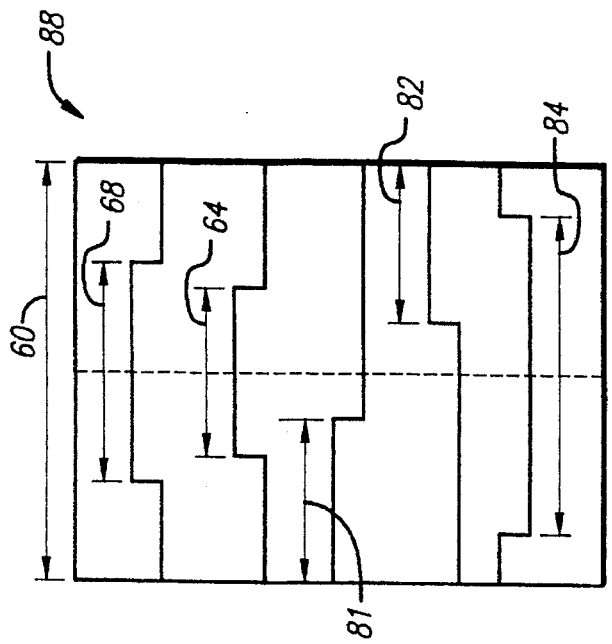
FIG. 9
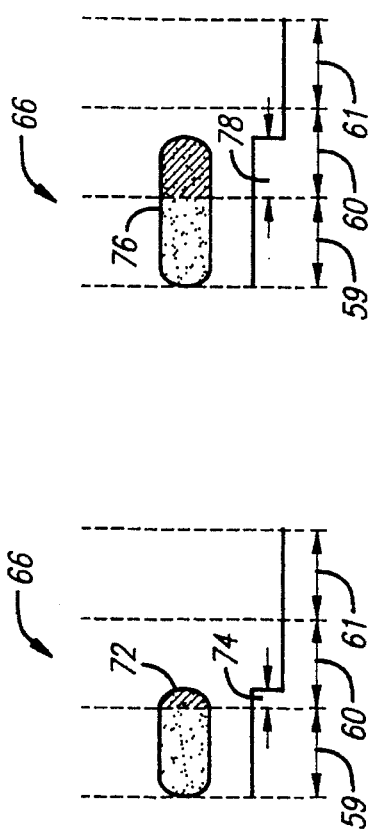
FIG. 5
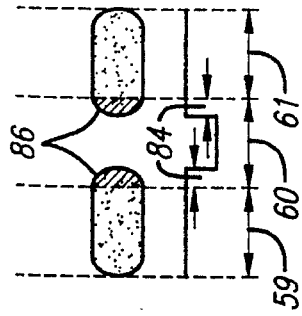
FIG. 6
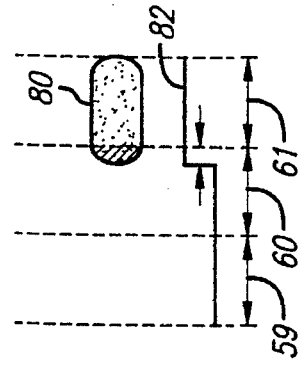
FIG. 8
FIG. 7

SYSTEM AND METHOD FOR ENHANCING GRAPHIC FEATURES PRODUCED BY MARKING ENGINES

BACKGROUND OF THE INVENTION

1. Field of the Invention

The present invention relates to systems for providing graphic output, and more particularly, to a method and system for enhancing the quality of graphic information producible by a monotone output device.

2. Description of the Related Art

Conventionally, graphic information in the form of images or photographs has been produced in a monotone medium using techniques known generally as "halftones." In a halftone process, a photograph or similar image having continuous tones or gray levels is converted to various levels of gray using either patterns of monotone (single color) dots of various sizes, or using lines of various widths. For instance, halftone techniques have been used to develop plates for printing presses that would print various levels of gray using only black ink. Such graphic information may also include characters for providing text or similar output.

More recently, electronic displays have the ability to display gray levels by varying the intensity of a dot, pel, or pixel produced in the display. However, most electronic printers, or marking engines, still provide only monotone output. Marking engines, such as laser printers, LED printers, and the like, must therefore employ halftone techniques to simulate levels of gray. Monotone marking engines simulate levels of gray using clusters of dots or pixels, so that pixel locations in the cluster are marked (black or "on") or left blank (white or "off") in various patterns. The clusters are often referred to as halftone cells. Relevant features of halftone schemes include (1) screen geometry; (2) gray tones; (3) image detail; and (4) reproduction. The remainder of this discussion focuses primarily on limitations of producing gray tone and image detail features, since these features have the greatest impact on the ability of a monotone marking engine to produce quality graphics.

In a typical application, a monotone marking engine is utilized having a given native resolution. For example, standard laser printers have specified native resolutions of 300 or 600 dpi (dots per inch). The centers of the marking regions, or pixel locations, for a 300 dpi device are located $\frac{1}{300}$ of an inch apart in both the horizontal and vertical directions of the paper. Therefore, the native resolution of a marking engine may be represented by an orthogonal array of pixel locations. The two dimensional size of the array depends on the total paper size or output area of the graphic image.

A gray level, shade or tone value can be assigned to each pixel location in the array. This value is used in electronic displays, such as video displays or cathode ray tubes (CRTs), to control the intensity of the corresponding pixel. A conventional way of assigning gray values is to control or set the value of a multi-bit binary number for each pixel in the array. Such an array may be referred to variously as gray scale data, a gray scale array, an image bit-map, or video raster data.

Ordinarily, the availability of gray scale data, alone, does not allow a marking engine to simulate the gray levels contained in the data. The monotone engine cannot vary the intensity at each pixel location. It either marks the entire pixel region or leaves it blank. In order to simulate gray levels, the monotone marking engine must use pixel clusters, or halftone cells, formed of marked and blank pixels to provide a number of gray level patterns. The number of patterns available in a halftone scheme theoretically corresponds directly to the size of the pixel cluster. However, inherent properties of most marking engines reduce or limit the number of gray levels available in actual practice, as will be described below. The use of halftone cells undesirably reduces the resolution of an output image, since single pixel intensity values are essentially mapped into a cluster of pixels in corresponding patterns of black and white.

Assuming a monotone marking engine has a native resolution and is able to produce only fixed size pixels, its ability to provide good quality printing of graphic features is relatively limited. The number of gray levels available theoretically increases with the size of the pixel cluster chosen as the basis of the halftone cell, but the number of lines printed in the halftone scheme (the image resolution) undesirably decreases as the size of the pixel cluster (halftone cell) increases. For example, choosing a 106 line per inch halftone screen with a 300 dpi marking engine results in the production of only 9 gray levels. Using a 53 line per inch screen, 33 gray levels are theoretically available, but the image detail, or clarity, is undesirably reduced to approximately $\frac{1}{6}$ the native engine resolution.

Smooth and continuous gray scale images do not depend simply on the number gray levels theoretically available. A more important consideration is that the correct shades, or gray levels, be produced. An image using fewer, but more appropriate shades looks better than an image using more, but inappropriate shades. A related problem is that, for most marking engines, the number of distinguishable gray levels in a conventional halftone scheme is significantly less than the theoretically available number of gray levels.

Theoretically available gray levels actually appear darker due to marking engine characteristics, causing several shades to become indistinguishable to viewers. Most laser printer marking engines are pulsed, or energized, during a full pixel period to produce marks or spots that can be 2-3 times as large as the specified pixel region. This overcoverage corrupts the halftone pattern since pixels that are supposed to be blank get fully or partially marked by neighboring marked pixels. Many of the theoretically available gray levels actually appear darker due to this phenomenon, causing several shades to become indistinguishable to viewers. This means that the actual number of useful gray levels is substantially smaller than the number of theoretically available gray levels. For example, with a 300 dpi engine using a conventional 53 line per inch halftone screen, in practice a range of about 10 gray levels are usable from among the 33 gray levels which are theoretically available.

Another problem with providing distinguishable gray levels is that viewers are not evenly sensitive to shades of gray ranging from light to dark. If a gray scale is provided by linearly increasing the number of marked pixels, viewers will not resolve gray levels evenly along the scale. This results in poor production of graphic features.

To produce a given image or graphic output, the best set of gray levels to be used are those that will appear linear or smooth to a viewer. The process of selecting the best set of gray levels is called gamma correction. A gamma corrected image appears to be a more true reproduction to the viewer and is also more pleasant to look at. Gamma correction also attempts to provide smooth gray tones without creating distracting background patterns.

One approach to gamma correction has been to reduce the pulse width that drives the imaging laser in a laser printer, using a 4 bit value to create a dot or mark that is smaller than a full size pixel (i.e., a sub-pixel mark), in the hope of providing a greater number of distinguishable gray levels. For example, several implementations have divided the pixel period of the laser by 16, and have attempted to provide 16 different dot sizes or marks, with 0 being white, for any given pixel region. Usually, such dots are centered on the pixel region location. In such schemes, the laser is turned on by a pulse having a duration between 9/15 and 15/15 of the pixel period, the pulse being centered in the pixel period interval. If gray scale data is provided with 4 bits per pixel gray values, 16 different shades can be specified for each pixel. The size of the subpixel mark at each pixel region is controlled by such pulses in an attempt to simulate gray levels.

However, most marking engines will not create a mark or dot when the centered pulse width is less than a certain duration, such as 7/15 or 8/15 of the pixel period. This means that only the darker shades, employing larger dots, are actually provided. Furthermore, these darker shades are usually not gamma corrected properly, since the gamma correction process often erroneously assumes that the lighter, unproduced shades actually exist. Many of these reduced driving interval schemes also fail to account for the loss of distinguishable gray levels due to marking overlap produced in the darker gray shades.

Preserving image detail is also difficult due to the above-described difficulties of producing marks precisely using a monotone marking engine. The problems associated with both over-marking (when long pulses drive the engine) and non-marking (when very small pulses drive the engine) lead to a reduced ability to faithfully produce image detail encoded in the bit-map source (raster, or gray level source) data. For example, lines running at angles across the image may not be accurately produced by the marking engine. Similarly, the features of text characters, encoded graphically in the bit-map, may be distorted when produced by the marking engine.

Hence, the difficulties of providing graphic features including appropriately gamma corrected gray levels and correct image details have not been adequately solved for monotone marking engines.

From the foregoing discussion, it is evident that the art has failed to provide a means for controlling existing marking engines to produce relatively smooth gray tones in a halftone image while preserving image detail and providing for proper image production. This failure stems partially from an inferior ability to produce relatively small, precisely sized marks for use in generating halftone patterns, and also from the improper use of gamma correction techniques for smoothing gray levels. Similarly, the art has failed to provide for the enhanced production of graphic features, including halftone, text or other image information, by marking engines.

SUMMARY OF THE INVENTION

Accordingly, the present invention provides a significant increase in the ability of a monotone output device, such as a laser printer or similar marking engine, to produce high quality gray scale, halftone, or shaded images while enhancing graphic features. This is accomplished by transforming patterns detected in multi-bit per pixel gray scale input data, arranged in the native resolution of the marking engine, into relatively precise driving pulses, or marking pulse patterns causing the marking engine to responsively make marks of various sizes, shapes, and positions in a pixel region of an output image. The pulses, or pulse patterns, are generated at intervals with a predetermined granularity; that is, at intervals which are a given fractional duration of the period needed to produce a mark in the entire pixel region. The pulses are also provided in various positions within a pixel marking period. This produces various marks which may be smaller than the size of a nominal pixel region, larger than the size of a nominal pixel region, located in different areas of a pixel region, or overlapped in regions between nominal pixel regions.

The marks of various sizes, shapes, and positions are formed in each pixel region so that, for many types of graphic features which may include shadows or edges, contiguous marks, spots, or mark clusters, are formed to optimally simulate the relevant graphic features.

Predetermined graphic features are detected in the source data from multi-bit value patterns occurring in a plurality of pixels viewed through a feature detection window. Optimized pulse patterns, corresponding to detected graphic features, are provided for driving the marking engine to produce optimized marks or mark clusters for simulating the detected graphic feature. A look-up table containing pulse codes may be indexed using detected feature patterns to provide optimized pulse patterns to the marking engine. Optimized pulse code values are preferably selected during a calibration procedure for the given type of marking engine.

The present enhancement system generates or controls pulses with finer precision than would otherwise be available from the multi-bit gray scale input data. The resulting production and arrangement of various optimized marks provides for a substantial increase in the number of gray levels, shades, or tones that can be printed, or otherwise produced by the marking engine. The best set of shades for producing images is selected from among an increased number of shade levels available for the given marking engine, thus significantly increasing the quality of the produced image.

The pulse pattern is generated for a given pixel location or marking region by analyzing or decoding, in a transformation, the gray value of a current pixel and the gray value for a plurality of adjacent pixels. Preferably, four adjacent pixels in an orthogonal grid, or cross, are compared. This grid comprises the feature detection window. The feature detection window thus comprises two vertically adjacent pixels and two horizontally adjacent pixels, centered respectively around the current pixel location. Such a window provides five times the amount of multi-bit gray value information compared with analyzing only the current pixel location value.

The present transformation provides increased precision pulse patterns that cause the marking engine to produce many more gray levels, shade patterns, or tones than it would otherwise be able to provide from the multi-bit per pixel input data. This is possible because the marks made in any given pixel region are produced based on the gray values of the adjacent pixels in addition to its own gray value. Hence, the present invention increases the number of available gray levels, and provides near-optimum gamma correction, by relying on gray level information from surrounding pixels to select from an optimized set of pulses for controlling the marking engine.

Marks are made in each pixel region or marking region by the marking engine in synchronization with pixel clock having a given duration or pixel period. The pixel period is divided into a number of smaller intervals allowing the marking engine to be driven by pulses of fractional duration with respect to a full pixel period. For example, the pixel period may be divided into 64 smaller pulse intervals, corresponding to pulse granularity of 64. Also, various patterns of these shorter duration pulses may be generated during any pixel period. Such pulse patterns produce a variety of different marks in a pixel region. Gray values from the orthogonally adjacent pixels are determined and provide a context for the pulse pattern for driving the engine during a given pixel period. By controlling the pulse patterns, marks in a variety of optimal configurations are produced.

For example, signals may be (1) centered in the pixel region; (2) left justified in the pixel region: (3) right justified in the pixel region; or (4) "split" in the pixel region (both left and right justified). These marks are respectively produced by marking pulses substantially at the (1) beginning of the pixel period; (2) end of the pixel period; (3) middle of the pixel period; or (4) beginning and end of the pixel period. The pulse duration for any of these marks may be any fractional pixel period value based on the predetermined granularity. In the left or right justified pixel regions, very small marks can be made by very short duration driving pulses. Also, these marks may be made of various sizes, shapes, lengths, and heights. Two or more pixel signals may be made in a pixel region. Preferably, two pixel signals are symmetrically split on the right and left of the pixel region center when more than one pixel mark is to be produced in a pixel region.

The signals produced in a given pixel region are coupled with the pulses produced in adjacent pixel regions because of the overlapping nature of charges produced by the marking engine. Usually, pulsing or energizing the marking engine causes a laser or energizing device to create an electrostatic charge region on paper, which is substantially circular in shape. The charge regions exceed the boundaries of a given pixel region, overlapping with adjacent pixel regions. The toner is attracted to charged regions of the paper based on the charge density in any given region. Consequently, marks are made on the paper by the marking engine wherever the charge density exceeds a given threshold.

Ordinarily the charge density in the overlapping regions is not sufficiently pulse controlled to provide for fine placement of marks in the various pixel regions. The failure to control the placement of marks in pixel overlap regions degrades the ability of a monotone marking engine to produce quality graphic features, such as halftone features. The present invention accordingly provides for much finer pulse control of the marking engine which responsively forms a variety of precise marks suited for enhanced quality halftone image production.

Accordingly, in one broad aspect an enhancement system accepts gray scale source data as input and transforms it into optimized pulses for driving a monotone marking engine to simulate graphic features encoded in the source data. The enhancement circuit provides the marking engine with the ability to produce high quality halftone images that it would otherwise not be able to produce from the gray scale source data. The enhancement circuit uses gray value information from a plurality of pixels in a feature detection window in order to generate a precisely controlled pulse pattern for each pixel in the image. Condition selection decoding circuitry detects gray value patterns in the feature detection window and generates an address value that corresponds to the given window pattern. A combination of logic and a look-up table is used to convert, transform, or map each window pattern from the feature detection window into an optimized pulse output pattern for driving the marking engine. The optimized pulse output patterns provide the marking engine with the ability to produce optimized marks or mark clusters that include marks of various sizes, shapes, and configurations, many of which would not be producible without the use of the enhancement circuitry. Thus, the principles of the present method and system provide for the enhanced productions of graphic features, including halftone, text, or other graphic features, by a marking engine.

Other objects, features and advantages of the invention will become apparent from a consideration of the following detailed description of the invention and from the accompanying drawings.

BRIEF DESCRIPTION OF THE DRAWINGS

FIG. 1 illustrates a block diagram of an enhancement system in accord with the principles of the present invention;

FIG. 2 illustrates a feature detection window arranged on three/scan lines;

FIG. 3–8 illustrate representative energizing pulses and corresponding marking characteristics;

FIG. 9 illustrates representative energizing pulses of various position and durations disposed in a pixel period;

FIG. 10 illustrates a particular set of values for pixels in the feature detection window;

DETAILED DESCRIPTION OF THE PREFERRED EMBODIMENT

Figure 11A:
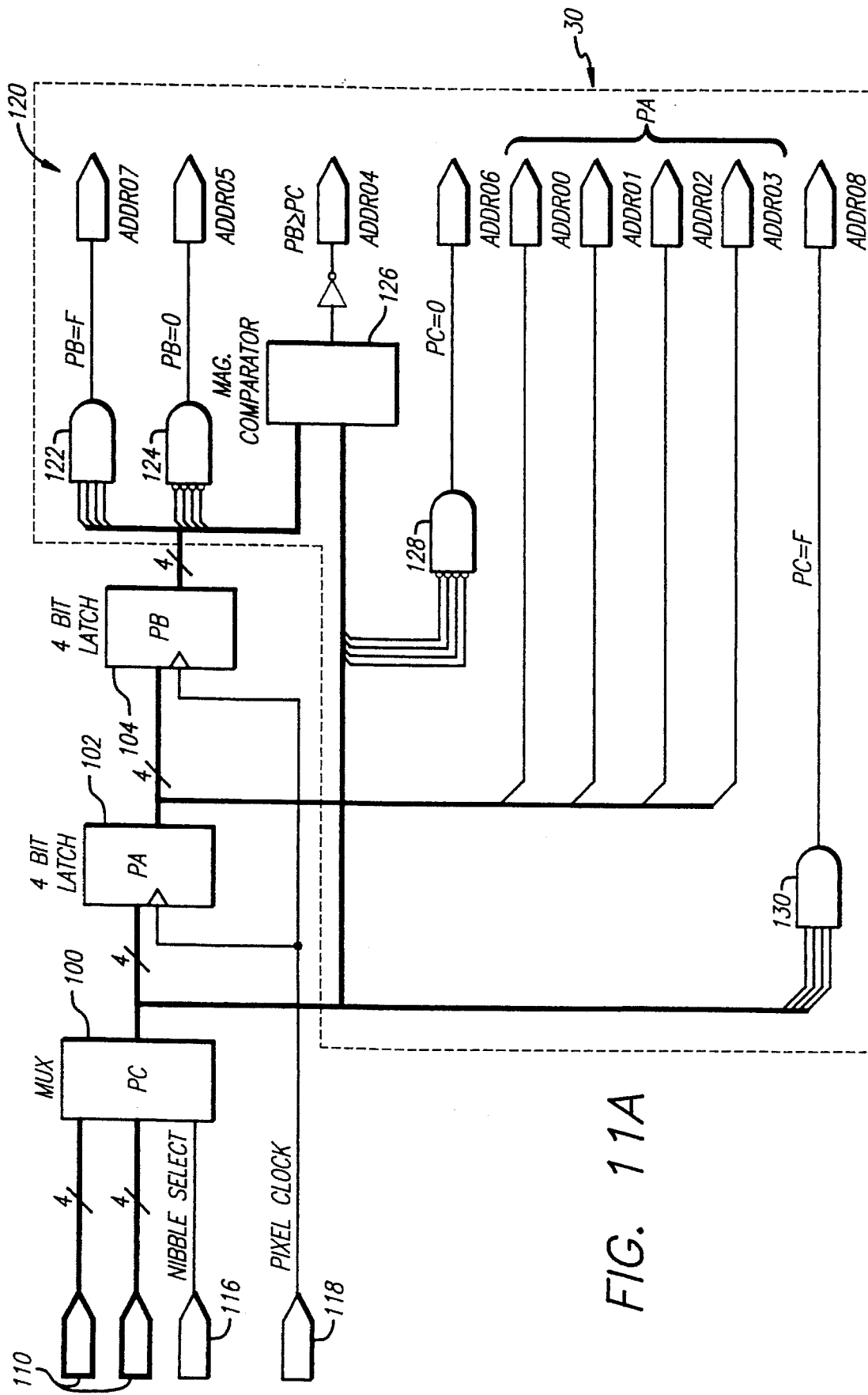
FIGS. 11A and 11B illustrate preferable circuit details for implementing the feature detection window and the combination selection circuitry of FIG. 1.

As illustrated in FIG. 1, the present invention comprises a graphic feature enhancement method and system 20 for enhancing graphic features output from a marking engine 22. A source of gray scale data 24, representing a graphic image as an array of pixels in the native resolution of marking engine 22, is provided as input to the enhancement system 20. The source data 24 may be variously referred to as bit-map, video raster, or gray level data, as well. Feature enhancement system 20, illustrated as a block diagram, converts or transforms the gray scale source data 24 into a sequence of pulse patterns for driving marking engine 22.

The enhancement system 20 is operatively inserted between an existing print controller and the marking engine 22. The source data 24 is provided as halftone data by the print controller. In a conventional application, the halftone data is provided directly to the marking engine 22, attempting to produce the encoded halftone marks on paper in accord with a predetermined halftone scheme. However, the energization pulses so provided are not finely controlled and optimized (calibrated) in accord with the principles of the present invention. Therefore, the problems caused by undesired mark overlap and non-marking degrade the quality of the image actually produced. Also, gamma correction for the particular marking engine may not be optimal. This is true for any given native resolution of the halftone source data 24 and marking engine 22.

For example, a conventional application could include a marking engine 22 with a relatively high native resolution of 2000 dpi (which is also relatively expensive and uncommon) producing an image from halftone source data provided at a 2000 dpi resolution. The output image quality would nonetheless be degraded due to undesired marking overlap and non-marking as well as sub-optimal gamma correction. However, since the native resolution is so high, even the degraded image quality would be quite good. The use of the present enhancement system 20 would significantly increase the image quality. More importantly, the use of the present enhancement system 20 with marking engines 22 having 300 dpi native resolution (by far the most commonly available) provides halftone image quality substantially comparable to 2000 dpi marking engines which do not utilize the present invention.

The enhancement system 20 substantially increases the number of gray levels producible by marking engine 22 and provides for the selection of the best set of gray levels for use with the particular engine from among the increased number of gray levels available. Consequently, the present invention provides for a substantial increase in the ability of the marking engine 22 to produce high quality halftone images from a given input of gray scale source data 24. For example, a 300 dpi native resolution laser printer is capable of producing halftone images with a quality substantially comparable to some 2000 dpi printers by use of the enhancement method and system 20 of the present invention. Other graphic features, including image details are also enhanced.

The marking engine 22 is preferably a laser printer marking engine having a native resolution such as 300 dpi or 600 dpi. The native resolution refers to the bit map, or arrangement, of points, pixels, or pels that the marking engine can produce. For example, a 300 dpi printer produces a plurality of pixels arranged in lines on a page, the pixels having a substantially circular shape and being centered 1/300 (1/native resolution) of an inch apart in both the vertical and horizontal directions. The marking engine 22 may alternatively comprise LED printers, or other printers or copiers that energize a charge producing device.

The gray scale source data, or image bit-map 24 represents a halftone or other graphic image by storing gray level, tone, or shade values for each pixel (output point) in the image. The source data 24 is preferably provided in the native resolution of the marking engine 22. The gray level values are preferably encoded in binary form using a plurality of bits "n". Hence, the gray scale source data 24 comprises multi-bit per pixel gray level values arranged in the native resolution of the marking engine 22. For purposes of the present disclosure it is assumed that gray scale source data 24 represents a plurality of pixels at a native resolution of 300 dpi (the same as the marking engine 22) with a 4-bit binary gray level value assigned to each pixel in the array. The use of 4-bit binary gray level values provides for one of sixteen ($2^4=16$) different gray levels, or intensities, to be encoded for each pixel in the array. Since marking engine 22 is a monotone output device, it cannot produce 16 intensities, or gray levels, at a single pixel location. It can only produce marks of a single color, usually black, at any given location on the paper. Therefore, a halftone scheme is used to simulate the desired gray levels.

Figure 12:
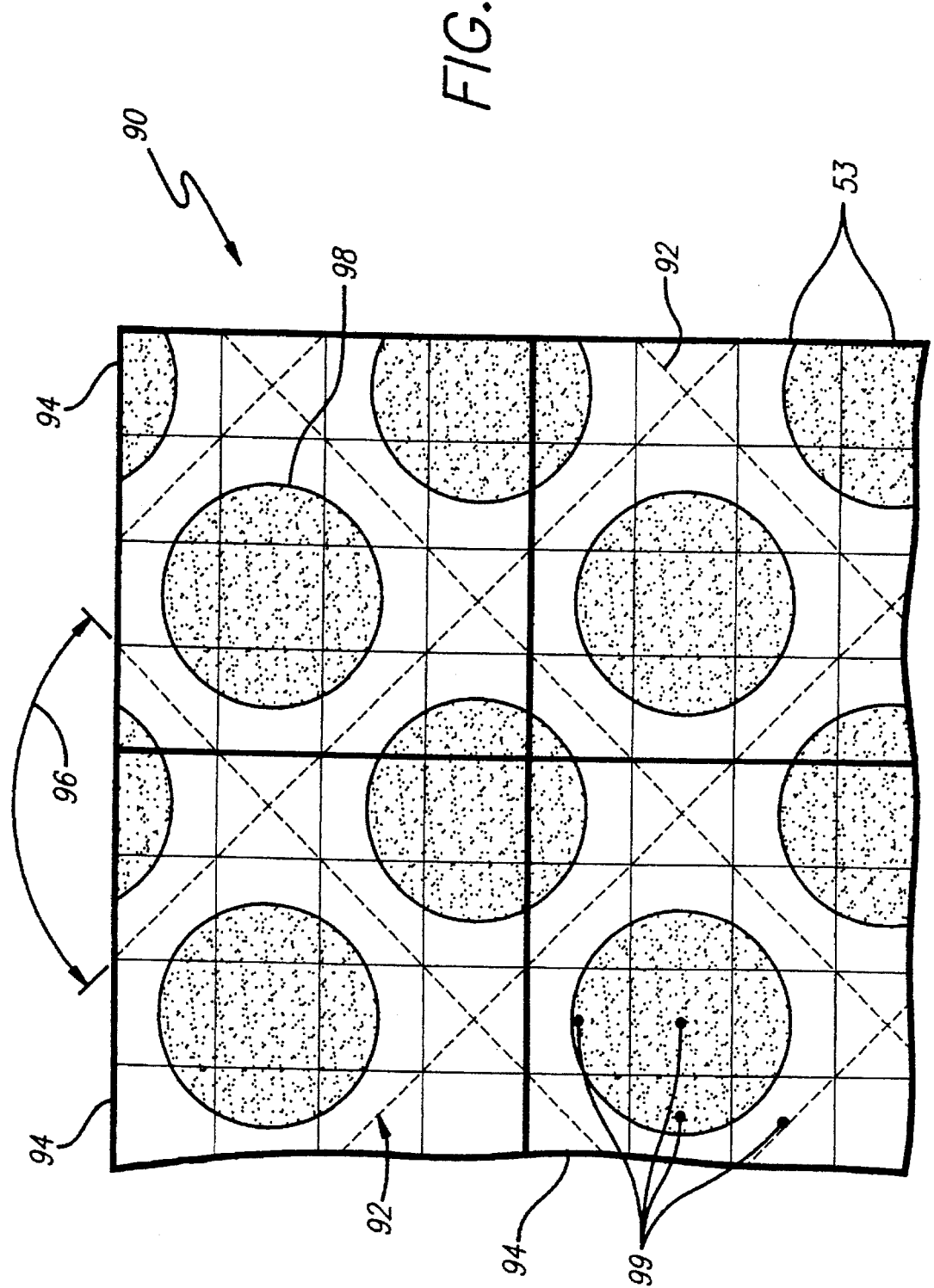
FIG. 12 illustrates an example of one preferred halftone screen geometry for simulating gray level images in a monotone medium, showing an idealized representation of one particular halftone spot pattern in a localized region of an output image.

As illustrated in FIG. 12, a preferable halftone screen geometry 90 includes of a plurality of halftone cells 92 which are shown bordered by dashed lines and a plurality of tone regions 94 which are shown bordered by heavy black lines. The halftone cells 92 are provided at a screen angle 96 of forty-five degrees (45°) with respect to each other. The halftone cells 92 are illustrated by dashed lines in the figure, and form diamond shaped regions. Idealized, halftone marks 98 are illustrated as large dots or circular marked regions within each halftone cell 92 for purposes of illustration. In practice, the size and shape of the halftone marks 98 within the respective halftone cells 92 are varied to simulate various graphic features. Each tone region 94 preferably comprises sixteen pixel locations 99, corresponding to a 106 lines per inch halftone screen. The tone region 94 is shown in large, bold, solid-bordered boxes. The pixels 99 are shown in the figure by the small, solid-bordered boxes. Each row of boxes represents a physical scan line 53 of the marking engine 22 on which pixels are produced. Each tone region 94 includes fractional portions of seven different halftone cells 92, with the summation of these fractional portions adding up to two full halftone cell 92 regions within tone region 94.

Halftone marks 98 are illustrated as large dots or circular marked regions within each halftone cell 92 only for purposes of illustration. In practice the halftone marks 98 are produced in various sizes and shapes to simulate various shades of gray and other image features for producing a halftone image. The various shades of gray may be characterized as light grays, or highlights, medium grays, or midtones, and dark grays, or shade tones. The size and shape of halftone marks 98 are accurately controlled by the present enhancement system 20 to provide the near-optimum simulated gray scale and image detail for producing an image.

For example, light grays, or highlight tones, are simulated by relatively small halftone marks 98, preferably in the shape of dots or circles, centered in the diamond of the halftone cell 92. Medium grays, or midtones, are simulated by larger halftone marks 98, which are preferably relatively large circular dots (but which may approach a square shape, in some implementations, at roughly the middle of the midtone scale). Dark grays, or shade tones, are preferably provided by expanding the halftone marks 98 in the adjacent halftone cells 92 so that only circular regions, centered on the points of the diamonds, are left blank. As the diamond shaped halftone cell 92 is fully filled by halftone mark 98, these blank circles shrink down to zero diameter, eventually producing only black in the associated tone regions 94.

The output image is produced by energizing the marking engine 22 as a number of scan lines 53 on a page. The center of each line runs through the center of a plurality of pixel locations defining the scan line 53. In a laser printer marking engine 22 the laser usually scans horizontally across the page to define a scan line 53 and the page usually advances vertically one line at a time. The laser is driven by electrical energizing pulses in pixel periods corresponding to pixel locations, causing circular charged regions to be formed on the page. The circular charged regions are ordinarily centered on the pixel location centers.

The charged regions attract marking toner to the paper wherever the charge density exceeds a certain threshold. The diameter of the circular charge regions is designed to be from 2 to 3 times as large as the spacing of the pixel location center points when the laser is energized for a full pixel period. This creates quite a bit of charge region overlap, which is desirable for forming smooth lines in various directions on the paper, but which is often undesirable when producing halftone images.

The effect of the charges is additive in the overlapping regions. This additive property is exploited by the present enhancement system 20 to create small, precisely formed marks in each pixel region 99 by pulse controlling the laser in neighboring pixel locations using relatively short pulse durations. The size and shape of the halftone marks 98 in halftone cells 92 are "grown", or provided, by controlling the position and duration of energizing pulses in one pixel location at a time, using gray level information from surrounding pixels to fine-tune the energizing pulse patterns. The resulting growth of contiguous halftone marks 98 in halftone cells 92 provides for high quality gray scale image production by the monotone marking engine 22.

Referring again to FIG. 1, the enhancement system 20 intercepts the rendered bit-map or gray scale source data 24 from the existing laser printer controller. The gray scale source data 24 is viewed through a feature detection window 28, as shown in FIG. 2. The feature detection window 28 is preferably 1×3×1 pixels in size. Each pixel preferably encodes a gray level value in a four-bit binary number. The window 28 thus "views", or compares, a pattern of twenty-bits of gray level information covering five pixel locations.

The gray value pattern in the feature detection window 28 is used to address a look-up table 32, using condition selection circuitry 30 to decode pixel values in the window 28 and to responsively generate a look-up table address value. The look-up table 32 contains eight-bit pulse codes 34 at each address. The eight-bit pulse codes 34 are optimized to correspond to the graphic features detected from the twenty-bit gray value patterns in the feature detection window 28. The pulse codes 34 represent near-optimum laser beam modulation parameters for the given gray value pattern in the feature detection window 28, based on a procedure for calibrating the particular marking engine 22 as discussed in detail below.

Referring to the timing diagram of FIG. 9, preferably, the eight-bit pulse code 34 comprises two fields of information. Two bits in a position field encode the position of an energizing pulse 88 within pixel period 60. Six bits in a duration field encode the duration of an energizing pulse 88 within pixel period 60. The position field value defines four ($2^2$=4) energizing pulse positions within pixel period 60. The four energizing pulse positions are located respectively: (1) at the center of pixel period 60; (2) at the beginning of pixel period 60; (3) at the end of pixel period 60; and (4) split at both the beginning and end of pixel period 60. Similarly, the duration field value defines a granularity of sixty-four ($2^6$=64) energization pulse duration values within the pixel period 60 by encoding six binary bits. Different granularities and positions could be provided using similar encoding schemes, if desired.

In this manner, enhancement system 20 generates the energizing pulses 88 to drive an existing laser printer marking engine 22 using optimum laser modulation parameters. No modification of the existing marking engine 22 is required. However, the existing printer controller must be capable of a data bandwidth of several times (preferably four times) its native resolution bandwidth for proper operation of enhancement system 20.

Again referring to FIG. 1, a FIFO (first-in first-out) memory or line buffer 26 is included in enhancement system 20 for sequentially receiving several scan lines 53 of pixel data from gray scale source data 24. Preferably, three lines are sequentially cycled through a previous line buffer 38, current line buffer 40 and next line buffer 42, respectively, in conjunction with a pixel clock signal 118 (not shown). The line buffers 38, 40 and 42 preferably comprise conventional shift registers, capable of storing multi-bit per pixel binary values on successive pixel clock cycles. Previous line buffer 38 has an input connected to gray scale source data 24. Previous line buffer 38 has an output connected to an input of current line buffer 40. Current line buffer 40 has an output connected to an input of next line buffer 42.

Pixel gray values from the multi-bit per pixel gray scale data 24 are shifted, or read, into previous line buffer 38 preferably two values (comprising one byte or two 4-bit nibbles) at time in conjunction with a cycle of the pixel clock signal 118. The first gray value to enter previous line buffer 38 is also the first gray value to be output from previous line buffer 38, and consequently, to be input to current line buffer 40. In a similar fashion, this gray value is also the first one to be output from current line buffer 40 and to be input to next line buffer 42. In this manner, pixel gray values are sequenced through the line buffer 26 in a first-in first-out (FIFO) fashion, until the entire desired portion of gray scale source data 24 has been processed by enhancement 20.

Feature detection window 28 is preferably implemented by making the last three pixel values of current line buffer 40, and the next to last pixel value of previous line buffer 38 and of next line buffer 42, available to condition selection circuitry 30 as inputs. As pixel gray values are sequenced through the line buffers 38, 40 and 42, the window 28 is effectively "moved" across the source data 24 one pixel at a time.

The feature detection window 28 preferably comprises current pixel 48 "PA", next pixel 46 "PC", previous pixel 50 "PB", previous line pixel 44 "PD", and next line pixel 52 "PE". Hence, the feature detection window 28 comprises the current pixel 48 along with the pixels that are vertically and horizontally adjacent to it in the source data 24. The current pixel is at the center of a cross-shaped window which includes the four orthogonally adjacent pixels. There are five pixels in the window 28, each having a four-bit gray level value. Therefore, the feature detection window 28 temporarily stores, accesses, or views a twenty-bit gray scale pattern in conjunction with one cycle of pixel clock 118.

Figure 11B:
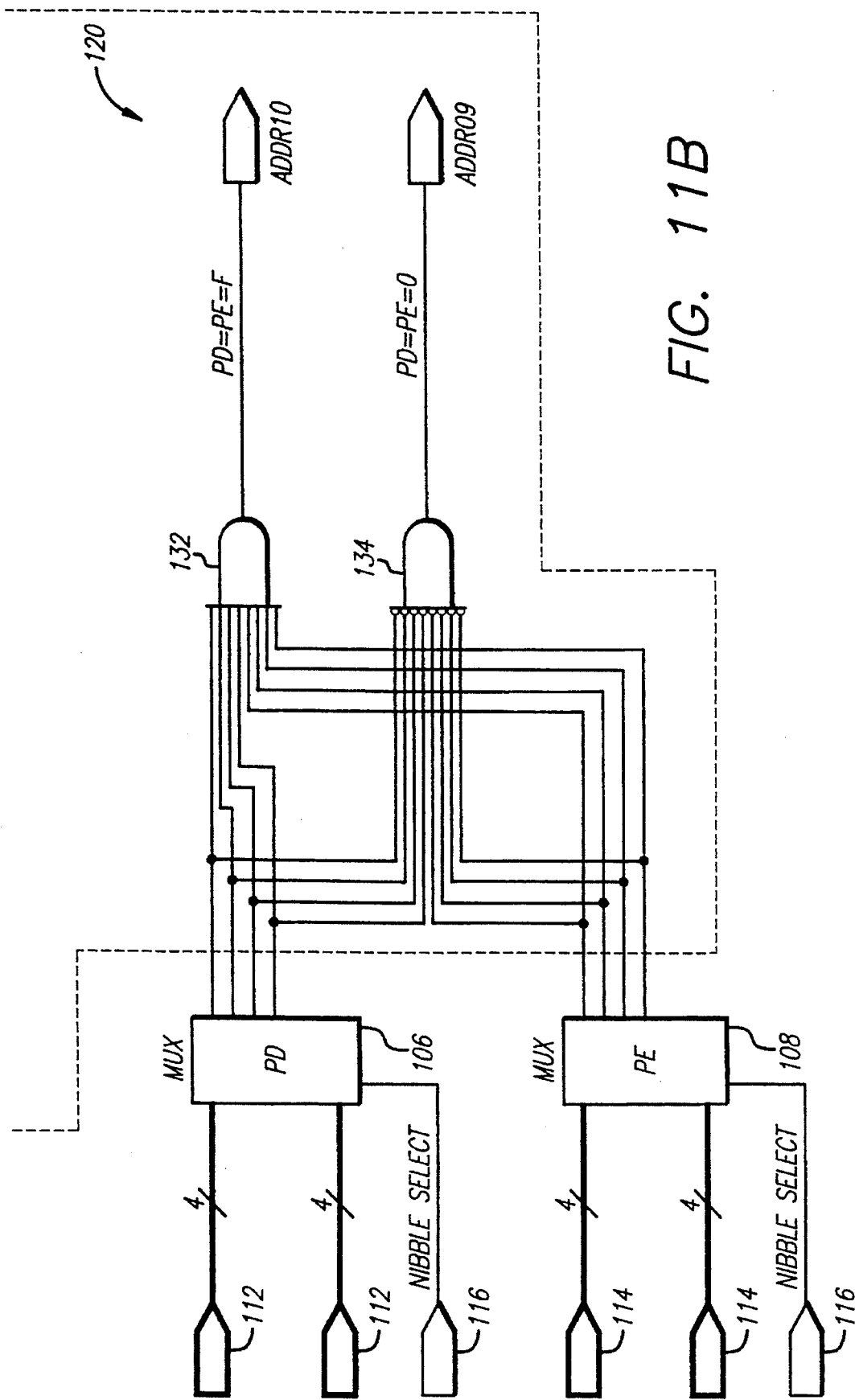

Condition selection circuitry 30 receives the twenty-bit gray scale pattern from feature detection window 28 and generates an address signal for accessing pulse code 34 stored in look-up table 32. As illustrated in FIGS. 11A and 11B, condition selection circuitry 30 comprises digital logic devices, including AND gate 122, NOR gate 124, comparator 126, NOR gate 128, AND gate 130, AND gate 132, and NOR gate 134. Gray level values from the feature detection window 28 are preferably made available to these logic devices through intermediate multiplexors and latches disposed between line buffers 26 and these devices.

Referring to the left margin of FIGS. 11A and 11B, current line byte 110 is provided as input to current line multiplexor 100 "PC" for one cycle of pixel clock 118. Similarly, previous line byte 112 is provided as input to previous line multiplexor 106 "PD" for one cycle of pixel clock 118. Next line byte 114 is provided as input to next line multiplexor 108 "PE" for one cycle of pixel clock 118. The input byte lines 110, 112, and 114 are respectively connected to the next pixel 46 "PC", to the previous line pixel 44 "PD", and to the next line pixel 52 "PE", locations in the line buffer 26, as illustrated in FIG. 1. Nibble select signal 116 is provided as input to each of current line multiplexor 100, previous line multiplexor 106 and next line multiplexor 108. Nibble select signal 116 chooses either the four high order bits or the four low order bits of the incoming bytes 110, 112 and 114, to be passed through to the output of the respective multiplexor 100, 106, 108. Nibble select signal 116 is synchronized with the pixel clock signal 118, preferably operating at twice the pixel clock frequency.

On successive cycles of the pixel clock signal 118, new gray level values are presented as current line byte 110, previous line byte 112, and next line byte 114, causing the feature detection window 28 to move across the gray scale source data 24 in conjunction with the pixel clock signal 118. Current pixel latch 102 "PA" latches, or temporarily stores, the output from current line multiplexor 100 for one pixel clock cycle. Similarly, next pixel latch 104 "PB" latches, or temporarily stores, the output from current pixel latch 102 for one pixel clock cycle. Thus, on each clock cycle: the output of current line multiplexor 100 "PC" provides the current "PC" gray value; the output of current pixel latch 102 "PA" provides the current "PA" gray value; the output of previous pixel latch 104 provides the current "PB" gray value; the output of previous line multiplexor 106 "PD" provides the current "PD" gray value; and the output of the next line multiplexor 108 "PE" provides the current "PE" gray value.

This arrangement provides the updated pixel gray values from feature detection window 28 to be presented to condition selection circuitry 30 on each cycle of the pixel clock signal 118. Condition selection circuitry 30 preferably generates an eleven-bit address indication for each pixel clock cycle based on the current gray values in the feature detection window 28. The look-up table address lines 120 are labelled ADDR00, ADDR01, ADDR02 ... ADDR10 in FIGS. 11A and 11B. The address value is generated by the condition selection circuitry 30 according to gray level patterns in the feature detection window 28. Note that each binary encoded gray level is conveniently referred to as a hexadecimal number ranging from 0 to F (i.e., 0, 1, 2, 3, 4, 5, 6, 7, 8, 9, A, B, C, D, E, F). A zero preferably encodes a blank or "off" pixel intensity and an "F" preferably encodes a black, or "fully on" pixel intensity. This scheme encodes a scale of sixteen gray levels.

Condition selection circuitry 30 preferably decodes value patterns in feature detection window 28 to generate an address indication as follows. The four-bit binary gray level value of the current pixel 48 "PA" is placed directly on address lines zero through three (ADDR00-ADDR03=PA). The binary value of address line four is made high if the gray level value of "PB" is greater than or equal to the gray level value Of "PC" (IF PB>=PC THEN ADDR04=1; ELSE ADDR04=0). The binary value of address line five is made high if the gray level value of "PB" is equal to zero (IF PB=0 THEN ADDR05=1; ELSE ADDR05=0). The binary value of address line six is made high if the gray level value of "PC" is equal to zero (IF PC=0 THEN ADDR06=1; ELSE ADDR06=0). The binary value of address line seven is made high if the gray level value of "PB" is equal to F (IF PB=F THEN ADDR07=1; ELSE ADDR07=0). The binary value of address line eight is made high if the gray level value of "PC" is equal to F (IF PC=F THEN ADDR08=1; ELSE ADDR08=0). The binary value of address line nine is made high if the gray level values of both "PD" and "PE" are equal to zero (IF PD=PE=0 THEN ADDR09=1; ELSE ADDR09= 0). The binary value of address line ten is made high if the gray level values of both "PD" and "PE" are equal to F (IF PD=PE=F THEN ADDR10=1; ELSE ADDR10=0).

Condition selection circuitry 30 generates the above-described address indication value as follows. The output from current pixel latch 102 is provided directly at address lines zero through three (ADDR00–ADDR03). Comparator 126 accepts as input the output from both previous pixel latch 104 and current line multiplexor 100, compares these gray level values in a conventional manner, and drives address line four (ADDR04) high whenever the gray value of "PB" is greater than or equal to the gray value of "PC". NOR gate 124 accepts as input the four bit output of previous pixel latch 104, so that whenever the gray level value is zero, "PB"=0 (0000 binary), NOR gate 124 provides a high output signal on address line five (ADDR05). NOR gate 128 accepts as input the four bit output of current line multiplexor 100, so that whenever the gray level value of "PC"=0 (0000 binary), NOR gate 128 provides a high output signal on address line six (ADDR06). AND gate 122 accepts as input the four bit output of previous pixel latch 104, so that whenever the gray level value of "PB"=F (1111 binary), AND gate 122 provides a high output signal on address line seven (ADDR07). AND gate 130 accepts as input the four bit output of current line multiplexor 100, so that whenever the gray level value of "PC"=F (1111 binary), AND gate 130 provides a high output signal on address line eight (ADDR08). Eight input AND gate 132 accepts input from the four bit outputs of previous line multiplexor 106 and next line multiplexor 108, respectively. Therefore, whenever the gray level value of "PD"="PE"=F, AND gate 132 provides a high output signal on address line nine (ADDR09). Eight input NOR gate 134 also accepts input from the four bit outputs of previous line multiplexor 106 and next line multiplexor 108, respectively. Therefore, whenever the gray level value of "PD"="PE"=0, NOR gate 134 provides a high output signal on address line ten (ADDR10).

The eleven-bit look-up table address lines 120 are used to access or index, up to 2046 ($2^{11}$=2046) separate memory locations or storage locations in look-up table 32. Look-up table 32 preferably comprises a random access memory (RAM) or other conventional memory device. Each storage location contains a pulse code 34 for controlling the energizing pulse 88 driving a laser of marking engine 22. As described above, each pulse code 34 preferably comprises an eight bit binary number, broken down into a two-bit pulse position field and a six-bit pulse duration field. Pulse generator 36 uses the position field information and the duration field information to generate energizing pulses 88 for the driving charge producing device of marking engine 22.

The actual pulse codes 34 stored in look-up table 32 are optimized during a calibration procedure for each individual type of marking engine 22, as described below. In general, the two fields of the pulse code 34 allow pulse generator 36 to provide two hundred fifty-six (256) different pulse patterns at energizing pulse output 37. The pulse codes 34 allow marking engine 22 to produce an increased number of different gray levels in a gray scale for any given halftone scheme. Then, the best set of gray levels for use with a given marking engine 22 may be chosen from among the increased number of gray levels during calibration. This is preferably accomplished by selecting sixteen pulse codes 34 that best simulate a particular graphic feature, and placing these optimized pulse codes 34 in look-up table 32. Graphic features including gray levels and image detail are simulated by optimized pulse codes 34 stored in corresponding sub-tables of look-up table 32.

In general, the increased number of gray levels are produced by altering the position and duration of energizing pulse 88 during a pixel period 60. As illustrated in FIG. 9, the marking engine 22 laser is conventionally driven by a pulse having a duration equal to one pixel period 60 in order to fully mark a pixel region. The present enhancement system 20 provides a variety of modified energizing pulses 88 during pixel marking period 60, as indicated by the exemplary energizing pulses 88. For example, short centered pulse 64; long centered pulse 68; beginning-positioned pulse 81; end-positioned pulse 82; and split pulse 84 are used to produce various sized and positioned marks in the current pixel region at times in conjunction with the pulses in neighboring pixel regions. The pulse code 34 may be represented as a Hexadecimal number in the range of 00 Hex to FF Hex (00000000b to 11111111b). The first two bits encode the four possible pulse positions and the last six bits encode sixty-four possible pulse durations.

As illustrated in FIG. 2, feature detection window 28 spans previous scan line 54, current scan line 56 and next scan line 58. The positions of previous pixel 50 "PB" and next pixel 46 "PC" have been switched with respect to their positions in FIG. 1. This is because FIG. 2 illustrates the pixel layout as marked on paper while FIG. 1 illustrates the preferred flow of gray scale source data 24 through enhancement system 20.

In very general terms, highlight features are enhanced as follows. As illustrated in FIG. 3, short centered pulse 64 is used to produce small centered mark 62 in a pixel location 66. The pixel location 66 corresponds to the current pixel 48 in the feature detection window 28. Note that no pulses are produced during previous pixel period 59 (PB=0 Hex) or during next pixel period 61 (PC=0 Hex). The size of small centered mark 62 corresponds to the duration of short centered pulse 64. This can be seen with reference to FIG. 4, where long centered pulse 68 produces large centered mark 70 in pixel location 66.

In general, centered pulses are produced, for example, by providing both bits in the position field of pulse code 34 as zeros (00 binary). The duration of the centered pulse is encoded by the six-bit value in the duration field, which ranges from 000000 binary to 111111 binary. This divides the pixel period 60 into sixty-four (64) intervals and allows the pulse duration to be controlled in increments (a granularity) of 1/64 of the pixel period 60. Hence, pulse codes 34 ranging in value from 00 Hex to 3F Hex preferably encode centered pulses ranging incrementally from zero duration to 64/64 of a pixel period 60 in duration.

Centered pulses are generally accessed in look-up table 32 as pulse code 34 whenever the gray values of previous pixel 50 "PB" and next pixel 46 "PC" in feature detection window 28 are both zero. Referring to FIG. 10, exemplary gray values 29 are illustrated in feature detection window 28. Preferably, when the "PB" gray value 51 equals zero and the "PC" gray value 47 equals zero a centered pulse is chosen as pulse code 34. The duration of the centered pulse is generally encoded to correspond with the "PA" gray value 49, which indexes an optimized pulse duration pulse code 34 from the feature subtable. For example, if the "PA" gray value 49 is equal to 3 Hex, the pulse duration may be provided as 6/64 of the pixel period 60.

In very general terms, left-edge image details are enhanced as follows. As illustrated in FIG. 5, short beginning-positioned pulse 74 is used to create small left-justified mark 72 in pixel location 66. The pixel location 66 corresponds to the current pixel 48 in the feature detection window 28. Note that a fully on pulse is produced during previous pixel period 59 (PB=F Hex), but no pulse is produced during next pixel period 61 (PC=0 Hex), which most likely corresponds to a left edge feature condition. The size of small left-justified mark 72 corresponds to the duration of short beginning-positioned pulse 74. This can also be seen with reference to FIG. 6, where long beginning-positioned pulse 78 produces large left-justified mark 76 in pixel location 66.

In general, beginning-positioned or left-justified pulses are produced, for example, by providing a first bit in the position field of pulse code 34 as a one and by providing a second bit in the position field as a zero (10 binary). The duration of the beginning-positioned or left-justified pulse is encoded by the six-bit value in the duration field, which ranges from 000000 binary to 111111 binary. This divides the pixel period 60 into sixty-four (64) intervals and allows the pulse duration to be controlled in increments of one sixty-fourth (1/64) of the pixel period 60. Hence, pulse codes 34 ranging in value from 80 Hex to BF Hex preferably encode beginning-positioned or left-justified pulses ranging incrementally from zero duration to a full (64/64) of a pixel period 60 in duration.

Beginning-positioned or left-justified pulses are generally accessed in look-up table 32 as pulse code 34 whenever the gray value of previous pixel 50 "PB" is fully on and whenever the gray value of next pixel 46 "PC" is blank. Referring to FIG. 10, this corresponds to the case when "PB" gray value 51 equals F Hex and when "PC" gray value 47 equals 0 Hex. The duration of the left-justified pulse preferably corresponds to the "PA" gray value 49, which indexes an optimized pulse duration pulse code 34 from the feature subtable.

In very general terms, right-edge image details are enhanced as follows. As illustrated in FIG. 7, end-positioned pulse 82 is used to create right-justified mark 80 in pixel location 66. The pixel location 66 corresponds to the current pixel 48 in the feature detection window 28. Note that a fully on pulse is produced during next pixel period 61 (PC=F Hex), but no pulse is produced during previous pixel period 59 (PB=0 Hex), which most likely corresponds to a right-edge feature condition. The size of right-justified mark 80 corresponds to the duration of end-positioned pulse 82.

In general, end-positioned or right-justified pulses are produced, for example, by providing a first bit in the position field of pulse output code 34 as a zero and by providing a second bit in the position field as a one (01 binary). The duration of the end-positioned or right-justified pulse is encoded by the six-bit value in the duration field, which ranges from 000000 binary to 111111 binary. This divides the pixel period 60 into sixty-four (64) intervals and allows the pulse duration to be controlled in increments of one sixty-fourth (1/64) of the pixel period 60. Hence, pulse codes 34 ranging in value from 40 Hex to 7F Hex preferably encode end-positioned or right-justified pulses ranging incrementally from zero duration to a full (64/64) of a pixel period 60 in duration.

End-positioned or right-justified pulses are generally accessed in look-up table 32 as pulse output code 34 whenever the gray value of previous pixel 50 "PB" is blank, and whenever the gray value of next pixel 46 "PC" is fully on. Referring to FIG. 10, this corresponds to the case when "PB" gray value 51 equals 0 Hex and when "PC" gray value 47 equals F Hex. The duration of the right-justified pulse preferably corresponds to the "PA" gray value 49, which indexes an optimized pulse duration pulse code 34 in the feature sub-table.

In very general terms, shadow features are enhanced as follows. As illustrated in FIG. 8, split pulse 84 is used to produce split marks 86 in a pixel location 66. The pixel location 66 corresponds to the current pixel 48 in the feature detection window 28. Note that fully on pulses are produced during previous pixel period 59 (PB=F Hex), and during next pixel period 61 (PC=F Hex), which most likely corresponds to a shadow feature condition. The size of the split marks 86 correspond to the duration of the split pulses 84.

In general, split pulses are produced, for example, by providing both bits in the position field of pulse output code 34 as ones (11 binary). The duration of the split pulses is encoded by the six-bit value in the duration field, which ranges from 000000 binary to 111111 binary. This divides the pixel period 60 into sixty-four (64) intervals and allows the split pulse durations to be controlled in increments of ¹/₆₄ of the pixel period 60. Hence, pulse codes 34 ranging in value from CO Hex to FF Hex preferably encode split pulses ranging incrementally from zero duration to ⁶⁴/₆₄ of a pixel period 60 in duration.

Split pulses are generally accessed in look-up table 32 as pulse code 34 whenever the gray values of previous pixel 50 "PB" and next pixel 46 "PC" in feature detection window 28 are both fully on. Referring to FIG. 10, exemplary gray values 29 are illustrated in feature detection window 28. Preferably, when the "PB" gray value 51 equals F and the "PC" gray value 47 equals F a split pulse is chosen as pulse output code 34. The duration of the split pulse is generally encoded to correspond to the "PA" gray value 49, which indexes an optimized pulse duration pulse code 34 in the feature sub-table. For example, if the "PA" gray value 49 is equal to 3 Hex, the pulse duration on each end of the period may be provided as ⁶/₆₄ of the pixel period 60.

As discussed above, FIG. 9 illustrates the positioning of energizing pulses 88 in a pixel period 60. Exemplary energizing pulse patterns 88 include long centered pulse 68, short centered pulse 64, beginning-positioned pulse 81, end-positioned pulse 82 and split pulse 84.

CALIBRATION PROCEDURE

The calibration of the enhancement system 20 for use with a particular marking engine 22 is now discussed, with reference to a particular operating example. However, the following details are offered for purposes of illustration and should not be interpreted as limitations on the present invention.

One or more sets of engine parameter test data are provided as source data 24 in the native resolution of marking engine 22. A parameter test data set is printed in order to establish the boundaries of the particular marking limits of a given marking engine. For example, some printers may begin to make centered marks only when the pulse duration exceeds, say, ⁶/₆₄ of a pixel period. Others are capable of making marks from shorter pulse durations. These marking limits vary from marking engine to marking engine and from pulse position to pulse position.

The printed parameter test data are preferably provided using every combination of pulse position and duration available based on the predetermined pulse granularity. For the particular example disclosed above, this comprises (256) combinations. Visual inspection of the printed data allows the calibration technician to detect the boundary marking limits of the particular marking engine for different types of pulse patterns. A first approximation optimized pulse code look-up table is derived using minimal pulse duration values corresponding to the respective boundary marking limits.

One or more control images containing a full range of known graphic features, such as highlights, midtones, shadows, and edges, are provided as source data 24 in the native resolution of the marking engine 22. Pulse codes 34 are provisionally stored in look-up table 32 having values corresponding to the graphic features sought to be enhanced, based on the parameter test described above.

The control images are printed, one at a time, by controlling the marking engine 22 using the present enhancement method or system. The images so produced are visually inspected and/or tested using instrumentation to compare the quality of the relevant graphic features therein to the feature qualities of the control image.

Adjustments may be made to the pulse codes 34 actually stored in the look-up table, in order to optimize or gamma-correct the differences between the produced features and the desired features. Control images are iteratively printed and pulse codes adjusted until desired refinement of the respective graphic features is reached.

This process results in the selection of the best set of pulse codes 34 for producing a particular graphic feature using the particular marking engine 22. These optimized pulse codes are stored in sub-tables corresponding to respective graphic features, and are indexed by detecting feature patterns in the source data 24 through the feature detection window 28. In this manner, enhanced graphic features are produced by the marking engine 22 using the system and method of the present invention.

Referring to appendix A, an optimized look-up table for a Cannon NX 300 dpi laser printer is provided as an example. In the appendix, a column representing storage addresses in the table is provided adjacent a column representing the pulse code 34 value actually stored at the indicated address in the table. For example, the address column lists values incrementally from "Address: 0x0000" to "Address: 0x0FFF". This hexadecimal notation reflects the fact that an eleven-bit address value is used, as described in detail above, to access storage locations in the table. Therefore, the last three Hex digits are the ones that actually vary from 000 Hex to FFF Hex, indexing or accessing $2^{11}=2048$ pulse code storage locations in the table.

The pulse code 34 values in the corresponding column are determined during the calibration procedure, as described above. Hence, they are not in any particular order in the table. The pulse code values listed in the table range from "pulse code: 0x00" to "pulse code: 0xFF" (but not in incremental fashion). The last two pulse code hexadecimal digits thus vary from 00 Hex to FF Hex to encode two hundred fifty-six (256) different possible combinations of pulse positions and durations. The address locations are broken down into one hundred twenty-eight (128) separate subtables.

It should be understood that the calibration process can be implemented entirely in program form for emulating the enhancement system using a general purpose computer. Accordingly, the present invention should not be construed as being limited to any particular embodiment disclosed above, but should be interpreted to cover numerous variations which would be evident to one of ordinary skill in the art based on the present disclosure.

For example, the present enhancement system 20 could be implemented as a program running on a general purpose computer, or it could be implemented in numerous variations including dedicated hardware, such as in an application specific integrated circuit.

Also, it is contemplated that types of graphic features may be enhanced by use of the present system and method, beyond those particularly described above. For example, image patterns corresponding to features of certain text characters could be detected and enhanced, or the image patterns corresponding to any number or type of detectable graphic feature could be mapped or transformed to provide a modified feature output.

One such transformation would include rendering a "negative" image marking engine output of the incoming source data, wherein black is mapped to white, white is mapped to black, and intermediate gray levels are suitably reversed. Similar transformations are readily provided by suitable use of the present invention.

One of ordinary skill in the art would understand that many system details of the present invention are susceptible to numerous variations, without departing from the scope of the invention or the principles taught in the present disclosure.

For example, binary values such as gray levels or color values may be encoded using virtually any number of bits. Also, the feature detection window 28 could be modified to view various arrangements of pixels. The condition selection circuitry is adaptable to detect virtually any combination of various patterns in the feature detection window 28.

Memory sizes may be changed or modified for, or clock rates and timing may be geared for, various particular applications depending on system design choices and operating parameters of particular marking engines. Also, alternative combinations of energizing pulse positions and/or the energizing pulse granularities may be adapted for use with a given marking engine.

Accordingly, the present system and method are provided to be used empirically to enhance or transform the production of graphic features from a marking engine, based on the detection of those features in input source data. As such, the present invention is inherently adaptable to numerous embodiments beyond the particular embodiments disclosed herein, and should therefore be construed with respect to the following claims.

APPENDIX A

ASICNX.JST
Justification tables for
Canon NX 300 dpi laser engine

| | | |
|---|---|---|
| Address: 0x0000 pulse code: 0x00 | Address: 0x0032 pulse code: 0xC4 | Address: 0x0068 pulse code: 0xD0 |
| Address: 0x0001 pulse code: 0xC2 | Address: 0x0033 pulse code: 0xC6 | Address: 0x0069 pulse code: 0xD2 |
| Address: 0x0002 pulse code: 0xC4 | Address: 0x0034 pulse code: 0xC8 | Address: 0x006A pulse code: 0xD5 |
| Address: 0x0003 pulse code: 0xC6 | Address: 0x0035 pulse code: 0xCA | Address: 0x006B pulse code: 0xD7 |
| Address: 0x0004 pulse code: 0xC8 | Address: 0x0036 pulse code: 0xCC | Address: 0x006C pulse code: 0xD9 |
| Address: 0x0005 pulse code: 0xCA | Address: 0x0037 pulse code: 0xCE | Address: 0x006D pulse code: 0xDB |
| Address: 0x0006 pulse code: 0xCC | Address: 0x0038 pulse code: 0xD0 | Address: 0x006E pulse code: 0xDD |
| Address: 0x0007 pulse code: 0xCE | Address: 0x0039 pulse code: 0xD2 | Address: 0x006F pulse code: 0xC0 |
| Address: 0x0008 pulse code: 0xD0 | Address: 0x003A pulse code: 0xD5 | Address: 0x0070 pulse code: 0x00 |
| Address: 0x0009 pulse code: 0xD2 | Address: 0x003B pulse code: 0xD7 | Address: 0x0071 pulse code: 0x04 |
| Address: 0x000A pulse code: 0xD5 | Address: 0x003C pulse code: 0xD9 | Address: 0x0072 pulse code: 0x08 |
| Address: 0x000B pulse code: 0xD7 | Address: 0x003D pulse code: 0xDB | Address: 0x0073 pulse code: 0x0C |
| Address: 0x000C pulse code: 0xD9 | Address: 0x003E pulse code: 0xDD | Address: 0x0074 pulse code: 0x10 |
| Address: 0x000D pulse code: 0xDB | Address: 0x003F pulse code: 0xC0 | Address: 0x0075 pulse code: 0x15 |
| Address: 0x000E pulse code: 0xDD | Address: 0x0040 pulse code: 0x00 | Address: 0x0076 pulse code: 0x19 |
| Address: 0x000F pulse code: 0xC0 | Address: 0x0041 pulse code: 0xC2 | Address: 0x0077 pulse code: 0x1D |
| Address: 0x0010 pulse code: 0x00 | Address: 0x0042 pulse code: 0xC4 | Address: 0x0078 pulse code: 0x21 |
| Address: 0x0011 pulse code: 0xC2 | Address: 0x0043 pulse code: 0xC6 | Address: 0x0079 pulse code: 0x25 |
| Address: 0x0012 pulse code: 0xC4 | Address: 0x0044 pulse code: 0xC8 | Address: 0x007A pulse code: 0x2A |
| Address: 0x0013 pulse code: 0xC6 | Address: 0x0045 pulse code: 0xCA | Address: 0x007B pulse code: 0x2E |
| Address: 0x0014 pulse code: 0xC8 | Address: 0x0046 pulse code: 0xCC | Address: 0x007C pulse code: 0x32 |
| Address: 0x0015 pulse code: 0xCA | Address: 0x0047 pulse code: 0xCE | Address: 0x007D pulse code: 0x36 |
| Address: 0x0016 pulse code: 0xCC | Address: 0x0048 pulse code: 0xD0 | Address: 0x007E pulse code: 0x3A |
| Address: 0x0017 pulse code: 0xCE | Address: 0x0049 pulse code: 0xD2 | Address: 0x007F pulse code: 0xC0 |
| Address: 0x0018 pulse code: 0xD0 | Address: 0x004A pulse code: 0xD5 | Address: 0x0080 pulse code: 0x00 |
| Address: 0x0019 pulse code: 0xD2 | Address: 0x004B pulse code: 0xD7 | Address: 0x0081 pulse code: 0xC2 |
| Address: 0x001A pulse code: 0xD5 | Address: 0x004C pulse code: 0xD9 | Address: 0x0082 pulse code: 0xC4 |
| Address: 0x001B pulse code: 0xD7 | Address: 0x004D pulse code: 0xDB | Address: 0x0083 pulse code: 0xC6 |
| Address: 0x001C pulse code: 0xD9 | Address: 0x004E pulse code: 0xDD | Address: 0x0084 pulse code: 0xC8 |
| Address: 0x001D pulse code: 0xDB | Address: 0x004F pulse code: 0xC0 | Address: 0x0085 pulse code: 0xCA |
| Address: 0x001E pulse code: 0xDD | Address: 0x0050 pulse code: 0x00 | Address: 0x0086 pulse code: 0xCC |
| Address: 0x001F pulse code: 0xC0 | Address: 0x0051 pulse code: 0xC2 | Address: 0x0087 pulse code: 0xCE |
| Address: 0x0020 pulse code: 0x00 | Address: 0x0052 pulse code: 0xC4 | Address: 0x0088 pulse code: 0xD0 |
| Address: 0x0021 pulse code: 0xC2 | Address: 0x0053 pulse code: 0xC6 | Address: 0x0089 pulse code: 0xD2 |
| Address: 0x0022 pulse code: 0xC4 | Address: 0x0054 pulse code: 0xC8 | Address: 0x008A pulse code: 0xD5 |
| Address: 0x0023 pulse code: 0xC6 | Address: 0x0055 pulse code: 0xCA | Address: 0x008B pulse code: 0xD7 |
| Address: 0x0024 pulse code: 0xC8 | Address: 0x0056 pulse code: 0xCC | Address: 0x008C pulse code: 0xD9 |
| Address: 0x0025 pulse code: 0xCA | Address: 0x0057 pulse code: 0xCE | Address: 0x008D pulse code: 0xDB |
| Address: 0x0026 pulse code: 0xCC | Address: 0x0058 pulse code: 0xD0 | Address: 0x008E pulse code: 0xDD |
| Address: 0x0027 pulse code: 0xCE | Address: 0x0059 pulse code: 0xD2 | Address: 0x008F pulse code: 0xC0 |
| Address: 0x0028 pulse code: 0xD0 | Address: 0x005A pulse code: 0xD5 | Address: 0x0090 pulse code: 0x00 |
| Address: 0x0029 pulse code: 0xD2 | Address: 0x005B pulse code: 0xD7 | Address: 0x0091 pulse code: 0xC2 |
| Address: 0x002A pulse code: 0xD5 | Address: 0x005C pulse code: 0xD9 | Address: 0x0092 pulse code: 0xC4 |
| Address: 0x002B pulse code: 0xD7 | Address: 0x005D pulse code: 0xDB | Address: 0x0093 pulse code: 0xC6 |
| Address: 0x002C pulse code: 0xD9 | Address: 0x005E pulse code: 0xDD | Address: 0x0094 pulse code: 0xC8 |
| Address: 0x002D pulse code: 0xDB | Address: 0x005F pulse code: 0xC0 | Address: 0x0095 pulse code: 0xCA |
| Address: 0x002E pulse code: 0xDD | Address: 0x0060 pulse code: 0x00 | Address: 0x0096 pulse code: 0xCC |
| Address: 0x002F pulse code: 0xC0 | Address: 0x0061 pulse code: 0xC2 | Address: 0x0097 pulse code: 0xCE |
| Address: 0x0030 pulse code: 0x00 | Address: 0x0062 pulse code: 0xC4 | Address: 0x0098 pulse code: 0xD0 |
| Address: 0x0031 pulse code: 0xC2 | Address: 0x0063 pulse code: 0xC6 | Address: 0x0099 pulse code: 0xD2 |
| | Address: 0x0064 pulse code: 0xC8 | Address: 0x009A pulse code: 0xD5 |
| | Address: 0x0065 pulse code: 0xCA | Address: 0x009B pulse code: 0xD7 |
| | Address: 0x0066 pulse code: 0xCC | Address: 0x009C pulse code: 0xD9 |
| | Address: 0x0067 pulse code: 0xCE | Address: 0x009D pulse code: 0xDB |

| | | |
|---|---|---|
| Address: 0x009E  pulse code: 0xDD | Address: 0x00D4  pulse code: 0x90 | Address: 0x010A  pulse code: 0xD5 |
| Address: 0x009F  pulse code: 0xC0 | Address: 0x00D5  pulse code: 0x95 | Address: 0x010B  pulse code: 0xD7 |
| Address: 0x00A0  pulse code: 0x00 | Address: 0x00D6  pulse code: 0x99 | Address: 0x010C  pulse code: 0xD9 |
| Address: 0x00A1  pulse code: 0xC2 | Address: 0x00D7  pulse code: 0x9D | Address: 0x010D  pulse code: 0xDB |
| Address: 0x00A2  pulse code: 0xC4 | Address: 0x00D8  pulse code: 0xA1 | Address: 0x010E  pulse code: 0xDD |
| Address: 0x00A3  pulse code: 0xC6 | Address: 0x00D9  pulse code: 0xA5 | Address: 0x010F  pulse code: 0xC0 |
| Address: 0x00A4  pulse code: 0xC8 | Address: 0x00DA  pulse code: 0xAA | Address: 0x0110  pulse code: 0x00 |
| Address: 0x00A5  pulse code: 0xCA | Address: 0x00DB  pulse code: 0xAE | Address: 0x0111  pulse code: 0xC2 |
| Address: 0x00A6  pulse code: 0xCC | Address: 0x00DC  pulse code: 0xB2 | Address: 0x0112  pulse code: 0xC4 |
| Address: 0x00A7  pulse code: 0xCE | Address: 0x00DD  pulse code: 0xB6 | Address: 0x0113  pulse code: 0xC6 |
| Address: 0x00A8  pulse code: 0xD0 | Address: 0x00DE  pulse code: 0xBA | Address: 0x0114  pulse code: 0xC8 |
| Address: 0x00A9  pulse code: 0xD2 | Address: 0x00DF  pulse code: 0xC0 | Address: 0x0115  pulse code: 0xCA |
| Address: 0x00AA  pulse code: 0xD5 | Address: 0x00E0  pulse code: 0x80 | Address: 0x0116  pulse code: 0xCC |
| Address: 0x00AB  pulse code: 0xD7 | Address: 0x00E1  pulse code: 0x84 | Address: 0x0117  pulse code: 0xCE |
| Address: 0x00AC  pulse code: 0xD9 | Address: 0x00E2  pulse code: 0x88 | Address: 0x0118  pulse code: 0xD0 |
| Address: 0x00AD  pulse code: 0xDB | Address: 0x00E3  pulse code: 0x8C | Address: 0x0119  pulse code: 0xD2 |
| Address: 0x00AE  pulse code: 0xDD | Address: 0x00E4  pulse code: 0x90 | Address: 0x011A  pulse code: 0xD5 |
| Address: 0x00AF  pulse code: 0xC0 | Address: 0x00E5  pulse code: 0x95 | Address: 0x011B  pulse code: 0xD7 |
| Address: 0x00B0  pulse code: 0x00 | Address: 0x00E6  pulse code: 0x99 | Address: 0x011C  pulse code: 0xD9 |
| Address: 0x00B1  pulse code: 0xC2 | Address: 0x00E7  pulse code: 0x9D | Address: 0x011D  pulse code: 0xDB |
| Address: 0x00B2  pulse code: 0xC4 | Address: 0x00E8  pulse code: 0xA1 | Address: 0x011E  pulse code: 0xDD |
| Address: 0x00B3  pulse code: 0xC6 | Address: 0x00E9  pulse code: 0xA5 | Address: 0x011F  pulse code: 0xC0 |
| Address: 0x00B4  pulse code: 0xC8 | Address: 0x00EA  pulse code: 0xAA | Address: 0x0120  pulse code: 0x40 |
| Address: 0x00B5  pulse code: 0xCA | Address: 0x00EB  pulse code: 0xAE | Address: 0x0121  pulse code: 0x44 |
| Address: 0x00B6  pulse code: 0xCC | Address: 0x00EC  pulse code: 0xB2 | Address: 0x0122  pulse code: 0x48 |
| Address: 0x00B7  pulse code: 0xCE | Address: 0x00ED  pulse code: 0xB6 | Address: 0x0123  pulse code: 0x4C |
| Address: 0x00B8  pulse code: 0xD0 | Address: 0x00EE  pulse code: 0xBA | Address: 0x0124  pulse code: 0x50 |
| Address: 0x00B9  pulse code: 0xD2 | Address: 0x00EF  pulse code: 0xC0 | Address: 0x0125  pulse code: 0x55 |
| Address: 0x00BA  pulse code: 0xD5 | Address: 0x00F0  pulse code: 0x80 | Address: 0x0126  pulse code: 0x59 |
| Address: 0x00BB  pulse code: 0xD7 | Address: 0x00F1  pulse code: 0x84 | Address: 0x0127  pulse code: 0x5D |
| Address: 0x00BC  pulse code: 0xD9 | Address: 0x00F2  pulse code: 0x88 | Address: 0x0128  pulse code: 0x61 |
| Address: 0x00BD  pulse code: 0xDB | Address: 0x00F3  pulse code: 0x8C | Address: 0x0129  pulse code: 0x65 |
| Address: 0x00BE  pulse code: 0xDD | Address: 0x00F4  pulse code: 0x90 | Address: 0x012A  pulse code: 0x6A |
| Address: 0x00BF  pulse code: 0xC0 | Address: 0x00F5  pulse code: 0x95 | Address: 0x012B  pulse code: 0x6E |
| Address: 0x00C0  pulse code: 0x80 | Address: 0x00F6  pulse code: 0x99 | Address: 0x012C  pulse code: 0x72 |
| Address: 0x00C1  pulse code: 0x84 | Address: 0x00F7  pulse code: 0x9D | Address: 0x012D  pulse code: 0x76 |
| Address: 0x00C2  pulse code: 0x88 | Address: 0x00F8  pulse code: 0xA1 | Address: 0x012E  pulse code: 0x7A |
| Address: 0x00C3  pulse code: 0x8C | Address: 0x00F9  pulse code: 0xA5 | Address: 0x012F  pulse code: 0xC0 |
| Address: 0x00C4  pulse code: 0x90 | Address: 0x00FA  pulse code: 0xAA | Address: 0x0130  pulse code: 0x40 |
| Address: 0x00C5  pulse code: 0x95 | Address: 0x00FB  pulse code: 0xAE | Address: 0x0131  pulse code: 0x44 |
| Address: 0x00C6  pulse code: 0x99 | Address: 0x00FC  pulse code: 0xB2 | Address: 0x0132  pulse code: 0x48 |
| Address: 0x00C7  pulse code: 0x9D | Address: 0x00FD  pulse code: 0xB6 | Address: 0x0133  pulse code: 0x4C |
| Address: 0x00C8  pulse code: 0xA1 | Address: 0x00FE  pulse code: 0xBA | Address: 0x0134  pulse code: 0x50 |
| Address: 0x00C9  pulse code: 0xA5 | Address: 0x00FF  pulse code: 0xC0 | Address: 0x0135  pulse code: 0x55 |
| Address: 0x00CA  pulse code: 0xAA | Address: 0x0100  pulse code: 0x00 | Address: 0x0136  pulse code: 0x59 |
| Address: 0x00CB  pulse code: 0xAE | Address: 0x0101  pulse code: 0xC2 | Address: 0x0137  pulse code: 0x5D |
| Address: 0x00CC  pulse code: 0xB2 | Address: 0x0102  pulse code: 0xC4 | Address: 0x0138  pulse code: 0x61 |
| Address: 0x00CD  pulse code: 0xB6 | Address: 0x0103  pulse code: 0xC6 | Address: 0x0139  pulse code: 0x65 |
| Address: 0x00CE  pulse code: 0xBA | Address: 0x0104  pulse code: 0xC8 | Address: 0x013A  pulse code: 0x6A |
| Address: 0x00CF  pulse code: 0xC0 | Address: 0x0105  pulse code: 0xCA | Address: 0x013B  pulse code: 0x6E |
| Address: 0x00D0  pulse code: 0x80 | Address: 0x0106  pulse code: 0xCC | Address: 0x013C  pulse code: 0x72 |
| Address: 0x00D1  pulse code: 0x84 | Address: 0x0107  pulse code: 0xCE | Address: 0x013D  pulse code: 0x76 |
| Address: 0x00D2  pulse code: 0x88 | Address: 0x0108  pulse code: 0xD0 | Address: 0x013E  pulse code: 0x7A |
| Address: 0x00D3  pulse code: 0x8C | Address: 0x0109  pulse code: 0xD2 | Address: 0x013F  pulse code: 0xC0 |

| | | | | | |
|---|---|---|---|---|---|
| Address: 0x0140 | pulse code: 0x00 | Address: 0x0176 | pulse code: 0x59 | Address: 0x01AC | pulse code: 0x72 |
| Address: 0x0141 | pulse code: 0xC2 | Address: 0x0177 | pulse code: 0x5D | Address: 0x01AD | pulse code: 0x76 |
| Address: 0x0142 | pulse code: 0xC4 | Address: 0x0178 | pulse code: 0x61 | Address: 0x01AE | pulse code: 0x7A |
| Address: 0x0143 | pulse code: 0xC6 | Address: 0x0179 | pulse code: 0x65 | Address: 0x01AF | pulse code: 0xC0 |
| Address: 0x0144 | pulse code: 0xC8 | Address: 0x017A | pulse code: 0x6A | Address: 0x01B0 | pulse code: 0x40 |
| Address: 0x0145 | pulse code: 0xCA | Address: 0x017B | pulse code: 0x6E | Address: 0x01B1 | pulse code: 0x44 |
| Address: 0x0146 | pulse code: 0xCC | Address: 0x017C | pulse code: 0x72 | Address: 0x01B2 | pulse code: 0x48 |
| Address: 0x0147 | pulse code: 0xCE | Address: 0x017D | pulse code: 0x76 | Address: 0x01B3 | pulse code: 0x4C |
| Address: 0x0148 | pulse code: 0xD0 | Address: 0x017E | pulse code: 0x7A | Address: 0x01B4 | pulse code: 0x50 |
| Address: 0x0149 | pulse code: 0xD2 | Address: 0x017F | pulse code: 0xC0 | Address: 0x01B5 | pulse code: 0x55 |
| Address: 0x014A | pulse code: 0xD5 | Address: 0x0180 | pulse code: 0x00 | Address: 0x01B6 | pulse code: 0x59 |
| Address: 0x014B | pulse code: 0xD7 | Address: 0x0181 | pulse code: 0xC2 | Address: 0x01B7 | pulse code: 0x5D |
| Address: 0x014C | pulse code: 0xD9 | Address: 0x0182 | pulse code: 0xC4 | Address: 0x01B8 | pulse code: 0x61 |
| Address: 0x014D | pulse code: 0xDB | Address: 0x0183 | pulse code: 0xC6 | Address: 0x01B9 | pulse code: 0x65 |
| Address: 0x014E | pulse code: 0xDD | Address: 0x0184 | pulse code: 0xC8 | Address: 0x01BA | pulse code: 0x6A |
| Address: 0x014F | pulse code: 0xC0 | Address: 0x0185 | pulse code: 0xCA | Address: 0x01BB | pulse code: 0x6E |
| Address: 0x0150 | pulse code: 0x00 | Address: 0x0186 | pulse code: 0xCC | Address: 0x01BC | pulse code: 0x72 |
| Address: 0x0151 | pulse code: 0xC2 | Address: 0x0187 | pulse code: 0xCE | Address: 0x01BD | pulse code: 0x76 |
| Address: 0x0152 | pulse code: 0xC4 | Address: 0x0188 | pulse code: 0xD0 | Address: 0x01BE | pulse code: 0x7A |
| Address: 0x0153 | pulse code: 0xC6 | Address: 0x0189 | pulse code: 0xD2 | Address: 0x01BF | pulse code: 0xC0 |
| Address: 0x0154 | pulse code: 0xC8 | Address: 0x018A | pulse code: 0xD5 | Address: 0x01C0 | pulse code: 0x80 |
| Address: 0x0155 | pulse code: 0xCA | Address: 0x018B | pulse code: 0xD7 | Address: 0x01C1 | pulse code: 0x84 |
| Address: 0x0156 | pulse code: 0xCC | Address: 0x018C | pulse code: 0xD9 | Address: 0x01C2 | pulse code: 0x88 |
| Address: 0x0157 | pulse code: 0xCE | Address: 0x018D | pulse code: 0xDB | Address: 0x01C3 | pulse code: 0x8C |
| Address: 0x0158 | pulse code: 0xD0 | Address: 0x018E | pulse code: 0xDD | Address: 0x01C4 | pulse code: 0x90 |
| Address: 0x0159 | pulse code: 0xD2 | Address: 0x018F | pulse code: 0xC0 | Address: 0x01C5 | pulse code: 0x95 |
| Address: 0x015A | pulse code: 0xD5 | Address: 0x0190 | pulse code: 0x00 | Address: 0x01C6 | pulse code: 0x99 |
| Address: 0x015B | pulse code: 0xD7 | Address: 0x0191 | pulse code: 0xC2 | Address: 0x01C7 | pulse code: 0x9D |
| Address: 0x015C | pulse code: 0xD9 | Address: 0x0192 | pulse code: 0xC4 | Address: 0x01C8 | pulse code: 0xA1 |
| Address: 0x015D | pulse code: 0xDB | Address: 0x0193 | pulse code: 0xC6 | Address: 0x01C9 | pulse code: 0xA5 |
| Address: 0x015E | pulse code: 0xDD | Address: 0x0194 | pulse code: 0xC8 | Address: 0x01CA | pulse code: 0xAA |
| Address: 0x015F | pulse code: 0xC0 | Address: 0x0195 | pulse code: 0xCA | Address: 0x01CB | pulse code: 0xAE |
| Address: 0x0160 | pulse code: 0x40 | Address: 0x0196 | pulse code: 0xCC | Address: 0x01CC | pulse code: 0xB2 |
| Address: 0x0161 | pulse code: 0x44 | Address: 0x0197 | pulse code: 0xCE | Address: 0x01CD | pulse code: 0xB6 |
| Address: 0x0162 | pulse code: 0x48 | Address: 0x0198 | pulse code: 0xD0 | Address: 0x01CE | pulse code: 0xBA |
| Address: 0x0163 | pulse code: 0x4C | Address: 0x0199 | pulse code: 0xD2 | Address: 0x01CF | pulse code: 0xC0 |
| Address: 0x0164 | pulse code: 0x50 | Address: 0x019A | pulse code: 0xD5 | Address: 0x01D0 | pulse code: 0x80 |
| Address: 0x0165 | pulse code: 0x55 | Address: 0x019B | pulse code: 0xD7 | Address: 0x01D1 | pulse code: 0x84 |
| Address: 0x0166 | pulse code: 0x59 | Address: 0x019C | pulse code: 0xD9 | Address: 0x01D2 | pulse code: 0x88 |
| Address: 0x0167 | pulse code: 0x5D | Address: 0x019D | pulse code: 0xDB | Address: 0x01D3 | pulse code: 0x8C |
| Address: 0x0168 | pulse code: 0x61 | Address: 0x019E | pulse code: 0xDD | Address: 0x01D4 | pulse code: 0x90 |
| Address: 0x0169 | pulse code: 0x65 | Address: 0x019F | pulse code: 0xC0 | Address: 0x01D5 | pulse code: 0x95 |
| Address: 0x016A | pulse code: 0x6A | Address: 0x01A0 | pulse code: 0x40 | Address: 0x01D6 | pulse code: 0x99 |
| Address: 0x016B | pulse code: 0x6E | Address: 0x01A1 | pulse code: 0x44 | Address: 0x01D7 | pulse code: 0x9D |
| Address: 0x016C | pulse code: 0x72 | Address: 0x01A2 | pulse code: 0x48 | Address: 0x01D8 | pulse code: 0xA1 |
| Address: 0x016D | pulse code: 0x76 | Address: 0x01A3 | pulse code: 0x4C | Address: 0x01D9 | pulse code: 0xA5 |
| Address: 0x016E | pulse code: 0x7A | Address: 0x01A4 | pulse code: 0x50 | Address: 0x01DA | pulse code: 0xAA |
| Address: 0x016F | pulse code: 0xC0 | Address: 0x01A5 | pulse code: 0x55 | Address: 0x01DB | pulse code: 0xAE |
| Address: 0x0170 | pulse code: 0x40 | Address: 0x01A6 | pulse code: 0x59 | Address: 0x01DC | pulse code: 0xB2 |
| Address: 0x0171 | pulse code: 0x44 | Address: 0x01A7 | pulse code: 0x5D | Address: 0x01DD | pulse code: 0xB6 |
| Address: 0x0172 | pulse code: 0x48 | Address: 0x01A8 | pulse code: 0x61 | Address: 0x01DE | pulse code: 0xBA |
| Address: 0x0173 | pulse code: 0x4C | Address: 0x01A9 | pulse code: 0x65 | Address: 0x01DF | pulse code: 0xC0 |
| Address: 0x0174 | pulse code: 0x50 | Address: 0x01AA | pulse code: 0x6A | Address: 0x01E0 | pulse code: 0x80 |
| Address: 0x0175 | pulse code: 0x55 | Address: 0x01AB | pulse code: 0x6E | Address: 0x01E1 | pulse code: 0x84 |

| | | |
|---|---|---|
| Address: 0x01E2  pulse code: 0x88 | Address: 0x0218  pulse code: 0xD0 | Address: 0x024E  pulse code: 0xDD |
| Address: 0x01E3  pulse code: 0x8C | Address: 0x0219  pulse code: 0xD2 | Address: 0x024F  pulse code: 0xC0 |
| Address: 0x01E4  pulse code: 0x90 | Address: 0x021A  pulse code: 0xD5 | Address: 0x0250  pulse code: 0x00 |
| Address: 0x01E5  pulse code: 0x95 | Address: 0x021B  pulse code: 0xD7 | Address: 0x0251  pulse code: 0xC2 |
| Address: 0x01E6  pulse code: 0x99 | Address: 0x021C  pulse code: 0xD9 | Address: 0x0252  pulse code: 0xC4 |
| Address: 0x01E7  pulse code: 0x9D | Address: 0x021D  pulse code: 0xDB | Address: 0x0253  pulse code: 0xC6 |
| Address: 0x01E8  pulse code: 0xA1 | Address: 0x021E  pulse code: 0xDD | Address: 0x0254  pulse code: 0xC8 |
| Address: 0x01E9  pulse code: 0xA5 | Address: 0x021F  pulse code: 0xC0 | Address: 0x0255  pulse code: 0xCA |
| Address: 0x01EA  pulse code: 0xAA | Address: 0x0220  pulse code: 0x00 | Address: 0x0256  pulse code: 0xCC |
| Address: 0x01EB  pulse code: 0xAE | Address: 0x0221  pulse code: 0xC2 | Address: 0x0257  pulse code: 0xCE |
| Address: 0x01EC  pulse code: 0xB2 | Address: 0x0222  pulse code: 0xC4 | Address: 0x0258  pulse code: 0xD0 |
| Address: 0x01ED  pulse code: 0xB6 | Address: 0x0223  pulse code: 0xC6 | Address: 0x0259  pulse code: 0xD2 |
| Address: 0x01EE  pulse code: 0xBA | Address: 0x0224  pulse code: 0xC8 | Address: 0x025A  pulse code: 0xD5 |
| Address: 0x01EF  pulse code: 0xC0 | Address: 0x0225  pulse code: 0xCA | Address: 0x025B  pulse code: 0xD7 |
| Address: 0x01F0  pulse code: 0x80 | Address: 0x0226  pulse code: 0xCC | Address: 0x025C  pulse code: 0xD9 |
| Address: 0x01F1  pulse code: 0x84 | Address: 0x0227  pulse code: 0xCE | Address: 0x025D  pulse code: 0xDB |
| Address: 0x01F2  pulse code: 0x88 | Address: 0x0228  pulse code: 0xD0 | Address: 0x025E  pulse code: 0xDD |
| Address: 0x01F3  pulse code: 0x8C | Address: 0x0229  pulse code: 0xD2 | Address: 0x025F  pulse code: 0xC0 |
| Address: 0x01F4  pulse code: 0x90 | Address: 0x022A  pulse code: 0xD5 | Address: 0x0260  pulse code: 0x00 |
| Address: 0x01F5  pulse code: 0x95 | Address: 0x022B  pulse code: 0xD7 | Address: 0x0261  pulse code: 0xC2 |
| Address: 0x01F6  pulse code: 0x99 | Address: 0x022C  pulse code: 0xD9 | Address: 0x0262  pulse code: 0xC4 |
| Address: 0x01F7  pulse code: 0x9D | Address: 0x022D  pulse code: 0xDB | Address: 0x0263  pulse code: 0xC6 |
| Address: 0x01F8  pulse code: 0xA1 | Address: 0x022E  pulse code: 0xDD | Address: 0x0264  pulse code: 0xC8 |
| Address: 0x01F9  pulse code: 0xA5 | Address: 0x022F  pulse code: 0xC0 | Address: 0x0265  pulse code: 0xCA |
| Address: 0x01FA  pulse code: 0xAA | Address: 0x0230  pulse code: 0x00 | Address: 0x0266  pulse code: 0xCC |
| Address: 0x01FB  pulse code: 0xAE | Address: 0x0231  pulse code: 0xC2 | Address: 0x0267  pulse code: 0xCE |
| Address: 0x01FC  pulse code: 0xB2 | Address: 0x0232  pulse code: 0xC4 | Address: 0x0268  pulse code: 0xD0 |
| Address: 0x01FD  pulse code: 0xB6 | Address: 0x0233  pulse code: 0xC6 | Address: 0x0269  pulse code: 0xD2 |
| Address: 0x01FE  pulse code: 0xBA | Address: 0x0234  pulse code: 0xC8 | Address: 0x026A  pulse code: 0xD5 |
| Address: 0x01FF  pulse code: 0xC0 | Address: 0x0235  pulse code: 0xCA | Address: 0x026B  pulse code: 0xD7 |
| Address: 0x0200  pulse code: 0x00 | Address: 0x0236  pulse code: 0xCC | Address: 0x026C  pulse code: 0xD9 |
| Address: 0x0201  pulse code: 0xC2 | Address: 0x0237  pulse code: 0xCE | Address: 0x026D  pulse code: 0xDB |
| Address: 0x0202  pulse code: 0xC4 | Address: 0x0238  pulse code: 0xD0 | Address: 0x026E  pulse code: 0xDD |
| Address: 0x0203  pulse code: 0xC6 | Address: 0x0239  pulse code: 0xD2 | Address: 0x026F  pulse code: 0xC0 |
| Address: 0x0204  pulse code: 0xC8 | Address: 0x023A  pulse code: 0xD5 | Address: 0x0270  pulse code: 0x00 |
| Address: 0x0205  pulse code: 0xCA | Address: 0x023B  pulse code: 0xD7 | Address: 0x0271  pulse code: 0x10 |
| Address: 0x0206  pulse code: 0xCC | Address: 0x023C  pulse code: 0xD9 | Address: 0x0272  pulse code: 0x12 |
| Address: 0x0207  pulse code: 0xCE | Address: 0x023D  pulse code: 0xDB | Address: 0x0273  pulse code: 0x14 |
| Address: 0x0208  pulse code: 0xD0 | Address: 0x023E  pulse code: 0xDD | Address: 0x0274  pulse code: 0x16 |
| Address: 0x0209  pulse code: 0xD2 | Address: 0x023F  pulse code: 0xC0 | Address: 0x0275  pulse code: 0x19 |
| Address: 0x020A  pulse code: 0xD5 | Address: 0x0240  pulse code: 0x00 | Address: 0x0276  pulse code: 0x1C |
| Address: 0x020B  pulse code: 0xD7 | Address: 0x0241  pulse code: 0xC2 | Address: 0x0277  pulse code: 0x20 |
| Address: 0x020C  pulse code: 0xD9 | Address: 0x0242  pulse code: 0xC4 | Address: 0x0278  pulse code: 0x23 |
| Address: 0x020D  pulse code: 0xDB | Address: 0x0243  pulse code: 0xC6 | Address: 0x0279  pulse code: 0x26 |
| Address: 0x020E  pulse code: 0xDD | Address: 0x0244  pulse code: 0xC8 | Address: 0x027A  pulse code: 0x2A |
| Address: 0x020F  pulse code: 0xC0 | Address: 0x0245  pulse code: 0xCA | Address: 0x027B  pulse code: 0x2E |
| Address: 0x0210  pulse code: 0x00 | Address: 0x0246  pulse code: 0xCC | Address: 0x027C  pulse code: 0x32 |
| Address: 0x0211  pulse code: 0xC2 | Address: 0x0247  pulse code: 0xCE | Address: 0x027D  pulse code: 0x36 |
| Address: 0x0212  pulse code: 0xC4 | Address: 0x0248  pulse code: 0xD0 | Address: 0x027E  pulse code: 0x3A |
| Address: 0x0213  pulse code: 0xC6 | Address: 0x0249  pulse code: 0xD2 | Address: 0x027F  pulse code: 0xC0 |
| Address: 0x0214  pulse code: 0xC8 | Address: 0x024A  pulse code: 0xD5 | Address: 0x0280  pulse code: 0x00 |
| Address: 0x0215  pulse code: 0xCA | Address: 0x024B  pulse code: 0xD7 | Address: 0x0281  pulse code: 0xC2 |
| Address: 0x0216  pulse code: 0xCC | Address: 0x024C  pulse code: 0xD9 | Address: 0x0282  pulse code: 0xC4 |
| Address: 0x0217  pulse code: 0xCE | Address: 0x024D  pulse code: 0xDB | Address: 0x0283  pulse code: 0xC6 |

| | | | | | |
|---|---|---|---|---|---|
| Address: 0x0284 | pulse code: 0xC8 | Address: 0x02BA | pulse code: 0xD5 | Address: 0x02F0 | pulse code: 0x80 |
| Address: 0x0285 | pulse code: 0xCA | Address: 0x02BB | pulse code: 0xD7 | Address: 0x02F1 | pulse code: 0x84 |
| Address: 0x0286 | pulse code: 0xCC | Address: 0x02BC | pulse code: 0xD9 | Address: 0x02F2 | pulse code: 0x88 |
| Address: 0x0287 | pulse code: 0xCE | Address: 0x02BD | pulse code: 0xDB | Address: 0x02F3 | pulse code: 0x8C |
| Address: 0x0288 | pulse code: 0xD0 | Address: 0x02BE | pulse code: 0xDD | Address: 0x02F4 | pulse code: 0x90 |
| Address: 0x0289 | pulse code: 0xD2 | Address: 0x02BF | pulse code: 0xC0 | Address: 0x02F5 | pulse code: 0x95 |
| Address: 0x028A | pulse code: 0xD5 | Address: 0x02C0 | pulse code: 0x80 | Address: 0x02F6 | pulse code: 0x99 |
| Address: 0x028B | pulse code: 0xD7 | Address: 0x02C1 | pulse code: 0x84 | Address: 0x02F7 | pulse code: 0x9D |
| Address: 0x028C | pulse code: 0xD9 | Address: 0x02C2 | pulse code: 0x88 | Address: 0x02F8 | pulse code: 0xA1 |
| Address: 0x028D | pulse code: 0xDB | Address: 0x02C3 | pulse code: 0x8C | Address: 0x02F9 | pulse code: 0xA5 |
| Address: 0x028E | pulse code: 0xDD | Address: 0x02C4 | pulse code: 0x90 | Address: 0x02FA | pulse code: 0xAA |
| Address: 0x028F | pulse code: 0xC0 | Address: 0x02C5 | pulse code: 0x95 | Address: 0x02FB | pulse code: 0xAE |
| Address: 0x0290 | pulse code: 0x00 | Address: 0x02C6 | pulse code: 0x99 | Address: 0x02FC | pulse code: 0xB2 |
| Address: 0x0291 | pulse code: 0xC2 | Address: 0x02C7 | pulse code: 0x9D | Address: 0x02FD | pulse code: 0xB6 |
| Address: 0x0292 | pulse code: 0xC4 | Address: 0x02C8 | pulse code: 0xA1 | Address: 0x02FE | pulse code: 0xBA |
| Address: 0x0293 | pulse code: 0xC6 | Address: 0x02C9 | pulse code: 0xA5 | Address: 0x02FF | pulse code: 0xC0 |
| Address: 0x0294 | pulse code: 0xC8 | Address: 0x02CA | pulse code: 0xAA | Address: 0x0300 | pulse code: 0x00 |
| Address: 0x0295 | pulse code: 0xCA | Address: 0x02CB | pulse code: 0xAE | Address: 0x0301 | pulse code: 0xC2 |
| Address: 0x0296 | pulse code: 0xCC | Address: 0x02CC | pulse code: 0xB2 | Address: 0x0302 | pulse code: 0xC4 |
| Address: 0x0297 | pulse code: 0xCE | Address: 0x02CD | pulse code: 0xB6 | Address: 0x0303 | pulse code: 0xC6 |
| Address: 0x0298 | pulse code: 0xD0 | Address: 0x02CE | pulse code: 0xBA | Address: 0x0304 | pulse code: 0xC8 |
| Address: 0x0299 | pulse code: 0xD2 | Address: 0x02CF | pulse code: 0xC0 | Address: 0x0305 | pulse code: 0xCA |
| Address: 0x029A | pulse code: 0xD5 | Address: 0x02D0 | pulse code: 0x80 | Address: 0x0306 | pulse code: 0xCC |
| Address: 0x029B | pulse code: 0xD7 | Address: 0x02D1 | pulse code: 0x84 | Address: 0x0307 | pulse code: 0xCE |
| Address: 0x029C | pulse code: 0xD9 | Address: 0x02D2 | pulse code: 0x88 | Address: 0x0308 | pulse code: 0xD0 |
| Address: 0x029D | pulse code: 0xDB | Address: 0x02D3 | pulse code: 0x8C | Address: 0x0309 | pulse code: 0xD2 |
| Address: 0x029E | pulse code: 0xDD | Address: 0x02D4 | pulse code: 0x90 | Address: 0x030A | pulse code: 0xD5 |
| Address: 0x029F | pulse code: 0xC0 | Address: 0x02D5 | pulse code: 0x95 | Address: 0x030B | pulse code: 0xD7 |
| Address: 0x02A0 | pulse code: 0x00 | Address: 0x02D6 | pulse code: 0x99 | Address: 0x030C | pulse code: 0xD9 |
| Address: 0x02A1 | pulse code: 0xC2 | Address: 0x02D7 | pulse code: 0x9D | Address: 0x030D | pulse code: 0xDB |
| Address: 0x02A2 | pulse code: 0xC4 | Address: 0x02D8 | pulse code: 0xA1 | Address: 0x030E | pulse code: 0xDD |
| Address: 0x02A3 | pulse code: 0xC6 | Address: 0x02D9 | pulse code: 0xA5 | Address: 0x030F | pulse code: 0xC0 |
| Address: 0x02A4 | pulse code: 0xC8 | Address: 0x02DA | pulse code: 0xAA | Address: 0x0310 | pulse code: 0x00 |
| Address: 0x02A5 | pulse code: 0xCA | Address: 0x02DB | pulse code: 0xAE | Address: 0x0311 | pulse code: 0xC2 |
| Address: 0x02A6 | pulse code: 0xCC | Address: 0x02DC | pulse code: 0xB2 | Address: 0x0312 | pulse code: 0xC4 |
| Address: 0x02A7 | pulse code: 0xCE | Address: 0x02DD | pulse code: 0xB6 | Address: 0x0313 | pulse code: 0xC6 |
| Address: 0x02A8 | pulse code: 0xD0 | Address: 0x02DE | pulse code: 0xBA | Address: 0x0314 | pulse code: 0xC8 |
| Address: 0x02A9 | pulse code: 0xD2 | Address: 0x02DF | pulse code: 0xC0 | Address: 0x0315 | pulse code: 0xCA |
| Address: 0x02AA | pulse code: 0xD5 | Address: 0x02E0 | pulse code: 0x80 | Address: 0x0316 | pulse code: 0xCC |
| Address: 0x02AB | pulse code: 0xD7 | Address: 0x02E1 | pulse code: 0x84 | Address: 0x0317 | pulse code: 0xCE |
| Address: 0x02AC | pulse code: 0xD9 | Address: 0x02E2 | pulse code: 0x88 | Address: 0x0318 | pulse code: 0xD0 |
| Address: 0x02AD | pulse code: 0xDB | Address: 0x02E3 | pulse code: 0x8C | Address: 0x0319 | pulse code: 0xD2 |
| Address: 0x02AE | pulse code: 0xDD | Address: 0x02E4 | pulse code: 0x90 | Address: 0x031A | pulse code: 0xD5 |
| Address: 0x02AF | pulse code: 0xC0 | Address: 0x02E5 | pulse code: 0x95 | Address: 0x031B | pulse code: 0xD7 |
| Address: 0x02B0 | pulse code: 0x00 | Address: 0x02E6 | pulse code: 0x99 | Address: 0x031C | pulse code: 0xD9 |
| Address: 0x02B1 | pulse code: 0xC2 | Address: 0x02E7 | pulse code: 0x9D | Address: 0x031D | pulse code: 0xDB |
| Address: 0x02B2 | pulse code: 0xC4 | Address: 0x02E8 | pulse code: 0xA1 | Address: 0x031E | pulse code: 0xDD |
| Address: 0x02B3 | pulse code: 0xC6 | Address: 0x02E9 | pulse code: 0xA5 | Address: 0x031F | pulse code: 0xC0 |
| Address: 0x02B4 | pulse code: 0xC8 | Address: 0x02EA | pulse code: 0xAA | Address: 0x0320 | pulse code: 0x40 |
| Address: 0x02B5 | pulse code: 0xCA | Address: 0x02EB | pulse code: 0xAE | Address: 0x0321 | pulse code: 0x44 |
| Address: 0x02B6 | pulse code: 0xCC | Address: 0x02EC | pulse code: 0xB2 | Address: 0x0322 | pulse code: 0x48 |
| Address: 0x02B7 | pulse code: 0xCE | Address: 0x02ED | pulse code: 0xB6 | Address: 0x0323 | pulse code: 0x4C |
| Address: 0x02B8 | pulse code: 0xD0 | Address: 0x02EE | pulse code: 0xBA | Address: 0x0324 | pulse code: 0x50 |
| Address: 0x02B9 | pulse code: 0xD2 | Address: 0x02EF | pulse code: 0xC0 | Address: 0x0325 | pulse code: 0x55 |

| | | |
|---|---|---|
| Address: 0x0326 pulse code: 0x59 | Address: 0x035C pulse code: 0xD9 | Address: 0x0392 pulse code: 0xC4 |
| Address: 0x0327 pulse code: 0x5D | Address: 0x035D pulse code: 0xDB | Address: 0x0393 pulse code: 0xC6 |
| Address: 0x0328 pulse code: 0x61 | Address: 0x035E pulse code: 0xDD | Address: 0x0394 pulse code: 0xC8 |
| Address: 0x0329 pulse code: 0x65 | Address: 0x035F pulse code: 0xC0 | Address: 0x0395 pulse code: 0xCA |
| Address: 0x032A pulse code: 0x6A | Address: 0x0360 pulse code: 0x40 | Address: 0x0396 pulse code: 0xCC |
| Address: 0x032B pulse code: 0x6E | Address: 0x0361 pulse code: 0x44 | Address: 0x0397 pulse code: 0xCE |
| Address: 0x032C pulse code: 0x72 | Address: 0x0362 pulse code: 0x48 | Address: 0x0398 pulse code: 0xD0 |
| Address: 0x032D pulse code: 0x76 | Address: 0x0363 pulse code: 0x4C | Address: 0x0399 pulse code: 0xD2 |
| Address: 0x032E pulse code: 0x7A | Address: 0x0364 pulse code: 0x50 | Address: 0x039A pulse code: 0xD5 |
| Address: 0x032F pulse code: 0xC0 | Address: 0x0365 pulse code: 0x55 | Address: 0x039B pulse code: 0xD7 |
| Address: 0x0330 pulse code: 0x40 | Address: 0x0366 pulse code: 0x59 | Address: 0x039C pulse code: 0xD9 |
| Address: 0x0331 pulse code: 0x44 | Address: 0x0367 pulse code: 0x5D | Address: 0x039D pulse code: 0xDB |
| Address: 0x0332 pulse code: 0x48 | Address: 0x0368 pulse code: 0x61 | Address: 0x039E pulse code: 0xDD |
| Address: 0x0333 pulse code: 0x4C | Address: 0x0369 pulse code: 0x65 | Address: 0x039F pulse code: 0xC0 |
| Address: 0x0334 pulse code: 0x50 | Address: 0x036A pulse code: 0x6A | Address: 0x03A0 pulse code: 0x40 |
| Address: 0x0335 pulse code: 0x55 | Address: 0x036B pulse code: 0x6E | Address: 0x03A1 pulse code: 0x44 |
| Address: 0x0336 pulse code: 0x59 | Address: 0x036C pulse code: 0x72 | Address: 0x03A2 pulse code: 0x48 |
| Address: 0x0337 pulse code: 0x5D | Address: 0x036D pulse code: 0x76 | Address: 0x03A3 pulse code: 0x4C |
| Address: 0x0338 pulse code: 0x61 | Address: 0x036E pulse code: 0x7A | Address: 0x03A4 pulse code: 0x50 |
| Address: 0x0339 pulse code: 0x65 | Address: 0x036F pulse code: 0xC0 | Address: 0x03A5 pulse code: 0x55 |
| Address: 0x033A pulse code: 0x6A | Address: 0x0370 pulse code: 0x40 | Address: 0x03A6 pulse code: 0x59 |
| Address: 0x033B pulse code: 0x6E | Address: 0x0371 pulse code: 0x44 | Address: 0x03A7 pulse code: 0x5D |
| Address: 0x033C pulse code: 0x72 | Address: 0x0372 pulse code: 0x48 | Address: 0x03A8 pulse code: 0x61 |
| Address: 0x033D pulse code: 0x76 | Address: 0x0373 pulse code: 0x4C | Address: 0x03A9 pulse code: 0x65 |
| Address: 0x033E pulse code: 0x7A | Address: 0x0374 pulse code: 0x50 | Address: 0x03AA pulse code: 0x6A |
| Address: 0x033F pulse code: 0xC0 | Address: 0x0375 pulse code: 0x55 | Address: 0x03AB pulse code: 0x6E |
| Address: 0x0340 pulse code: 0x00 | Address: 0x0376 pulse code: 0x59 | Address: 0x03AC pulse code: 0x72 |
| Address: 0x0341 pulse code: 0xC2 | Address: 0x0377 pulse code: 0x5D | Address: 0x03AD pulse code: 0x76 |
| Address: 0x0342 pulse code: 0xC4 | Address: 0x0378 pulse code: 0x61 | Address: 0x03AE pulse code: 0x7A |
| Address: 0x0343 pulse code: 0xC6 | Address: 0x0379 pulse code: 0x65 | Address: 0x03AF pulse code: 0xC0 |
| Address: 0x0344 pulse code: 0xC8 | Address: 0x037A pulse code: 0x6A | Address: 0x03B0 pulse code: 0x40 |
| Address: 0x0345 pulse code: 0xCA | Address: 0x037B pulse code: 0x6E | Address: 0x03B1 pulse code: 0x44 |
| Address: 0x0346 pulse code: 0xCC | Address: 0x037C pulse code: 0x72 | Address: 0x03B2 pulse code: 0x48 |
| Address: 0x0347 pulse code: 0xCE | Address: 0x037D pulse code: 0x76 | Address: 0x03B3 pulse code: 0x4C |
| Address: 0x0348 pulse code: 0xD0 | Address: 0x037E pulse code: 0x7A | Address: 0x03B4 pulse code: 0x50 |
| Address: 0x0349 pulse code: 0xD2 | Address: 0x037F pulse code: 0xC0 | Address: 0x03B5 pulse code: 0x55 |
| Address: 0x034A pulse code: 0xD5 | Address: 0x0380 pulse code: 0x00 | Address: 0x03B6 pulse code: 0x59 |
| Address: 0x034B pulse code: 0xD7 | Address: 0x0381 pulse code: 0xC2 | Address: 0x03B7 pulse code: 0x5D |
| Address: 0x034C pulse code: 0xD9 | Address: 0x0382 pulse code: 0xC4 | Address: 0x03B8 pulse code: 0x61 |
| Address: 0x034D pulse code: 0xDB | Address: 0x0383 pulse code: 0xC6 | Address: 0x03B9 pulse code: 0x65 |
| Address: 0x034E pulse code: 0xDD | Address: 0x0384 pulse code: 0xC8 | Address: 0x03BA pulse code: 0x6A |
| Address: 0x034F pulse code: 0xC0 | Address: 0x0385 pulse code: 0xCA | Address: 0x03BB pulse code: 0x6E |
| Address: 0x0350 pulse code: 0x00 | Address: 0x0386 pulse code: 0xCC | Address: 0x03BC pulse code: 0x72 |
| Address: 0x0351 pulse code: 0xC2 | Address: 0x0387 pulse code: 0xCE | Address: 0x03BD pulse code: 0x76 |
| Address: 0x0352 pulse code: 0xC4 | Address: 0x0388 pulse code: 0xD0 | Address: 0x03BE pulse code: 0x7A |
| Address: 0x0353 pulse code: 0xC6 | Address: 0x0389 pulse code: 0xD2 | Address: 0x03BF pulse code: 0xC0 |
| Address: 0x0354 pulse code: 0xC8 | Address: 0x038A pulse code: 0xD5 | Address: 0x03C0 pulse code: 0x80 |
| Address: 0x0355 pulse code: 0xCA | Address: 0x038B pulse code: 0xD7 | Address: 0x03C1 pulse code: 0x84 |
| Address: 0x0356 pulse code: 0xCC | Address: 0x038C pulse code: 0xD9 | Address: 0x03C2 pulse code: 0x88 |
| Address: 0x0357 pulse code: 0xCE | Address: 0x038D pulse code: 0xDB | Address: 0x03C3 pulse code: 0x8C |
| Address: 0x0358 pulse code: 0xD0 | Address: 0x038E pulse code: 0xDD | Address: 0x03C4 pulse code: 0x90 |
| Address: 0x0359 pulse code: 0xD2 | Address: 0x038F pulse code: 0xC0 | Address: 0x03C5 pulse code: 0x95 |
| Address: 0x035A pulse code: 0xD5 | Address: 0x0390 pulse code: 0x00 | Address: 0x03C6 pulse code: 0x99 |
| Address: 0x035B pulse code: 0xD7 | Address: 0x0391 pulse code: 0xC2 | Address: 0x03C7 pulse code: 0x9D |

| | | | | | |
|---|---|---|---|---|---|
| Address: 0x03C8 | pulse code: 0xA1 | Address: 0x03FE | pulse code: 0xBA | Address: 0x0434 | pulse code: 0xC8 |
| Address: 0x03C9 | pulse code: 0xA5 | Address: 0x03FF | pulse code: 0xC0 | Address: 0x0435 | pulse code: 0xCA |
| Address: 0x03CA | pulse code: 0xAA | Address: 0x0400 | pulse code: 0x00 | Address: 0x0436 | pulse code: 0xCC |
| Address: 0x03CB | pulse code: 0xAE | Address: 0x0401 | pulse code: 0xC2 | Address: 0x0437 | pulse code: 0xCE |
| Address: 0x03CC | pulse code: 0xB2 | Address: 0x0402 | pulse code: 0xC4 | Address: 0x0438 | pulse code: 0xD0 |
| Address: 0x03CD | pulse code: 0xB6 | Address: 0x0403 | pulse code: 0xC6 | Address: 0x0439 | pulse code: 0xD2 |
| Address: 0x03CE | pulse code: 0xBA | Address: 0x0404 | pulse code: 0xC8 | Address: 0x043A | pulse code: 0xD5 |
| Address: 0x03CF | pulse code: 0xC0 | Address: 0x0405 | pulse code: 0xCA | Address: 0x043B | pulse code: 0xD7 |
| Address: 0x03D0 | pulse code: 0x80 | Address: 0x0406 | pulse code: 0xCC | Address: 0x043C | pulse code: 0xD9 |
| Address: 0x03D1 | pulse code: 0x84 | Address: 0x0407 | pulse code: 0xCE | Address: 0x043D | pulse code: 0xDB |
| Address: 0x03D2 | pulse code: 0x88 | Address: 0x0408 | pulse code: 0xD0 | Address: 0x043E | pulse code: 0xDD |
| Address: 0x03D3 | pulse code: 0x8C | Address: 0x0409 | pulse code: 0xD2 | Address: 0x043F | pulse code: 0xC0 |
| Address: 0x03D4 | pulse code: 0x90 | Address: 0x040A | pulse code: 0xD5 | Address: 0x0440 | pulse code: 0x00 |
| Address: 0x03D5 | pulse code: 0x95 | Address: 0x040B | pulse code: 0xD7 | Address: 0x0441 | pulse code: 0xC2 |
| Address: 0x03D6 | pulse code: 0x99 | Address: 0x040C | pulse code: 0xD9 | Address: 0x0442 | pulse code: 0xC4 |
| Address: 0x03D7 | pulse code: 0x9D | Address: 0x040D | pulse code: 0xDB | Address: 0x0443 | pulse code: 0xC6 |
| Address: 0x03D8 | pulse code: 0xA1 | Address: 0x040E | pulse code: 0xDD | Address: 0x0444 | pulse code: 0xC8 |
| Address: 0x03D9 | pulse code: 0xA5 | Address: 0x040F | pulse code: 0xC0 | Address: 0x0445 | pulse code: 0xCA |
| Address: 0x03DA | pulse code: 0xAA | Address: 0x0410 | pulse code: 0x00 | Address: 0x0446 | pulse code: 0xCC |
| Address: 0x03DB | pulse code: 0xAE | Address: 0x0411 | pulse code: 0xC2 | Address: 0x0447 | pulse code: 0xCE |
| Address: 0x03DC | pulse code: 0xB2 | Address: 0x0412 | pulse code: 0xC4 | Address: 0x0448 | pulse code: 0xD0 |
| Address: 0x03DD | pulse code: 0xB6 | Address: 0x0413 | pulse code: 0xC6 | Address: 0x0449 | pulse code: 0xD2 |
| Address: 0x03DE | pulse code: 0xBA | Address: 0x0414 | pulse code: 0xC8 | Address: 0x044A | pulse code: 0xD5 |
| Address: 0x03DF | pulse code: 0xC0 | Address: 0x0415 | pulse code: 0xCA | Address: 0x044B | pulse code: 0xD7 |
| Address: 0x03E0 | pulse code: 0x80 | Address: 0x0416 | pulse code: 0xCC | Address: 0x044C | pulse code: 0xD9 |
| Address: 0x03E1 | pulse code: 0x84 | Address: 0x0417 | pulse code: 0xCE | Address: 0x044D | pulse code: 0xDB |
| Address: 0x03E2 | pulse code: 0x88 | Address: 0x0418 | pulse code: 0xD0 | Address: 0x044E | pulse code: 0xDD |
| Address: 0x03E3 | pulse code: 0x8C | Address: 0x0419 | pulse code: 0xD2 | Address: 0x044F | pulse code: 0xC0 |
| Address: 0x03E4 | pulse code: 0x90 | Address: 0x041A | pulse code: 0xD5 | Address: 0x0450 | pulse code: 0x00 |
| Address: 0x03E5 | pulse code: 0x95 | Address: 0x041B | pulse code: 0xD7 | Address: 0x0451 | pulse code: 0xC2 |
| Address: 0x03E6 | pulse code: 0x99 | Address: 0x041C | pulse code: 0xD9 | Address: 0x0452 | pulse code: 0xC4 |
| Address: 0x03E7 | pulse code: 0x9D | Address: 0x041D | pulse code: 0xDB | Address: 0x0453 | pulse code: 0xC6 |
| Address: 0x03E8 | pulse code: 0xA1 | Address: 0x041E | pulse code: 0xDD | Address: 0x0454 | pulse code: 0xC8 |
| Address: 0x03E9 | pulse code: 0xA5 | Address: 0x041F | pulse code: 0xC0 | Address: 0x0455 | pulse code: 0xCA |
| Address: 0x03EA | pulse code: 0xAA | Address: 0x0420 | pulse code: 0x00 | Address: 0x0456 | pulse code: 0xCC |
| Address: 0x03EB | pulse code: 0xAE | Address: 0x0421 | pulse code: 0xC2 | Address: 0x0457 | pulse code: 0xCE |
| Address: 0x03EC | pulse code: 0xB2 | Address: 0x0422 | pulse code: 0xC4 | Address: 0x0458 | pulse code: 0xD0 |
| Address: 0x03ED | pulse code: 0xB6 | Address: 0x0423 | pulse code: 0xC6 | Address: 0x0459 | pulse code: 0xD2 |
| Address: 0x03EE | pulse code: 0xBA | Address: 0x0424 | pulse code: 0xC8 | Address: 0x045A | pulse code: 0xD5 |
| Address: 0x03EF | pulse code: 0xC0 | Address: 0x0425 | pulse code: 0xCA | Address: 0x045B | pulse code: 0xD7 |
| Address: 0x03F0 | pulse code: 0x80 | Address: 0x0426 | pulse code: 0xCC | Address: 0x045C | pulse code: 0xD9 |
| Address: 0x03F1 | pulse code: 0x84 | Address: 0x0427 | pulse code: 0xCE | Address: 0x045D | pulse code: 0xDB |
| Address: 0x03F2 | pulse code: 0x88 | Address: 0x0428 | pulse code: 0xD0 | Address: 0x045E | pulse code: 0xDD |
| Address: 0x03F3 | pulse code: 0x8C | Address: 0x0429 | pulse code: 0xD2 | Address: 0x045F | pulse code: 0xC0 |
| Address: 0x03F4 | pulse code: 0x90 | Address: 0x042A | pulse code: 0xD5 | Address: 0x0460 | pulse code: 0x00 |
| Address: 0x03F5 | pulse code: 0x95 | Address: 0x042B | pulse code: 0xD7 | Address: 0x0461 | pulse code: 0xC2 |
| Address: 0x03F6 | pulse code: 0x99 | Address: 0x042C | pulse code: 0xD9 | Address: 0x0462 | pulse code: 0xC4 |
| Address: 0x03F7 | pulse code: 0x9D | Address: 0x042D | pulse code: 0xDB | Address: 0x0463 | pulse code: 0xC6 |
| Address: 0x03F8 | pulse code: 0xA1 | Address: 0x042E | pulse code: 0xDD | Address: 0x0464 | pulse code: 0xC8 |
| Address: 0x03F9 | pulse code: 0xA5 | Address: 0x042F | pulse code: 0xC0 | Address: 0x0465 | pulse code: 0xCA |
| Address: 0x03FA | pulse code: 0xAA | Address: 0x0430 | pulse code: 0x00 | Address: 0x0466 | pulse code: 0xCC |
| Address: 0x03FB | pulse code: 0xAE | Address: 0x0431 | pulse code: 0xC2 | Address: 0x0467 | pulse code: 0xCE |
| Address: 0x03FC | pulse code: 0xB2 | Address: 0x0432 | pulse code: 0xC4 | Address: 0x0468 | pulse code: 0xD0 |
| Address: 0x03FD | pulse code: 0xB6 | Address: 0x0433 | pulse code: 0xC6 | Address: 0x0469 | pulse code: 0xD2 |

| | | |
|---|---|---|
| Address: 0x046A   pulse code: 0xD5 | Address: 0x04A0   pulse code: 0x00 | Address: 0x04D6   pulse code: 0x99 |
| Address: 0x046B   pulse code: 0xD7 | Address: 0x04A1   pulse code: 0xC2 | Address: 0x04D7   pulse code: 0x9D |
| Address: 0x046C   pulse code: 0xD9 | Address: 0x04A2   pulse code: 0xC4 | Address: 0x04D8   pulse code: 0xA1 |
| Address: 0x046D   pulse code: 0xDB | Address: 0x04A3   pulse code: 0xC6 | Address: 0x04D9   pulse code: 0xA5 |
| Address: 0x046E   pulse code: 0xDD | Address: 0x04A4   pulse code: 0xC8 | Address: 0x04DA   pulse code: 0xAA |
| Address: 0x046F   pulse code: 0xC0 | Address: 0x04A5   pulse code: 0xCA | Address: 0x04DB   pulse code: 0xAE |
| Address: 0x0470   pulse code: 0x00 | Address: 0x04A6   pulse code: 0xCC | Address: 0x04DC   pulse code: 0xB2 |
| Address: 0x0471   pulse code: 0x04 | Address: 0x04A7   pulse code: 0xCE | Address: 0x04DD   pulse code: 0xB6 |
| Address: 0x0472   pulse code: 0x08 | Address: 0x04A8   pulse code: 0xD0 | Address: 0x04DE   pulse code: 0xBA |
| Address: 0x0473   pulse code: 0x0C | Address: 0x04A9   pulse code: 0xD2 | Address: 0x04DF   pulse code: 0xC0 |
| Address: 0x0474   pulse code: 0x10 | Address: 0x04AA   pulse code: 0xD5 | Address: 0x04E0   pulse code: 0x80 |
| Address: 0x0475   pulse code: 0x15 | Address: 0x04AB   pulse code: 0xD7 | Address: 0x04E1   pulse code: 0x84 |
| Address: 0x0476   pulse code: 0x19 | Address: 0x04AC   pulse code: 0xD9 | Address: 0x04E2   pulse code: 0x88 |
| Address: 0x0477   pulse code: 0x1D | Address: 0x04AD   pulse code: 0xDB | Address: 0x04E3   pulse code: 0x8C |
| Address: 0x0478   pulse code: 0x21 | Address: 0x04AE   pulse code: 0xDD | Address: 0x04E4   pulse code: 0x90 |
| Address: 0x0479   pulse code: 0x25 | Address: 0x04AF   pulse code: 0xC0 | Address: 0x04E5   pulse code: 0x95 |
| Address: 0x047A   pulse code: 0x2A | Address: 0x04B0   pulse code: 0x00 | Address: 0x04E6   pulse code: 0x99 |
| Address: 0x047B   pulse code: 0x2E | Address: 0x04B1   pulse code: 0xC2 | Address: 0x04E7   pulse code: 0x9D |
| Address: 0x047C   pulse code: 0x32 | Address: 0x04B2   pulse code: 0xC4 | Address: 0x04E8   pulse code: 0xA1 |
| Address: 0x047D   pulse code: 0x36 | Address: 0x04B3   pulse code: 0xC6 | Address: 0x04E9   pulse code: 0xA5 |
| Address: 0x047E   pulse code: 0x3A | Address: 0x04B4   pulse code: 0xC8 | Address: 0x04EA   pulse code: 0xAA |
| Address: 0x047F   pulse code: 0xC0 | Address: 0x04B5   pulse code: 0xCA | Address: 0x04EB   pulse code: 0xAE |
| Address: 0x0480   pulse code: 0x00 | Address: 0x04B6   pulse code: 0xCC | Address: 0x04EC   pulse code: 0xB2 |
| Address: 0x0481   pulse code: 0xC2 | Address: 0x04B7   pulse code: 0xCE | Address: 0x04ED   pulse code: 0xB6 |
| Address: 0x0482   pulse code: 0xC4 | Address: 0x04B8   pulse code: 0xD0 | Address: 0x04EE   pulse code: 0xBA |
| Address: 0x0483   pulse code: 0xC6 | Address: 0x04B9   pulse code: 0xD2 | Address: 0x04EF   pulse code: 0xC0 |
| Address: 0x0484   pulse code: 0xC8 | Address: 0x04BA   pulse code: 0xD5 | Address: 0x04F0   pulse code: 0x80 |
| Address: 0x0485   pulse code: 0xCA | Address: 0x04BB   pulse code: 0xD7 | Address: 0x04F1   pulse code: 0x84 |
| Address: 0x0486   pulse code: 0xCC | Address: 0x04BC   pulse code: 0xD9 | Address: 0x04F2   pulse code: 0x88 |
| Address: 0x0487   pulse code: 0xCE | Address: 0x04BD   pulse code: 0xDB | Address: 0x04F3   pulse code: 0x8C |
| Address: 0x0488   pulse code: 0xD0 | Address: 0x04BE   pulse code: 0xDD | Address: 0x04F4   pulse code: 0x90 |
| Address: 0x0489   pulse code: 0xD2 | Address: 0x04BF   pulse code: 0xC0 | Address: 0x04F5   pulse code: 0x95 |
| Address: 0x048A   pulse code: 0xD5 | Address: 0x04C0   pulse code: 0x80 | Address: 0x04F6   pulse code: 0x99 |
| Address: 0x048B   pulse code: 0xD7 | Address: 0x04C1   pulse code: 0x84 | Address: 0x04F7   pulse code: 0x9D |
| Address: 0x048C   pulse code: 0xD9 | Address: 0x04C2   pulse code: 0x88 | Address: 0x04F8   pulse code: 0xA1 |
| Address: 0x048D   pulse code: 0xDB | Address: 0x04C3   pulse code: 0x8C | Address: 0x04F9   pulse code: 0xA5 |
| Address: 0x048E   pulse code: 0xDD | Address: 0x04C4   pulse code: 0x90 | Address: 0x04FA   pulse code: 0xAA |
| Address: 0x048F   pulse code: 0xC0 | Address: 0x04C5   pulse code: 0x95 | Address: 0x04FB   pulse code: 0xAE |
| Address: 0x0490   pulse code: 0x00 | Address: 0x04C6   pulse code: 0x99 | Address: 0x04FC   pulse code: 0xB2 |
| Address: 0x0491   pulse code: 0xC2 | Address: 0x04C7   pulse code: 0x9D | Address: 0x04FD   pulse code: 0xB6 |
| Address: 0x0492   pulse code: 0xC4 | Address: 0x04C8   pulse code: 0xA1 | Address: 0x04FE   pulse code: 0xBA |
| Address: 0x0493   pulse code: 0xC6 | Address: 0x04C9   pulse code: 0xA5 | Address: 0x04FF   pulse code: 0xC0 |
| Address: 0x0494   pulse code: 0xC8 | Address: 0x04CA   pulse code: 0xAA | Address: 0x0500   pulse code: 0x00 |
| Address: 0x0495   pulse code: 0xCA | Address: 0x04CB   pulse code: 0xAE | Address: 0x0501   pulse code: 0xC2 |
| Address: 0x0496   pulse code: 0xCC | Address: 0x04CC   pulse code: 0xB2 | Address: 0x0502   pulse code: 0xC4 |
| Address: 0x0497   pulse code: 0xCE | Address: 0x04CD   pulse code: 0xB6 | Address: 0x0503   pulse code: 0xC6 |
| Address: 0x0498   pulse code: 0xD0 | Address: 0x04CE   pulse code: 0xBA | Address: 0x0504   pulse code: 0xC8 |
| Address: 0x0499   pulse code: 0xD2 | Address: 0x04CF   pulse code: 0xC0 | Address: 0x0505   pulse code: 0xCA |
| Address: 0x049A   pulse code: 0xD5 | Address: 0x04D0   pulse code: 0x80 | Address: 0x0506   pulse code: 0xCC |
| Address: 0x049B   pulse code: 0xD7 | Address: 0x04D1   pulse code: 0x84 | Address: 0x0507   pulse code: 0xCE |
| Address: 0x049C   pulse code: 0xD9 | Address: 0x04D2   pulse code: 0x88 | Address: 0x0508   pulse code: 0xD0 |
| Address: 0x049D   pulse code: 0xDB | Address: 0x04D3   pulse code: 0x8C | Address: 0x0509   pulse code: 0xD2 |
| Address: 0x049E   pulse code: 0xDD | Address: 0x04D4   pulse code: 0x90 | Address: 0x050A   pulse code: 0xD5 |
| Address: 0x049F   pulse code: 0xC0 | Address: 0x04D5   pulse code: 0x95 | Address: 0x050B   pulse code: 0xD7 |

41

| Address: 0x050C | pulse code: 0xD9 | Address: 0x0542 | pulse code: 0xC4 | Address: 0x0578 | pulse code: 0x61 |
| --- | --- | --- | --- | --- | --- |
| Address: 0x050D | pulse code: 0xDB | Address: 0x0543 | pulse code: 0xC6 | Address: 0x0579 | pulse code: 0x65 |
| Address: 0x050E | pulse code: 0xDD | Address: 0x0544 | pulse code: 0xC8 | Address: 0x057A | pulse code: 0x6A |
| Address: 0x050F | pulse code: 0xC0 | Address: 0x0545 | pulse code: 0xCA | Address: 0x057B | pulse code: 0x6E |
| Address: 0x0510 | pulse code: 0x00 | Address: 0x0546 | pulse code: 0xCC | Address: 0x057C | pulse code: 0x72 |
| Address: 0x0511 | pulse code: 0xC2 | Address: 0x0547 | pulse code: 0xCE | Address: 0x057D | pulse code: 0x76 |
| Address: 0x0512 | pulse code: 0xC4 | Address: 0x0548 | pulse code: 0xD0 | Address: 0x057E | pulse code: 0x7A |
| Address: 0x0513 | pulse code: 0xC6 | Address: 0x0549 | pulse code: 0xD2 | Address: 0x057F | pulse code: 0xC0 |
| Address: 0x0514 | pulse code: 0xC8 | Address: 0x054A | pulse code: 0xD5 | Address: 0x0580 | pulse code: 0x00 |
| Address: 0x0515 | pulse code: 0xCA | Address: 0x054B | pulse code: 0xD7 | Address: 0x0581 | pulse code: 0xC2 |
| Address: 0x0516 | pulse code: 0xCC | Address: 0x054C | pulse code: 0xD9 | Address: 0x0582 | pulse code: 0xC4 |
| Address: 0x0517 | pulse code: 0xCE | Address: 0x054D | pulse code: 0xDB | Address: 0x0583 | pulse code: 0xC6 |
| Address: 0x0518 | pulse code: 0xD0 | Address: 0x054E | pulse code: 0xDD | Address: 0x0584 | pulse code: 0xC8 |
| Address: 0x0519 | pulse code: 0xD2 | Address: 0x054F | pulse code: 0xC0 | Address: 0x0585 | pulse code: 0xCA |
| Address: 0x051A | pulse code: 0xD5 | Address: 0x0550 | pulse code: 0x00 | Address: 0x0586 | pulse code: 0xCC |
| Address: 0x051B | pulse code: 0xD7 | Address: 0x0551 | pulse code: 0xC2 | Address: 0x0587 | pulse code: 0xCE |
| Address: 0x051C | pulse code: 0xD9 | Address: 0x0552 | pulse code: 0xC4 | Address: 0x0588 | pulse code: 0xD0 |
| Address: 0x051D | pulse code: 0xDB | Address: 0x0553 | pulse code: 0xC6 | Address: 0x0589 | pulse code: 0xD2 |
| Address: 0x051E | pulse code: 0xDD | Address: 0x0554 | pulse code: 0xC8 | Address: 0x058A | pulse code: 0xD5 |
| Address: 0x051F | pulse code: 0xC0 | Address: 0x0555 | pulse code: 0xCA | Address: 0x058B | pulse code: 0xD7 |
| Address: 0x0520 | pulse code: 0x40 | Address: 0x0556 | pulse code: 0xCC | Address: 0x058C | pulse code: 0xD9 |
| Address: 0x0521 | pulse code: 0x44 | Address: 0x0557 | pulse code: 0xCE | Address: 0x058D | pulse code: 0xDB |
| Address: 0x0522 | pulse code: 0x48 | Address: 0x0558 | pulse code: 0xD0 | Address: 0x058E | pulse code: 0xDD |
| Address: 0x0523 | pulse code: 0x4C | Address: 0x0559 | pulse code: 0xD2 | Address: 0x058F | pulse code: 0xC0 |
| Address: 0x0524 | pulse code: 0x50 | Address: 0x055A | pulse code: 0xD5 | Address: 0x0590 | pulse code: 0x00 |
| Address: 0x0525 | pulse code: 0x55 | Address: 0x055B | pulse code: 0xD7 | Address: 0x0591 | pulse code: 0xC2 |
| Address: 0x0526 | pulse code: 0x59 | Address: 0x055C | pulse code: 0xD9 | Address: 0x0592 | pulse code: 0xC4 |
| Address: 0x0527 | pulse code: 0x5D | Address: 0x055D | pulse code: 0xDB | Address: 0x0593 | pulse code: 0xC6 |
| Address: 0x0528 | pulse code: 0x61 | Address: 0x055E | pulse code: 0xDD | Address: 0x0594 | pulse code: 0xC8 |
| Address: 0x0529 | pulse code: 0x65 | Address: 0x055F | pulse code: 0xC0 | Address: 0x0595 | pulse code: 0xCA |
| Address: 0x052A | pulse code: 0x6A | Address: 0x0560 | pulse code: 0x40 | Address: 0x0596 | pulse code: 0xCC |
| Address: 0x052B | pulse code: 0x6E | Address: 0x0561 | pulse code: 0x44 | Address: 0x0597 | pulse code: 0xCE |
| Address: 0x052C | pulse code: 0x72 | Address: 0x0562 | pulse code: 0x48 | Address: 0x0598 | pulse code: 0xD0 |
| Address: 0x052D | pulse code: 0x76 | Address: 0x0563 | pulse code: 0x4C | Address: 0x0599 | pulse code: 0xD2 |
| Address: 0x052E | pulse code: 0x7A | Address: 0x0564 | pulse code: 0x50 | Address: 0x059A | pulse code: 0xD5 |
| Address: 0x052F | pulse code: 0xC0 | Address: 0x0565 | pulse code: 0x55 | Address: 0x059B | pulse code: 0xD7 |
| Address: 0x0530 | pulse code: 0x40 | Address: 0x0566 | pulse code: 0x59 | Address: 0x059C | pulse code: 0xD9 |
| Address: 0x0531 | pulse code: 0x44 | Address: 0x0567 | pulse code: 0x5D | Address: 0x059D | pulse code: 0xDB |
| Address: 0x0532 | pulse code: 0x48 | Address: 0x0568 | pulse code: 0x61 | Address: 0x059E | pulse code: 0xDD |
| Address: 0x0533 | pulse code: 0x4C | Address: 0x0569 | pulse code: 0x65 | Address: 0x059F | pulse code: 0xC0 |
| Address: 0x0534 | pulse code: 0x50 | Address: 0x056A | pulse code: 0x6A | Address: 0x05A0 | pulse code: 0x40 |
| Address: 0x0535 | pulse code: 0x55 | Address: 0x056B | pulse code: 0x6E | Address: 0x05A1 | pulse code: 0x44 |
| Address: 0x0536 | pulse code: 0x59 | Address: 0x056C | pulse code: 0x72 | Address: 0x05A2 | pulse code: 0x48 |
| Address: 0x0537 | pulse code: 0x5D | Address: 0x056D | pulse code: 0x76 | Address: 0x05A3 | pulse code: 0x4C |
| Address: 0x0538 | pulse code: 0x61 | Address: 0x056E | pulse code: 0x7A | Address: 0x05A4 | pulse code: 0x50 |
| Address: 0x0539 | pulse code: 0x65 | Address: 0x056F | pulse code: 0xC0 | Address: 0x05A5 | pulse code: 0x55 |
| Address: 0x053A | pulse code: 0x6A | Address: 0x0570 | pulse code: 0x40 | Address: 0x05A6 | pulse code: 0x59 |
| Address: 0x053B | pulse code: 0x6E | Address: 0x0571 | pulse code: 0x44 | Address: 0x05A7 | pulse code: 0x5D |
| Address: 0x053C | pulse code: 0x72 | Address: 0x0572 | pulse code: 0x48 | Address: 0x05A8 | pulse code: 0x61 |
| Address: 0x053D | pulse code: 0x76 | Address: 0x0573 | pulse code: 0x4C | Address: 0x05A9 | pulse code: 0x65 |
| Address: 0x053E | pulse code: 0x7A | Address: 0x0574 | pulse code: 0x50 | Address: 0x05AA | pulse code: 0x6A |
| Address: 0x053F | pulse code: 0xC0 | Address: 0x0575 | pulse code: 0x55 | Address: 0x05AB | pulse code: 0x6E |
| Address: 0x0540 | pulse code: 0x00 | Address: 0x0576 | pulse code: 0x59 | Address: 0x05AC | pulse code: 0x72 |
| Address: 0x0541 | pulse code: 0xC2 | Address: 0x0577 | pulse code: 0x5D | Address: 0x05AD | pulse code: 0x76 |

| | | |
|---|---|---|
| Address: 0x05AE  pulse code: 0x7A | Address: 0x05E4  pulse code: 0x90 | Address: 0x061A  pulse code: 0xD5 |
| Address: 0x05AF  pulse code: 0xC0 | Address: 0x05E5  pulse code: 0x95 | Address: 0x061B  pulse code: 0xD7 |
| Address: 0x05B0  pulse code: 0x40 | Address: 0x05E6  pulse code: 0x99 | Address: 0x061C  pulse code: 0xD9 |
| Address: 0x05B1  pulse code: 0x44 | Address: 0x05E7  pulse code: 0x9D | Address: 0x061D  pulse code: 0xDB |
| Address: 0x05B2  pulse code: 0x48 | Address: 0x05E8  pulse code: 0xA1 | Address: 0x061E  pulse code: 0xDD |
| Address: 0x05B3  pulse code: 0x4C | Address: 0x05E9  pulse code: 0xA5 | Address: 0x061F  pulse code: 0xC0 |
| Address: 0x05B4  pulse code: 0x50 | Address: 0x05EA  pulse code: 0xAA | Address: 0x0620  pulse code: 0x00 |
| Address: 0x05B5  pulse code: 0x55 | Address: 0x05EB  pulse code: 0xAE | Address: 0x0621  pulse code: 0xC2 |
| Address: 0x05B6  pulse code: 0x59 | Address: 0x05EC  pulse code: 0xB2 | Address: 0x0622  pulse code: 0xC4 |
| Address: 0x05B7  pulse code: 0x5D | Address: 0x05ED  pulse code: 0xB6 | Address: 0x0623  pulse code: 0xC6 |
| Address: 0x05B8  pulse code: 0x61 | Address: 0x05EE  pulse code: 0xBA | Address: 0x0624  pulse code: 0xC8 |
| Address: 0x05B9  pulse code: 0x65 | Address: 0x05EF  pulse code: 0xC0 | Address: 0x0625  pulse code: 0xCA |
| Address: 0x05BA  pulse code: 0x6A | Address: 0x05F0  pulse code: 0x80 | Address: 0x0626  pulse code: 0xCC |
| Address: 0x05BB  pulse code: 0x6E | Address: 0x05F1  pulse code: 0x84 | Address: 0x0627  pulse code: 0xCE |
| Address: 0x05BC  pulse code: 0x72 | Address: 0x05F2  pulse code: 0x88 | Address: 0x0628  pulse code: 0xD0 |
| Address: 0x05BD  pulse code: 0x76 | Address: 0x05F3  pulse code: 0x8C | Address: 0x0629  pulse code: 0xD2 |
| Address: 0x05BE  pulse code: 0x7A | Address: 0x05F4  pulse code: 0x90 | Address: 0x062A  pulse code: 0xD5 |
| Address: 0x05BF  pulse code: 0xC0 | Address: 0x05F5  pulse code: 0x95 | Address: 0x062B  pulse code: 0xD7 |
| Address: 0x05C0  pulse code: 0x80 | Address: 0x05F6  pulse code: 0x99 | Address: 0x062C  pulse code: 0xD9 |
| Address: 0x05C1  pulse code: 0x84 | Address: 0x05F7  pulse code: 0x9D | Address: 0x062D  pulse code: 0xDB |
| Address: 0x05C2  pulse code: 0x88 | Address: 0x05F8  pulse code: 0xA1 | Address: 0x062E  pulse code: 0xDD |
| Address: 0x05C3  pulse code: 0x8C | Address: 0x05F9  pulse code: 0xA5 | Address: 0x062F  pulse code: 0xC0 |
| Address: 0x05C4  pulse code: 0x90 | Address: 0x05FA  pulse code: 0xAA | Address: 0x0630  pulse code: 0x00 |
| Address: 0x05C5  pulse code: 0x95 | Address: 0x05FB  pulse code: 0xAE | Address: 0x0631  pulse code: 0xC2 |
| Address: 0x05C6  pulse code: 0x99 | Address: 0x05FC  pulse code: 0xB2 | Address: 0x0632  pulse code: 0xC4 |
| Address: 0x05C7  pulse code: 0x9D | Address: 0x05FD  pulse code: 0xB6 | Address: 0x0633  pulse code: 0xC6 |
| Address: 0x05C8  pulse code: 0xA1 | Address: 0x05FE  pulse code: 0xBA | Address: 0x0634  pulse code: 0xC8 |
| Address: 0x05C9  pulse code: 0xA5 | Address: 0x05FF  pulse code: 0xC0 | Address: 0x0635  pulse code: 0xCA |
| Address: 0x05CA  pulse code: 0xAA | Address: 0x0600  pulse code: 0x00 | Address: 0x0636  pulse code: 0xCC |
| Address: 0x05CB  pulse code: 0xAE | Address: 0x0601  pulse code: 0xC2 | Address: 0x0637  pulse code: 0xCE |
| Address: 0x05CC  pulse code: 0xB2 | Address: 0x0602  pulse code: 0xC4 | Address: 0x0638  pulse code: 0xD0 |
| Address: 0x05CD  pulse code: 0xB6 | Address: 0x0603  pulse code: 0xC6 | Address: 0x0639  pulse code: 0xD2 |
| Address: 0x05CE  pulse code: 0xBA | Address: 0x0604  pulse code: 0xC8 | Address: 0x063A  pulse code: 0xD5 |
| Address: 0x05CF  pulse code: 0xC0 | Address: 0x0605  pulse code: 0xCA | Address: 0x063B  pulse code: 0xD7 |
| Address: 0x05D0  pulse code: 0x80 | Address: 0x0606  pulse code: 0xCC | Address: 0x063C  pulse code: 0xD9 |
| Address: 0x05D1  pulse code: 0x84 | Address: 0x0607  pulse code: 0xCE | Address: 0x063D  pulse code: 0xDB |
| Address: 0x05D2  pulse code: 0x88 | Address: 0x0608  pulse code: 0xD0 | Address: 0x063E  pulse code: 0xDD |
| Address: 0x05D3  pulse code: 0x8C | Address: 0x0609  pulse code: 0xD2 | Address: 0x063F  pulse code: 0xC0 |
| Address: 0x05D4  pulse code: 0x90 | Address: 0x060A  pulse code: 0xD5 | Address: 0x0640  pulse code: 0x00 |
| Address: 0x05D5  pulse code: 0x95 | Address: 0x060B  pulse code: 0xD7 | Address: 0x0641  pulse code: 0xC2 |
| Address: 0x05D6  pulse code: 0x99 | Address: 0x060C  pulse code: 0xD9 | Address: 0x0642  pulse code: 0xC4 |
| Address: 0x05D7  pulse code: 0x9D | Address: 0x060D  pulse code: 0xDB | Address: 0x0643  pulse code: 0xC6 |
| Address: 0x05D8  pulse code: 0xA1 | Address: 0x060E  pulse code: 0xDD | Address: 0x0644  pulse code: 0xC8 |
| Address: 0x05D9  pulse code: 0xA5 | Address: 0x060F  pulse code: 0xC0 | Address: 0x0645  pulse code: 0xCA |
| Address: 0x05DA  pulse code: 0xAA | Address: 0x0610  pulse code: 0x00 | Address: 0x0646  pulse code: 0xCC |
| Address: 0x05DB  pulse code: 0xAE | Address: 0x0611  pulse code: 0xC2 | Address: 0x0647  pulse code: 0xCE |
| Address: 0x05DC  pulse code: 0xB2 | Address: 0x0612  pulse code: 0xC4 | Address: 0x0648  pulse code: 0xD0 |
| Address: 0x05DD  pulse code: 0xB6 | Address: 0x0613  pulse code: 0xC6 | Address: 0x0649  pulse code: 0xD2 |
| Address: 0x05DE  pulse code: 0xBA | Address: 0x0614  pulse code: 0xC8 | Address: 0x064A  pulse code: 0xD5 |
| Address: 0x05DF  pulse code: 0xC0 | Address: 0x0615  pulse code: 0xCA | Address: 0x064B  pulse code: 0xD7 |
| Address: 0x05E0  pulse code: 0x80 | Address: 0x0616  pulse code: 0xCC | Address: 0x064C  pulse code: 0xD9 |
| Address: 0x05E1  pulse code: 0x84 | Address: 0x0617  pulse code: 0xCE | Address: 0x064D  pulse code: 0xDB |
| Address: 0x05E2  pulse code: 0x88 | Address: 0x0618  pulse code: 0xD0 | Address: 0x064E  pulse code: 0xDD |
| Address: 0x05E3  pulse code: 0x8C | Address: 0x0619  pulse code: 0xD2 | Address: 0x064F  pulse code: 0xC0 |

43

| | | |
|---|---|---|
| Address: 0x0650 pulse code: 0x00 | Address: 0x0686 pulse code: 0xCC | Address: 0x06BC pulse code: 0xD9 |
| Address: 0x0651 pulse code: 0xC2 | Address: 0x0687 pulse code: 0xCE | Address: 0x06BD pulse code: 0xDB |
| Address: 0x0652 pulse code: 0xC4 | Address: 0x0688 pulse code: 0xD0 | Address: 0x06BE pulse code: 0xDD |
| Address: 0x0653 pulse code: 0xC6 | Address: 0x0689 pulse code: 0xD2 | Address: 0x06BF pulse code: 0xC0 |
| Address: 0x0654 pulse code: 0xC8 | Address: 0x068A pulse code: 0xD5 | Address: 0x06C0 pulse code: 0x80 |
| Address: 0x0655 pulse code: 0xCA | Address: 0x068B pulse code: 0xD7 | Address: 0x06C1 pulse code: 0x84 |
| Address: 0x0656 pulse code: 0xCC | Address: 0x068C pulse code: 0xD9 | Address: 0x06C2 pulse code: 0x88 |
| Address: 0x0657 pulse code: 0xCE | Address: 0x068D pulse code: 0xDB | Address: 0x06C3 pulse code: 0x8C |
| Address: 0x0658 pulse code: 0xD0 | Address: 0x068E pulse code: 0xDD | Address: 0x06C4 pulse code: 0x90 |
| Address: 0x0659 pulse code: 0xD2 | Address: 0x068F pulse code: 0xC0 | Address: 0x06C5 pulse code: 0x95 |
| Address: 0x065A pulse code: 0xD5 | Address: 0x0690 pulse code: 0x00 | Address: 0x06C6 pulse code: 0x99 |
| Address: 0x065B pulse code: 0xD7 | Address: 0x0691 pulse code: 0xC2 | Address: 0x06C7 pulse code: 0x9D |
| Address: 0x065C pulse code: 0xD9 | Address: 0x0692 pulse code: 0xC4 | Address: 0x06C8 pulse code: 0xA1 |
| Address: 0x065D pulse code: 0xDB | Address: 0x0693 pulse code: 0xC6 | Address: 0x06C9 pulse code: 0xA5 |
| Address: 0x065E pulse code: 0xDD | Address: 0x0694 pulse code: 0xC8 | Address: 0x06CA pulse code: 0xAA |
| Address: 0x065F pulse code: 0xC0 | Address: 0x0695 pulse code: 0xCA | Address: 0x06CB pulse code: 0xAE |
| Address: 0x0660 pulse code: 0x00 | Address: 0x0696 pulse code: 0xCC | Address: 0x06CC pulse code: 0xB2 |
| Address: 0x0661 pulse code: 0xC2 | Address: 0x0697 pulse code: 0xCE | Address: 0x06CD pulse code: 0xB6 |
| Address: 0x0662 pulse code: 0xC4 | Address: 0x0698 pulse code: 0xD0 | Address: 0x06CE pulse code: 0xBA |
| Address: 0x0663 pulse code: 0xC6 | Address: 0x0699 pulse code: 0xD2 | Address: 0x06CF pulse code: 0xC0 |
| Address: 0x0664 pulse code: 0xC8 | Address: 0x069A pulse code: 0xD5 | Address: 0x06D0 pulse code: 0x80 |
| Address: 0x0665 pulse code: 0xCA | Address: 0x069B pulse code: 0xD7 | Address: 0x06D1 pulse code: 0x84 |
| Address: 0x0666 pulse code: 0xCC | Address: 0x069C pulse code: 0xD9 | Address: 0x06D2 pulse code: 0x88 |
| Address: 0x0667 pulse code: 0xCE | Address: 0x069D pulse code: 0xDB | Address: 0x06D3 pulse code: 0x8C |
| Address: 0x0668 pulse code: 0xD0 | Address: 0x069E pulse code: 0xDD | Address: 0x06D4 pulse code: 0x90 |
| Address: 0x0669 pulse code: 0xD2 | Address: 0x069F pulse code: 0xC0 | Address: 0x06D5 pulse code: 0x95 |
| Address: 0x066A pulse code: 0xD5 | Address: 0x06A0 pulse code: 0x00 | Address: 0x06D6 pulse code: 0x99 |
| Address: 0x066B pulse code: 0xD7 | Address: 0x06A1 pulse code: 0xC2 | Address: 0x06D7 pulse code: 0x9D |
| Address: 0x066C pulse code: 0xD9 | Address: 0x06A2 pulse code: 0xC4 | Address: 0x06D8 pulse code: 0xA1 |
| Address: 0x066D pulse code: 0xDB | Address: 0x06A3 pulse code: 0xC6 | Address: 0x06D9 pulse code: 0xA5 |
| Address: 0x066E pulse code: 0xDD | Address: 0x06A4 pulse code: 0xC8 | Address: 0x06DA pulse code: 0xAA |
| Address: 0x066F pulse code: 0xC0 | Address: 0x06A5 pulse code: 0xCA | Address: 0x06DB pulse code: 0xAE |
| Address: 0x0670 pulse code: 0x00 | Address: 0x06A6 pulse code: 0xCC | Address: 0x06DC pulse code: 0xB2 |
| Address: 0x0671 pulse code: 0x10 | Address: 0x06A7 pulse code: 0xCE | Address: 0x06DD pulse code: 0xB6 |
| Address: 0x0672 pulse code: 0x12 | Address: 0x06A8 pulse code: 0xD0 | Address: 0x06DE pulse code: 0xBA |
| Address: 0x0673 pulse code: 0x14 | Address: 0x06A9 pulse code: 0xD2 | Address: 0x06DF pulse code: 0xC0 |
| Address: 0x0674 pulse code: 0x16 | Address: 0x06AA pulse code: 0xD5 | Address: 0x06E0 pulse code: 0x80 |
| Address: 0x0675 pulse code: 0x19 | Address: 0x06AB pulse code: 0xD7 | Address: 0x06E1 pulse code: 0x84 |
| Address: 0x0676 pulse code: 0x1C | Address: 0x06AC pulse code: 0xD9 | Address: 0x06E2 pulse code: 0x88 |
| Address: 0x0677 pulse code: 0x20 | Address: 0x06AD pulse code: 0xDB | Address: 0x06E3 pulse code: 0x8C |
| Address: 0x0678 pulse code: 0x23 | Address: 0x06AE pulse code: 0xDD | Address: 0x06E4 pulse code: 0x90 |
| Address: 0x0679 pulse code: 0x26 | Address: 0x06AF pulse code: 0xC0 | Address: 0x06E5 pulse code: 0x95 |
| Address: 0x067A pulse code: 0x2A | Address: 0x06B0 pulse code: 0x00 | Address: 0x06E6 pulse code: 0x99 |
| Address: 0x067B pulse code: 0x2E | Address: 0x06B1 pulse code: 0xC2 | Address: 0x06E7 pulse code: 0x9D |
| Address: 0x067C pulse code: 0x32 | Address: 0x06B2 pulse code: 0xC4 | Address: 0x06E8 pulse code: 0xA1 |
| Address: 0x067D pulse code: 0x36 | Address: 0x06B3 pulse code: 0xC6 | Address: 0x06E9 pulse code: 0xA5 |
| Address: 0x067E pulse code: 0x3A | Address: 0x06B4 pulse code: 0xC8 | Address: 0x06EA pulse code: 0xAA |
| Address: 0x067F pulse code: 0xC0 | Address: 0x06B5 pulse code: 0xCA | Address: 0x06EB pulse code: 0xAE |
| Address: 0x0680 pulse code: 0x00 | Address: 0x06B6 pulse code: 0xCC | Address: 0x06EC pulse code: 0xB2 |
| Address: 0x0681 pulse code: 0xC2 | Address: 0x06B7 pulse code: 0xCE | Address: 0x06ED pulse code: 0xB6 |
| Address: 0x0682 pulse code: 0xC4 | Address: 0x06B8 pulse code: 0xD0 | Address: 0x06EE pulse code: 0xBA |
| Address: 0x0683 pulse code: 0xC6 | Address: 0x06B9 pulse code: 0xD2 | Address: 0x06EF pulse code: 0xC0 |
| Address: 0x0684 pulse code: 0xC8 | Address: 0x06BA pulse code: 0xD5 | Address: 0x06F0 pulse code: 0x80 |
| Address: 0x0685 pulse code: 0xCA | Address: 0x06BB pulse code: 0xD7 | Address: 0x06F1 pulse code: 0x84 |

44

| | | | | | |
|---|---|---|---|---|---|
| Address: 0x06F2 | pulse code: 0x88 | Address: 0x0728 | pulse code: 0x61 | Address: 0x075E | pulse code: 0xDD |
| Address: 0x06F3 | pulse code: 0x8C | Address: 0x0729 | pulse code: 0x65 | Address: 0x075F | pulse code: 0xC0 |
| Address: 0x06F4 | pulse code: 0x90 | Address: 0x072A | pulse code: 0x6A | Address: 0x0760 | pulse code: 0x40 |
| Address: 0x06F5 | pulse code: 0x95 | Address: 0x072B | pulse code: 0x6E | Address: 0x0761 | pulse code: 0x44 |
| Address: 0x06F6 | pulse code: 0x99 | Address: 0x072C | pulse code: 0x72 | Address: 0x0762 | pulse code: 0x48 |
| Address: 0x06F7 | pulse code: 0x9D | Address: 0x072D | pulse code: 0x76 | Address: 0x0763 | pulse code: 0x4C |
| Address: 0x06F8 | pulse code: 0xA1 | Address: 0x072E | pulse code: 0x7A | Address: 0x0764 | pulse code: 0x50 |
| Address: 0x06F9 | pulse code: 0xA5 | Address: 0x072F | pulse code: 0xC0 | Address: 0x0765 | pulse code: 0x55 |
| Address: 0x06FA | pulse code: 0xAA | Address: 0x0730 | pulse code: 0x40 | Address: 0x0766 | pulse code: 0x59 |
| Address: 0x06FB | pulse code: 0xAE | Address: 0x0731 | pulse code: 0x44 | Address: 0x0767 | pulse code: 0x5D |
| Address: 0x06FC | pulse code: 0xB2 | Address: 0x0732 | pulse code: 0x48 | Address: 0x0768 | pulse code: 0x61 |
| Address: 0x06FD | pulse code: 0xB6 | Address: 0x0733 | pulse code: 0x4C | Address: 0x0769 | pulse code: 0x65 |
| Address: 0x06FE | pulse code: 0xBA | Address: 0x0734 | pulse code: 0x50 | Address: 0x076A | pulse code: 0x6A |
| Address: 0x06FF | pulse code: 0xC0 | Address: 0x0735 | pulse code: 0x55 | Address: 0x076B | pulse code: 0x6E |
| Address: 0x0700 | pulse code: 0x00 | Address: 0x0736 | pulse code: 0x59 | Address: 0x076C | pulse code: 0x72 |
| Address: 0x0701 | pulse code: 0xC2 | Address: 0x0737 | pulse code: 0x5D | Address: 0x076D | pulse code: 0x76 |
| Address: 0x0702 | pulse code: 0xC4 | Address: 0x0738 | pulse code: 0x61 | Address: 0x076E | pulse code: 0x7A |
| Address: 0x0703 | pulse code: 0xC6 | Address: 0x0739 | pulse code: 0x65 | Address: 0x076F | pulse code: 0xC0 |
| Address: 0x0704 | pulse code: 0xC8 | Address: 0x073A | pulse code: 0x6A | Address: 0x0770 | pulse code: 0x40 |
| Address: 0x0705 | pulse code: 0xCA | Address: 0x073B | pulse code: 0x6E | Address: 0x0771 | pulse code: 0x44 |
| Address: 0x0706 | pulse code: 0xCC | Address: 0x073C | pulse code: 0x72 | Address: 0x0772 | pulse code: 0x48 |
| Address: 0x0707 | pulse code: 0xCE | Address: 0x073D | pulse code: 0x76 | Address: 0x0773 | pulse code: 0x4C |
| Address: 0x0708 | pulse code: 0xD0 | Address: 0x073E | pulse code: 0x7A | Address: 0x0774 | pulse code: 0x50 |
| Address: 0x0709 | pulse code: 0xD2 | Address: 0x073F | pulse code: 0xC0 | Address: 0x0775 | pulse code: 0x55 |
| Address: 0x070A | pulse code: 0xD5 | Address: 0x0740 | pulse code: 0x00 | Address: 0x0776 | pulse code: 0x59 |
| Address: 0x070B | pulse code: 0xD7 | Address: 0x0741 | pulse code: 0xC2 | Address: 0x0777 | pulse code: 0x5D |
| Address: 0x070C | pulse code: 0xD9 | Address: 0x0742 | pulse code: 0xC4 | Address: 0x0778 | pulse code: 0x61 |
| Address: 0x070D | pulse code: 0xDB | Address: 0x0743 | pulse code: 0xC6 | Address: 0x0779 | pulse code: 0x65 |
| Address: 0x070E | pulse code: 0xDD | Address: 0x0744 | pulse code: 0xC8 | Address: 0x077A | pulse code: 0x6A |
| Address: 0x070F | pulse code: 0xC0 | Address: 0x0745 | pulse code: 0xCA | Address: 0x077B | pulse code: 0x6E |
| Address: 0x0710 | pulse code: 0x00 | Address: 0x0746 | pulse code: 0xCC | Address: 0x077C | pulse code: 0x72 |
| Address: 0x0711 | pulse code: 0xC2 | Address: 0x0747 | pulse code: 0xCE | Address: 0x077D | pulse code: 0x76 |
| Address: 0x0712 | pulse code: 0xC4 | Address: 0x0748 | pulse code: 0xD0 | Address: 0x077E | pulse code: 0x7A |
| Address: 0x0713 | pulse code: 0xC6 | Address: 0x0749 | pulse code: 0xD2 | Address: 0x077F | pulse code: 0xC0 |
| Address: 0x0714 | pulse code: 0xC8 | Address: 0x074A | pulse code: 0xD5 | Address: 0x0780 | pulse code: 0x00 |
| Address: 0x0715 | pulse code: 0xCA | Address: 0x074B | pulse code: 0xD7 | Address: 0x0781 | pulse code: 0xC2 |
| Address: 0x0716 | pulse code: 0xCC | Address: 0x074C | pulse code: 0xD9 | Address: 0x0782 | pulse code: 0xC4 |
| Address: 0x0717 | pulse code: 0xCE | Address: 0x074D | pulse code: 0xDB | Address: 0x0783 | pulse code: 0xC6 |
| Address: 0x0718 | pulse code: 0xD0 | Address: 0x074E | pulse code: 0xDD | Address: 0x0784 | pulse code: 0xC8 |
| Address: 0x0719 | pulse code: 0xD2 | Address: 0x074F | pulse code: 0xC0 | Address: 0x0785 | pulse code: 0xCA |
| Address: 0x071A | pulse code: 0xD5 | Address: 0x0750 | pulse code: 0x00 | Address: 0x0786 | pulse code: 0xCC |
| Address: 0x071B | pulse code: 0xD7 | Address: 0x0751 | pulse code: 0xC2 | Address: 0x0787 | pulse code: 0xCE |
| Address: 0x071C | pulse code: 0xD9 | Address: 0x0752 | pulse code: 0xC4 | Address: 0x0788 | pulse code: 0xD0 |
| Address: 0x071D | pulse code: 0xDB | Address: 0x0753 | pulse code: 0xC6 | Address: 0x0789 | pulse code: 0xD2 |
| Address: 0x071E | pulse code: 0xDD | Address: 0x0754 | pulse code: 0xC8 | Address: 0x078A | pulse code: 0xD5 |
| Address: 0x071F | pulse code: 0xC0 | Address: 0x0755 | pulse code: 0xCA | Address: 0x078B | pulse code: 0xD7 |
| Address: 0x0720 | pulse code: 0x40 | Address: 0x0756 | pulse code: 0xCC | Address: 0x078C | pulse code: 0xD9 |
| Address: 0x0721 | pulse code: 0x44 | Address: 0x0757 | pulse code: 0xCE | Address: 0x078D | pulse code: 0xDB |
| Address: 0x0722 | pulse code: 0x48 | Address: 0x0758 | pulse code: 0xD0 | Address: 0x078E | pulse code: 0xDD |
| Address: 0x0723 | pulse code: 0x4C | Address: 0x0759 | pulse code: 0xD2 | Address: 0x078F | pulse code: 0xC0 |
| Address: 0x0724 | pulse code: 0x50 | Address: 0x075A | pulse code: 0xD5 | Address: 0x0790 | pulse code: 0x00 |
| Address: 0x0725 | pulse code: 0x55 | Address: 0x075B | pulse code: 0xD7 | Address: 0x0791 | pulse code: 0xC2 |
| Address: 0x0726 | pulse code: 0x59 | Address: 0x075C | pulse code: 0xD9 | Address: 0x0792 | pulse code: 0xC4 |
| Address: 0x0727 | pulse code: 0x5D | Address: 0x075D | pulse code: 0xDB | Address: 0x0793 | pulse code: 0xC6 |

| | | |
|---|---|---|
| Address: 0x0794 pulse code: 0xC8 | Address: 0x07CA pulse code: 0xAA | Address: 0x0800 pulse code: 0x00 |
| Address: 0x0795 pulse code: 0xCA | Address: 0x07CB pulse code: 0xAE | Address: 0x0801 pulse code: 0xC2 |
| Address: 0x0796 pulse code: 0xCC | Address: 0x07CC pulse code: 0xB2 | Address: 0x0802 pulse code: 0xC4 |
| Address: 0x0797 pulse code: 0xCE | Address: 0x07CD pulse code: 0xB6 | Address: 0x0803 pulse code: 0xC6 |
| Address: 0x0798 pulse code: 0xD0 | Address: 0x07CE pulse code: 0xBA | Address: 0x0804 pulse code: 0xC8 |
| Address: 0x0799 pulse code: 0xD2 | Address: 0x07CF pulse code: 0xC0 | Address: 0x0805 pulse code: 0xCA |
| Address: 0x079A pulse code: 0xD5 | Address: 0x07D0 pulse code: 0x80 | Address: 0x0806 pulse code: 0xCC |
| Address: 0x079B pulse code: 0xD7 | Address: 0x07D1 pulse code: 0x84 | Address: 0x0807 pulse code: 0xCE |
| Address: 0x079C pulse code: 0xD9 | Address: 0x07D2 pulse code: 0x88 | Address: 0x0808 pulse code: 0xD0 |
| Address: 0x079D pulse code: 0xDB | Address: 0x07D3 pulse code: 0x8C | Address: 0x0809 pulse code: 0xD2 |
| Address: 0x079E pulse code: 0xDD | Address: 0x07D4 pulse code: 0x90 | Address: 0x080A pulse code: 0xD5 |
| Address: 0x079F pulse code: 0xC0 | Address: 0x07D5 pulse code: 0x95 | Address: 0x080B pulse code: 0xD7 |
| Address: 0x07A0 pulse code: 0x40 | Address: 0x07D6 pulse code: 0x99 | Address: 0x080C pulse code: 0xD9 |
| Address: 0x07A1 pulse code: 0x44 | Address: 0x07D7 pulse code: 0x9D | Address: 0x080D pulse code: 0xDB |
| Address: 0x07A2 pulse code: 0x48 | Address: 0x07D8 pulse code: 0xA1 | Address: 0x080E pulse code: 0xDD |
| Address: 0x07A3 pulse code: 0x4C | Address: 0x07D9 pulse code: 0xA5 | Address: 0x080F pulse code: 0xC0 |
| Address: 0x07A4 pulse code: 0x50 | Address: 0x07DA pulse code: 0xAA | Address: 0x0810 pulse code: 0x00 |
| Address: 0x07A5 pulse code: 0x55 | Address: 0x07DB pulse code: 0xAE | Address: 0x0811 pulse code: 0xC2 |
| Address: 0x07A6 pulse code: 0x59 | Address: 0x07DC pulse code: 0xB2 | Address: 0x0812 pulse code: 0xC4 |
| Address: 0x07A7 pulse code: 0x5D | Address: 0x07DD pulse code: 0xB6 | Address: 0x0813 pulse code: 0xC6 |
| Address: 0x07A8 pulse code: 0x61 | Address: 0x07DE pulse code: 0xBA | Address: 0x0814 pulse code: 0xC8 |
| Address: 0x07A9 pulse code: 0x65 | Address: 0x07DF pulse code: 0xC0 | Address: 0x0815 pulse code: 0xCA |
| Address: 0x07AA pulse code: 0x6A | Address: 0x07E0 pulse code: 0x80 | Address: 0x0816 pulse code: 0xCC |
| Address: 0x07AB pulse code: 0x6E | Address: 0x07E1 pulse code: 0x84 | Address: 0x0817 pulse code: 0xCE |
| Address: 0x07AC pulse code: 0x72 | Address: 0x07E2 pulse code: 0x88 | Address: 0x0818 pulse code: 0xD0 |
| Address: 0x07AD pulse code: 0x76 | Address: 0x07E3 pulse code: 0x8C | Address: 0x0819 pulse code: 0xD2 |
| Address: 0x07AE pulse code: 0x7A | Address: 0x07E4 pulse code: 0x90 | Address: 0x081A pulse code: 0xD5 |
| Address: 0x07AF pulse code: 0xC0 | Address: 0x07E5 pulse code: 0x95 | Address: 0x081B pulse code: 0xD7 |
| Address: 0x07B0 pulse code: 0x40 | Address: 0x07E6 pulse code: 0x99 | Address: 0x081C pulse code: 0xD9 |
| Address: 0x07B1 pulse code: 0x44 | Address: 0x07E7 pulse code: 0x9D | Address: 0x081D pulse code: 0xDB |
| Address: 0x07B2 pulse code: 0x48 | Address: 0x07E8 pulse code: 0xA1 | Address: 0x081E pulse code: 0xDD |
| Address: 0x07B3 pulse code: 0x4C | Address: 0x07E9 pulse code: 0xA5 | Address: 0x081F pulse code: 0xC0 |
| Address: 0x07B4 pulse code: 0x50 | Address: 0x07EA pulse code: 0xAA | Address: 0x0820 pulse code: 0x00 |
| Address: 0x07B5 pulse code: 0x55 | Address: 0x07EB pulse code: 0xAE | Address: 0x0821 pulse code: 0xC2 |
| Address: 0x07B6 pulse code: 0x59 | Address: 0x07EC pulse code: 0xB2 | Address: 0x0822 pulse code: 0xC4 |
| Address: 0x07B7 pulse code: 0x5D | Address: 0x07ED pulse code: 0xB6 | Address: 0x0823 pulse code: 0xC6 |
| Address: 0x07B8 pulse code: 0x61 | Address: 0x07EE pulse code: 0xBA | Address: 0x0824 pulse code: 0xC8 |
| Address: 0x07B9 pulse code: 0x65 | Address: 0x07EF pulse code: 0xC0 | Address: 0x0825 pulse code: 0xCA |
| Address: 0x07BA pulse code: 0x6A | Address: 0x07F0 pulse code: 0x80 | Address: 0x0826 pulse code: 0xCC |
| Address: 0x07BB pulse code: 0x6E | Address: 0x07F1 pulse code: 0x84 | Address: 0x0827 pulse code: 0xCE |
| Address: 0x07BC pulse code: 0x72 | Address: 0x07F2 pulse code: 0x88 | Address: 0x0828 pulse code: 0xD0 |
| Address: 0x07BD pulse code: 0x76 | Address: 0x07F3 pulse code: 0x8C | Address: 0x0829 pulse code: 0xD2 |
| Address: 0x07BE pulse code: 0x7A | Address: 0x07F4 pulse code: 0x90 | Address: 0x082A pulse code: 0xD5 |
| Address: 0x07BF pulse code: 0xC0 | Address: 0x07F5 pulse code: 0x95 | Address: 0x082B pulse code: 0xD7 |
| Address: 0x07C0 pulse code: 0x80 | Address: 0x07F6 pulse code: 0x99 | Address: 0x082C pulse code: 0xD9 |
| Address: 0x07C1 pulse code: 0x84 | Address: 0x07F7 pulse code: 0x9D | Address: 0x082D pulse code: 0xDB |
| Address: 0x07C2 pulse code: 0x88 | Address: 0x07F8 pulse code: 0xA1 | Address: 0x082E pulse code: 0xDD |
| Address: 0x07C3 pulse code: 0x8C | Address: 0x07F9 pulse code: 0xA5 | Address: 0x082F pulse code: 0xC0 |
| Address: 0x07C4 pulse code: 0x90 | Address: 0x07FA pulse code: 0xAA | Address: 0x0830 pulse code: 0x00 |
| Address: 0x07C5 pulse code: 0x95 | Address: 0x07FB pulse code: 0xAE | Address: 0x0831 pulse code: 0xC2 |
| Address: 0x07C6 pulse code: 0x99 | Address: 0x07FC pulse code: 0xB2 | Address: 0x0832 pulse code: 0xC4 |
| Address: 0x07C7 pulse code: 0x9D | Address: 0x07FD pulse code: 0xB6 | Address: 0x0833 pulse code: 0xC6 |
| Address: 0x07C8 pulse code: 0xA1 | Address: 0x07FE pulse code: 0xBA | Address: 0x0834 pulse code: 0xC8 |
| Address: 0x07C9 pulse code: 0xA5 | Address: 0x07FF pulse code: 0xC0 | Address: 0x0835 pulse code: 0xCA |

| | | |
|---|---|---|
| Address: 0x0836 pulse code: 0xCC | Address: 0x086C pulse code: 0xD9 | Address: 0x08A2 pulse code: 0xC4 |
| Address: 0x0837 pulse code: 0xCE | Address: 0x086D pulse code: 0xDB | Address: 0x08A3 pulse code: 0xC6 |
| Address: 0x0838 pulse code: 0xD0 | Address: 0x086E pulse code: 0xDD | Address: 0x08A4 pulse code: 0xC8 |
| Address: 0x0839 pulse code: 0xD2 | Address: 0x086F pulse code: 0xC0 | Address: 0x08A5 pulse code: 0xCA |
| Address: 0x083A pulse code: 0xD5 | Address: 0x0870 pulse code: 0x00 | Address: 0x08A6 pulse code: 0xCC |
| Address: 0x083B pulse code: 0xD7 | Address: 0x0871 pulse code: 0x04 | Address: 0x08A7 pulse code: 0xCE |
| Address: 0x083C pulse code: 0xD9 | Address: 0x0872 pulse code: 0x08 | Address: 0x08A8 pulse code: 0xD0 |
| Address: 0x083D pulse code: 0xDB | Address: 0x0873 pulse code: 0x0C | Address: 0x08A9 pulse code: 0xD2 |
| Address: 0x083E pulse code: 0xDD | Address: 0x0874 pulse code: 0x10 | Address: 0x08AA pulse code: 0xD5 |
| Address: 0x083F pulse code: 0xC0 | Address: 0x0875 pulse code: 0x15 | Address: 0x08AB pulse code: 0xD7 |
| Address: 0x0840 pulse code: 0x00 | Address: 0x0876 pulse code: 0x19 | Address: 0x08AC pulse code: 0xD9 |
| Address: 0x0841 pulse code: 0xC2 | Address: 0x0877 pulse code: 0x1D | Address: 0x08AD pulse code: 0xDB |
| Address: 0x0842 pulse code: 0xC4 | Address: 0x0878 pulse code: 0x21 | Address: 0x08AE pulse code: 0xDD |
| Address: 0x0843 pulse code: 0xC6 | Address: 0x0879 pulse code: 0x25 | Address: 0x08AF pulse code: 0xC0 |
| Address: 0x0844 pulse code: 0xC8 | Address: 0x087A pulse code: 0x2A | Address: 0x08B0 pulse code: 0x00 |
| Address: 0x0845 pulse code: 0xCA | Address: 0x087B pulse code: 0x2E | Address: 0x08B1 pulse code: 0xC2 |
| Address: 0x0846 pulse code: 0xCC | Address: 0x087C pulse code: 0x32 | Address: 0x08B2 pulse code: 0xC4 |
| Address: 0x0847 pulse code: 0xCE | Address: 0x087D pulse code: 0x36 | Address: 0x08B3 pulse code: 0xC6 |
| Address: 0x0848 pulse code: 0xD0 | Address: 0x087E pulse code: 0x3A | Address: 0x08B4 pulse code: 0xC8 |
| Address: 0x0849 pulse code: 0xD2 | Address: 0x087F pulse code: 0xC0 | Address: 0x08B5 pulse code: 0xCA |
| Address: 0x084A pulse code: 0xD5 | Address: 0x0880 pulse code: 0x00 | Address: 0x08B6 pulse code: 0xCC |
| Address: 0x084B pulse code: 0xD7 | Address: 0x0881 pulse code: 0xC2 | Address: 0x08B7 pulse code: 0xCE |
| Address: 0x084C pulse code: 0xD9 | Address: 0x0882 pulse code: 0xC4 | Address: 0x08B8 pulse code: 0xD0 |
| Address: 0x084D pulse code: 0xDB | Address: 0x0883 pulse code: 0xC6 | Address: 0x08B9 pulse code: 0xD2 |
| Address: 0x084E pulse code: 0xDD | Address: 0x0884 pulse code: 0xC8 | Address: 0x08BA pulse code: 0xD5 |
| Address: 0x084F pulse code: 0xC0 | Address: 0x0885 pulse code: 0xCA | Address: 0x08BB pulse code: 0xD7 |
| Address: 0x0850 pulse code: 0x00 | Address: 0x0886 pulse code: 0xCC | Address: 0x08BC pulse code: 0xD9 |
| Address: 0x0851 pulse code: 0xC2 | Address: 0x0887 pulse code: 0xCE | Address: 0x08BD pulse code: 0xDB |
| Address: 0x0852 pulse code: 0xC4 | Address: 0x0888 pulse code: 0xD0 | Address: 0x08BE pulse code: 0xDD |
| Address: 0x0853 pulse code: 0xC6 | Address: 0x0889 pulse code: 0xD2 | Address: 0x08BF pulse code: 0xC0 |
| Address: 0x0854 pulse code: 0xC8 | Address: 0x088A pulse code: 0xD5 | Address: 0x08C0 pulse code: 0x80 |
| Address: 0x0855 pulse code: 0xCA | Address: 0x088B pulse code: 0xD7 | Address: 0x08C1 pulse code: 0x84 |
| Address: 0x0856 pulse code: 0xCC | Address: 0x088C pulse code: 0xD9 | Address: 0x08C2 pulse code: 0x88 |
| Address: 0x0857 pulse code: 0xCE | Address: 0x088D pulse code: 0xDB | Address: 0x08C3 pulse code: 0x8C |
| Address: 0x0858 pulse code: 0xD0 | Address: 0x088E pulse code: 0xDD | Address: 0x08C4 pulse code: 0x90 |
| Address: 0x0859 pulse code: 0xD2 | Address: 0x088F pulse code: 0xC0 | Address: 0x08C5 pulse code: 0x95 |
| Address: 0x085A pulse code: 0xD5 | Address: 0x0890 pulse code: 0x00 | Address: 0x08C6 pulse code: 0x99 |
| Address: 0x085B pulse code: 0xD7 | Address: 0x0891 pulse code: 0xC2 | Address: 0x08C7 pulse code: 0x9D |
| Address: 0x085C pulse code: 0xD9 | Address: 0x0892 pulse code: 0xC4 | Address: 0x08C8 pulse code: 0xA1 |
| Address: 0x085D pulse code: 0xDB | Address: 0x0893 pulse code: 0xC6 | Address: 0x08C9 pulse code: 0xA5 |
| Address: 0x085E pulse code: 0xDD | Address: 0x0894 pulse code: 0xC8 | Address: 0x08CA pulse code: 0xAA |
| Address: 0x085F pulse code: 0xC0 | Address: 0x0895 pulse code: 0xCA | Address: 0x08CB pulse code: 0xAE |
| Address: 0x0860 pulse code: 0x00 | Address: 0x0896 pulse code: 0xCC | Address: 0x08CC pulse code: 0xB2 |
| Address: 0x0861 pulse code: 0xC2 | Address: 0x0897 pulse code: 0xCE | Address: 0x08CD pulse code: 0xB6 |
| Address: 0x0862 pulse code: 0xC4 | Address: 0x0898 pulse code: 0xD0 | Address: 0x08CE pulse code: 0xBA |
| Address: 0x0863 pulse code: 0xC6 | Address: 0x0899 pulse code: 0xD2 | Address: 0x08CF pulse code: 0xC0 |
| Address: 0x0864 pulse code: 0xC8 | Address: 0x089A pulse code: 0xD5 | Address: 0x08D0 pulse code: 0x80 |
| Address: 0x0865 pulse code: 0xCA | Address: 0x089B pulse code: 0xD7 | Address: 0x08D1 pulse code: 0x84 |
| Address: 0x0866 pulse code: 0xCC | Address: 0x089C pulse code: 0xD9 | Address: 0x08D2 pulse code: 0x88 |
| Address: 0x0867 pulse code: 0xCE | Address: 0x089D pulse code: 0xDB | Address: 0x08D3 pulse code: 0x8C |
| Address: 0x0868 pulse code: 0xD0 | Address: 0x089E pulse code: 0xDD | Address: 0x08D4 pulse code: 0x90 |
| Address: 0x0869 pulse code: 0xD2 | Address: 0x089F pulse code: 0xC0 | Address: 0x08D5 pulse code: 0x95 |
| Address: 0x086A pulse code: 0xD5 | Address: 0x08A0 pulse code: 0x00 | Address: 0x08D6 pulse code: 0x99 |
| Address: 0x086B pulse code: 0xD7 | Address: 0x08A1 pulse code: 0xC2 | Address: 0x08D7 pulse code: 0x9D |

| | | |
|---|---|---|
| Address: 0x08D8  pulse code: 0xA1 | Address: 0x090E  pulse code: 0xDD | Address: 0x0944  pulse code: 0xC8 |
| Address: 0x08D9  pulse code: 0xA5 | Address: 0x090F  pulse code: 0xC0 | Address: 0x0945  pulse code: 0xCA |
| Address: 0x08DA  pulse code: 0xAA | Address: 0x0910  pulse code: 0x00 | Address: 0x0946  pulse code: 0xCC |
| Address: 0x08DB  pulse code: 0xAE | Address: 0x0911  pulse code: 0xC2 | Address: 0x0947  pulse code: 0xCE |
| Address: 0x08DC  pulse code: 0xB2 | Address: 0x0912  pulse code: 0xC4 | Address: 0x0948  pulse code: 0xD0 |
| Address: 0x08DD  pulse code: 0xB6 | Address: 0x0913  pulse code: 0xC6 | Address: 0x0949  pulse code: 0xD2 |
| Address: 0x08DE  pulse code: 0xBA | Address: 0x0914  pulse code: 0xC8 | Address: 0x094A  pulse code: 0xD5 |
| Address: 0x08DF  pulse code: 0xC0 | Address: 0x0915  pulse code: 0xCA | Address: 0x094B  pulse code: 0xD7 |
| Address: 0x08E0  pulse code: 0x80 | Address: 0x0916  pulse code: 0xCC | Address: 0x094C  pulse code: 0xD9 |
| Address: 0x08E1  pulse code: 0x84 | Address: 0x0917  pulse code: 0xCE | Address: 0x094D  pulse code: 0xDB |
| Address: 0x08E2  pulse code: 0x88 | Address: 0x0918  pulse code: 0xD0 | Address: 0x094E  pulse code: 0xDD |
| Address: 0x08E3  pulse code: 0x8C | Address: 0x0919  pulse code: 0xD2 | Address: 0x094F  pulse code: 0xC0 |
| Address: 0x08E4  pulse code: 0x90 | Address: 0x091A  pulse code: 0xD5 | Address: 0x0950  pulse code: 0x00 |
| Address: 0x08E5  pulse code: 0x95 | Address: 0x091B  pulse code: 0xD7 | Address: 0x0951  pulse code: 0xC2 |
| Address: 0x08E6  pulse code: 0x99 | Address: 0x091C  pulse code: 0xD9 | Address: 0x0952  pulse code: 0xC4 |
| Address: 0x08E7  pulse code: 0x9D | Address: 0x091D  pulse code: 0xDB | Address: 0x0953  pulse code: 0xC6 |
| Address: 0x08E8  pulse code: 0xA1 | Address: 0x091E  pulse code: 0xDD | Address: 0x0954  pulse code: 0xC8 |
| Address: 0x08E9  pulse code: 0xA5 | Address: 0x091F  pulse code: 0xC0 | Address: 0x0955  pulse code: 0xCA |
| Address: 0x08EA  pulse code: 0xAA | Address: 0x0920  pulse code: 0x40 | Address: 0x0956  pulse code: 0xCC |
| Address: 0x08EB  pulse code: 0xAE | Address: 0x0921  pulse code: 0x44 | Address: 0x0957  pulse code: 0xCE |
| Address: 0x08EC  pulse code: 0xB2 | Address: 0x0922  pulse code: 0x48 | Address: 0x0958  pulse code: 0xD0 |
| Address: 0x08ED  pulse code: 0xB6 | Address: 0x0923  pulse code: 0x4C | Address: 0x0959  pulse code: 0xD2 |
| Address: 0x08EE  pulse code: 0xBA | Address: 0x0924  pulse code: 0x50 | Address: 0x095A  pulse code: 0xD5 |
| Address: 0x08EF  pulse code: 0xC0 | Address: 0x0925  pulse code: 0x55 | Address: 0x095B  pulse code: 0xD7 |
| Address: 0x08F0  pulse code: 0x80 | Address: 0x0926  pulse code: 0x59 | Address: 0x095C  pulse code: 0xD9 |
| Address: 0x08F1  pulse code: 0x84 | Address: 0x0927  pulse code: 0x5D | Address: 0x095D  pulse code: 0xDB |
| Address: 0x08F2  pulse code: 0x88 | Address: 0x0928  pulse code: 0x61 | Address: 0x095E  pulse code: 0xDD |
| Address: 0x08F3  pulse code: 0x8C | Address: 0x0929  pulse code: 0x65 | Address: 0x095F  pulse code: 0xC0 |
| Address: 0x08F4  pulse code: 0x90 | Address: 0x092A  pulse code: 0x6A | Address: 0x0960  pulse code: 0x40 |
| Address: 0x08F5  pulse code: 0x95 | Address: 0x092B  pulse code: 0x6E | Address: 0x0961  pulse code: 0x44 |
| Address: 0x08F6  pulse code: 0x99 | Address: 0x092C  pulse code: 0x72 | Address: 0x0962  pulse code: 0x48 |
| Address: 0x08F7  pulse code: 0x9D | Address: 0x092D  pulse code: 0x76 | Address: 0x0963  pulse code: 0x4C |
| Address: 0x08F8  pulse code: 0xA1 | Address: 0x092E  pulse code: 0x7A | Address: 0x0964  pulse code: 0x50 |
| Address: 0x08F9  pulse code: 0xA5 | Address: 0x092F  pulse code: 0xC0 | Address: 0x0965  pulse code: 0x55 |
| Address: 0x08FA  pulse code: 0xAA | Address: 0x0930  pulse code: 0x40 | Address: 0x0966  pulse code: 0x59 |
| Address: 0x08FB  pulse code: 0xAE | Address: 0x0931  pulse code: 0x44 | Address: 0x0967  pulse code: 0x5D |
| Address: 0x08FC  pulse code: 0xB2 | Address: 0x0932  pulse code: 0x48 | Address: 0x0968  pulse code: 0x61 |
| Address: 0x08FD  pulse code: 0xB6 | Address: 0x0933  pulse code: 0x4C | Address: 0x0969  pulse code: 0x65 |
| Address: 0x08FE  pulse code: 0xBA | Address: 0x0934  pulse code: 0x50 | Address: 0x096A  pulse code: 0x6A |
| Address: 0x08FF  pulse code: 0xC0 | Address: 0x0935  pulse code: 0x55 | Address: 0x096B  pulse code: 0x6E |
| Address: 0x0900  pulse code: 0x00 | Address: 0x0936  pulse code: 0x59 | Address: 0x096C  pulse code: 0x72 |
| Address: 0x0901  pulse code: 0xC2 | Address: 0x0937  pulse code: 0x5D | Address: 0x096D  pulse code: 0x76 |
| Address: 0x0902  pulse code: 0xC4 | Address: 0x0938  pulse code: 0x61 | Address: 0x096E  pulse code: 0x7A |
| Address: 0x0903  pulse code: 0xC6 | Address: 0x0939  pulse code: 0x65 | Address: 0x096F  pulse code: 0xC0 |
| Address: 0x0904  pulse code: 0xC8 | Address: 0x093A  pulse code: 0x6A | Address: 0x0970  pulse code: 0x40 |
| Address: 0x0905  pulse code: 0xCA | Address: 0x093B  pulse code: 0x6E | Address: 0x0971  pulse code: 0x44 |
| Address: 0x0906  pulse code: 0xCC | Address: 0x093C  pulse code: 0x72 | Address: 0x0972  pulse code: 0x48 |
| Address: 0x0907  pulse code: 0xCE | Address: 0x093D  pulse code: 0x76 | Address: 0x0973  pulse code: 0x4C |
| Address: 0x0908  pulse code: 0xD0 | Address: 0x093E  pulse code: 0x7A | Address: 0x0974  pulse code: 0x50 |
| Address: 0x0909  pulse code: 0xD2 | Address: 0x093F  pulse code: 0xC0 | Address: 0x0975  pulse code: 0x55 |
| Address: 0x090A  pulse code: 0xD5 | Address: 0x0940  pulse code: 0x00 | Address: 0x0976  pulse code: 0x59 |
| Address: 0x090B  pulse code: 0xD7 | Address: 0x0941  pulse code: 0xC2 | Address: 0x0977  pulse code: 0x5D |
| Address: 0x090C  pulse code: 0xD9 | Address: 0x0942  pulse code: 0xC4 | Address: 0x0978  pulse code: 0x61 |
| Address: 0x090D  pulse code: 0xDB | Address: 0x0943  pulse code: 0xC6 | Address: 0x0979  pulse code: 0x65 |

| | | | |
|---|---|---|---|
| Address: 0x097A pulse code: 0x6A | Address: 0x09B0 pulse code: 0x40 | Address: 0x09E6 pulse code: 0x99 |
| Address: 0x097B pulse code: 0x6E | Address: 0x09B1 pulse code: 0x44 | Address: 0x09E7 pulse code: 0x9D |
| Address: 0x097C pulse code: 0x72 | Address: 0x09B2 pulse code: 0x48 | Address: 0x09E8 pulse code: 0xA1 |
| Address: 0x097D pulse code: 0x76 | Address: 0x09B3 pulse code: 0x4C | Address: 0x09E9 pulse code: 0xA5 |
| Address: 0x097E pulse code: 0x7A | Address: 0x09B4 pulse code: 0x50 | Address: 0x09EA pulse code: 0xAA |
| Address: 0x097F pulse code: 0xC0 | Address: 0x09B5 pulse code: 0x55 | Address: 0x09EB pulse code: 0xAE |
| Address: 0x0980 pulse code: 0x00 | Address: 0x09B6 pulse code: 0x59 | Address: 0x09EC pulse code: 0xB2 |
| Address: 0x0981 pulse code: 0xC2 | Address: 0x09B7 pulse code: 0x5D | Address: 0x09ED pulse code: 0xB6 |
| Address: 0x0982 pulse code: 0xC4 | Address: 0x09B8 pulse code: 0x61 | Address: 0x09EE pulse code: 0xBA |
| Address: 0x0983 pulse code: 0xC6 | Address: 0x09B9 pulse code: 0x65 | Address: 0x09EF pulse code: 0xC0 |
| Address: 0x0984 pulse code: 0xC8 | Address: 0x09BA pulse code: 0x6A | Address: 0x09F0 pulse code: 0x80 |
| Address: 0x0985 pulse code: 0xCA | Address: 0x09BB pulse code: 0x6E | Address: 0x09F1 pulse code: 0x84 |
| Address: 0x0986 pulse code: 0xCC | Address: 0x09BC pulse code: 0x72 | Address: 0x09F2 pulse code: 0x88 |
| Address: 0x0987 pulse code: 0xCE | Address: 0x09BD pulse code: 0x76 | Address: 0x09F3 pulse code: 0x8C |
| Address: 0x0988 pulse code: 0xD0 | Address: 0x09BE pulse code: 0x7A | Address: 0x09F4 pulse code: 0x90 |
| Address: 0x0989 pulse code: 0xD2 | Address: 0x09BF pulse code: 0xC0 | Address: 0x09F5 pulse code: 0x95 |
| Address: 0x098A pulse code: 0xD5 | Address: 0x09C0 pulse code: 0x80 | Address: 0x09F6 pulse code: 0x99 |
| Address: 0x098B pulse code: 0xD7 | Address: 0x09C1 pulse code: 0x84 | Address: 0x09F7 pulse code: 0x9D |
| Address: 0x098C pulse code: 0xD9 | Address: 0x09C2 pulse code: 0x88 | Address: 0x09F8 pulse code: 0xA1 |
| Address: 0x098D pulse code: 0xDB | Address: 0x09C3 pulse code: 0x8C | Address: 0x09F9 pulse code: 0xA5 |
| Address: 0x098E pulse code: 0xDD | Address: 0x09C4 pulse code: 0x90 | Address: 0x09FA pulse code: 0xAA |
| Address: 0x098F pulse code: 0xC0 | Address: 0x09C5 pulse code: 0x95 | Address: 0x09FB pulse code: 0xAE |
| Address: 0x0990 pulse code: 0x00 | Address: 0x09C6 pulse code: 0x99 | Address: 0x09FC pulse code: 0xB2 |
| Address: 0x0991 pulse code: 0xC2 | Address: 0x09C7 pulse code: 0x9D | Address: 0x09FD pulse code: 0xB6 |
| Address: 0x0992 pulse code: 0xC4 | Address: 0x09C8 pulse code: 0xA1 | Address: 0x09FE pulse code: 0xBA |
| Address: 0x0993 pulse code: 0xC6 | Address: 0x09C9 pulse code: 0xA5 | Address: 0x09FF pulse code: 0xC0 |
| Address: 0x0994 pulse code: 0xC8 | Address: 0x09CA pulse code: 0xAA | Address: 0x0A00 pulse code: 0x00 |
| Address: 0x0995 pulse code: 0xCA | Address: 0x09CB pulse code: 0xAE | Address: 0x0A01 pulse code: 0xC2 |
| Address: 0x0996 pulse code: 0xCC | Address: 0x09CC pulse code: 0xB2 | Address: 0x0A02 pulse code: 0xC4 |
| Address: 0x0997 pulse code: 0xCE | Address: 0x09CD pulse code: 0xB6 | Address: 0x0A03 pulse code: 0xC6 |
| Address: 0x0998 pulse code: 0xD0 | Address: 0x09CE pulse code: 0xBA | Address: 0x0A04 pulse code: 0xC8 |
| Address: 0x0999 pulse code: 0xD2 | Address: 0x09CF pulse code: 0xC0 | Address: 0x0A05 pulse code: 0xCA |
| Address: 0x099A pulse code: 0xD5 | Address: 0x09D0 pulse code: 0x80 | Address: 0x0A06 pulse code: 0xCC |
| Address: 0x099B pulse code: 0xD7 | Address: 0x09D1 pulse code: 0x84 | Address: 0x0A07 pulse code: 0xCE |
| Address: 0x099C pulse code: 0xD9 | Address: 0x09D2 pulse code: 0x88 | Address: 0x0A08 pulse code: 0xD0 |
| Address: 0x099D pulse code: 0xDB | Address: 0x09D3 pulse code: 0x8C | Address: 0x0A09 pulse code: 0xD2 |
| Address: 0x099E pulse code: 0xDD | Address: 0x09D4 pulse code: 0x90 | Address: 0x0A0A pulse code: 0xD5 |
| Address: 0x099F pulse code: 0xC0 | Address: 0x09D5 pulse code: 0x95 | Address: 0x0A0B pulse code: 0xD7 |
| Address: 0x09A0 pulse code: 0x40 | Address: 0x09D6 pulse code: 0x99 | Address: 0x0A0C pulse code: 0xD9 |
| Address: 0x09A1 pulse code: 0x44 | Address: 0x09D7 pulse code: 0x9D | Address: 0x0A0D pulse code: 0xDB |
| Address: 0x09A2 pulse code: 0x48 | Address: 0x09D8 pulse code: 0xA1 | Address: 0x0A0E pulse code: 0xDD |
| Address: 0x09A3 pulse code: 0x4C | Address: 0x09D9 pulse code: 0xA5 | Address: 0x0A0F pulse code: 0xC0 |
| Address: 0x09A4 pulse code: 0x50 | Address: 0x09DA pulse code: 0xAA | Address: 0x0A10 pulse code: 0x00 |
| Address: 0x09A5 pulse code: 0x55 | Address: 0x09DB pulse code: 0xAE | Address: 0x0A11 pulse code: 0xC2 |
| Address: 0x09A6 pulse code: 0x59 | Address: 0x09DC pulse code: 0xB2 | Address: 0x0A12 pulse code: 0xC4 |
| Address: 0x09A7 pulse code: 0x5D | Address: 0x09DD pulse code: 0xB6 | Address: 0x0A13 pulse code: 0xC6 |
| Address: 0x09A8 pulse code: 0x61 | Address: 0x09DE pulse code: 0xBA | Address: 0x0A14 pulse code: 0xC8 |
| Address: 0x09A9 pulse code: 0x65 | Address: 0x09DF pulse code: 0xC0 | Address: 0x0A15 pulse code: 0xCA |
| Address: 0x09AA pulse code: 0x6A | Address: 0x09E0 pulse code: 0x80 | Address: 0x0A16 pulse code: 0xCC |
| Address: 0x09AB pulse code: 0x6E | Address: 0x09E1 pulse code: 0x84 | Address: 0x0A17 pulse code: 0xCE |
| Address: 0x09AC pulse code: 0x72 | Address: 0x09E2 pulse code: 0x88 | Address: 0x0A18 pulse code: 0xD0 |
| Address: 0x09AD pulse code: 0x76 | Address: 0x09E3 pulse code: 0x8C | Address: 0x0A19 pulse code: 0xD2 |
| Address: 0x09AE pulse code: 0x7A | Address: 0x09E4 pulse code: 0x90 | Address: 0x0A1A pulse code: 0xD5 |
| Address: 0x09AF pulse code: 0xC0 | Address: 0x09E5 pulse code: 0x95 | Address: 0x0A1B pulse code: 0xD7 |

| | | |
|---|---|---|
| Address: 0x0A1C pulse code: 0xD9 | Address: 0x0A52 pulse code: 0xC4 | Address: 0x0A88 pulse code: 0xD0 |
| Address: 0x0A1D pulse code: 0xDB | Address: 0x0A53 pulse code: 0xC6 | Address: 0x0A89 pulse code: 0xD2 |
| Address: 0x0A1E pulse code: 0xDD | Address: 0x0A54 pulse code: 0xC8 | Address: 0x0A8A pulse code: 0xD5 |
| Address: 0x0A1F pulse code: 0xC0 | Address: 0x0A55 pulse code: 0xCA | Address: 0x0A8B pulse code: 0xD7 |
| Address: 0x0A20 pulse code: 0x00 | Address: 0x0A56 pulse code: 0xCC | Address: 0x0A8C pulse code: 0xD9 |
| Address: 0x0A21 pulse code: 0xC2 | Address: 0x0A57 pulse code: 0xCE | Address: 0x0A8D pulse code: 0xDB |
| Address: 0x0A22 pulse code: 0xC4 | Address: 0x0A58 pulse code: 0xD0 | Address: 0x0A8E pulse code: 0xDD |
| Address: 0x0A23 pulse code: 0xC6 | Address: 0x0A59 pulse code: 0xD2 | Address: 0x0A8F pulse code: 0xC0 |
| Address: 0x0A24 pulse code: 0xC8 | Address: 0x0A5A pulse code: 0xD5 | Address: 0x0A90 pulse code: 0x00 |
| Address: 0x0A25 pulse code: 0xCA | Address: 0x0A5B pulse code: 0xD7 | Address: 0x0A91 pulse code: 0xC2 |
| Address: 0x0A26 pulse code: 0xCC | Address: 0x0A5C pulse code: 0xD9 | Address: 0x0A92 pulse code: 0xC4 |
| Address: 0x0A27 pulse code: 0xCE | Address: 0x0A5D pulse code: 0xDB | Address: 0x0A93 pulse code: 0xC6 |
| Address: 0x0A28 pulse code: 0xD0 | Address: 0x0A5E pulse code: 0xDD | Address: 0x0A94 pulse code: 0xC8 |
| Address: 0x0A29 pulse code: 0xD2 | Address: 0x0A5F pulse code: 0xC0 | Address: 0x0A95 pulse code: 0xCA |
| Address: 0x0A2A pulse code: 0xD5 | Address: 0x0A60 pulse code: 0x00 | Address: 0x0A96 pulse code: 0xCC |
| Address: 0x0A2B pulse code: 0xD7 | Address: 0x0A61 pulse code: 0xC2 | Address: 0x0A97 pulse code: 0xCE |
| Address: 0x0A2C pulse code: 0xD9 | Address: 0x0A62 pulse code: 0xC4 | Address: 0x0A98 pulse code: 0xD0 |
| Address: 0x0A2D pulse code: 0xDB | Address: 0x0A63 pulse code: 0xC6 | Address: 0x0A99 pulse code: 0xD2 |
| Address: 0x0A2E pulse code: 0xDD | Address: 0x0A64 pulse code: 0xC8 | Address: 0x0A9A pulse code: 0xD5 |
| Address: 0x0A2F pulse code: 0xC0 | Address: 0x0A65 pulse code: 0xCA | Address: 0x0A9B pulse code: 0xD7 |
| Address: 0x0A30 pulse code: 0x00 | Address: 0x0A66 pulse code: 0xCC | Address: 0x0A9C pulse code: 0xD9 |
| Address: 0x0A31 pulse code: 0xC2 | Address: 0x0A67 pulse code: 0xCE | Address: 0x0A9D pulse code: 0xDB |
| Address: 0x0A32 pulse code: 0xC4 | Address: 0x0A68 pulse code: 0xD0 | Address: 0x0A9E pulse code: 0xDD |
| Address: 0x0A33 pulse code: 0xC6 | Address: 0x0A69 pulse code: 0xD2 | Address: 0x0A9F pulse code: 0xC0 |
| Address: 0x0A34 pulse code: 0xC8 | Address: 0x0A6A pulse code: 0xD5 | Address: 0x0AA0 pulse code: 0x00 |
| Address: 0x0A35 pulse code: 0xCA | Address: 0x0A6B pulse code: 0xD7 | Address: 0x0AA1 pulse code: 0xC2 |
| Address: 0x0A36 pulse code: 0xCC | Address: 0x0A6C pulse code: 0xD9 | Address: 0x0AA2 pulse code: 0xC4 |
| Address: 0x0A37 pulse code: 0xCE | Address: 0x0A6D pulse code: 0xDB | Address: 0x0AA3 pulse code: 0xC6 |
| Address: 0x0A38 pulse code: 0xD0 | Address: 0x0A6E pulse code: 0xDD | Address: 0x0AA4 pulse code: 0xC8 |
| Address: 0x0A39 pulse code: 0xD2 | Address: 0x0A6F pulse code: 0xC0 | Address: 0x0AA5 pulse code: 0xCA |
| Address: 0x0A3A pulse code: 0xD5 | Address: 0x0A70 pulse code: 0x00 | Address: 0x0AA6 pulse code: 0xCC |
| Address: 0x0A3B pulse code: 0xD7 | Address: 0x0A71 pulse code: 0x04 | Address: 0x0AA7 pulse code: 0xCE |
| Address: 0x0A3C pulse code: 0xD9 | Address: 0x0A72 pulse code: 0x08 | Address: 0x0AA8 pulse code: 0xD0 |
| Address: 0x0A3D pulse code: 0xDB | Address: 0x0A73 pulse code: 0x0C | Address: 0x0AA9 pulse code: 0xD2 |
| Address: 0x0A3E pulse code: 0xDD | Address: 0x0A74 pulse code: 0x10 | Address: 0x0AAA pulse code: 0xD5 |
| Address: 0x0A3F pulse code: 0xC0 | Address: 0x0A75 pulse code: 0x15 | Address: 0x0AAB pulse code: 0xD7 |
| Address: 0x0A40 pulse code: 0x00 | Address: 0x0A76 pulse code: 0x19 | Address: 0x0AAC pulse code: 0xD9 |
| Address: 0x0A41 pulse code: 0xC2 | Address: 0x0A77 pulse code: 0x1D | Address: 0x0AAD pulse code: 0xDB |
| Address: 0x0A42 pulse code: 0xC4 | Address: 0x0A78 pulse code: 0x21 | |
| Address: 0x0A43 pulse code: 0xC6 | Address: 0x0A79 pulse code: 0x25 | Address: 0x0AAE pulse code: 0xDD |
| Address: 0x0A44 pulse code: 0xC8 | Address: 0x0A7A pulse code: 0x2A | |
| Address: 0x0A45 pulse code: 0xCA | Address: 0x0A7B pulse code: 0x2E | Address: 0x0AAF pulse code: 0xC0 |
| Address: 0x0A46 pulse code: 0xCC | Address: 0x0A7C pulse code: 0x32 | Address: 0x0AB0 pulse code: 0x00 |
| Address: 0x0A47 pulse code: 0xCE | Address: 0x0A7D pulse code: 0x36 | Address: 0x0AB1 pulse code: 0xC2 |
| Address: 0x0A48 pulse code: 0xD0 | Address: 0x0A7E pulse code: 0x3A | Address: 0x0AB2 pulse code: 0xC4 |
| Address: 0x0A49 pulse code: 0xD2 | Address: 0x0A7F pulse code: 0xC0 | Address: 0x0AB3 pulse code: 0xC6 |
| Address: 0x0A4A pulse code: 0xD5 | Address: 0x0A80 pulse code: 0x00 | Address: 0x0AB4 pulse code: 0xC8 |
| Address: 0x0A4B pulse code: 0xD7 | Address: 0x0A81 pulse code: 0xC2 | Address: 0x0AB5 pulse code: 0xCA |
| Address: 0x0A4C pulse code: 0xD9 | Address: 0x0A82 pulse code: 0xC4 | Address: 0x0AB6 pulse code: 0xCC |
| Address: 0x0A4D pulse code: 0xDB | Address: 0x0A83 pulse code: 0xC6 | Address: 0x0AB7 pulse code: 0xCE |
| Address: 0x0A4E pulse code: 0xDD | Address: 0x0A84 pulse code: 0xC8 | Address: 0x0AB8 pulse code: 0xD0 |
| Address: 0x0A4F pulse code: 0xC0 | Address: 0x0A85 pulse code: 0xCA | Address: 0x0AB9 pulse code: 0xD2 |
| Address: 0x0A50 pulse code: 0x00 | Address: 0x0A86 pulse code: 0xCC | Address: 0x0ABA pulse code: 0xD5 |
| Address: 0x0A51 pulse code: 0xC2 | Address: 0x0A87 pulse code: 0xCE | Address: 0x0ABB pulse code: 0xD7 |

| Address: 0x0ABC | pulse code: 0xD9 | Address: 0x0AEB | pulse code: 0xAE | Address: 0x0B20 | pulse code: 0x40 |
| Address: 0x0ABD | pulse code: 0xDB | Address: 0x0AEC | pulse code: 0xB2 | Address: 0x0B21 | pulse code: 0x44 |
| Address: 0x0ABE | pulse code: 0xDD | Address: 0x0AED | pulse code: 0xB6 | Address: 0x0B22 | pulse code: 0x48 |
| Address: 0x0ABF | pulse code: 0xC0 | Address: 0x0AEE | pulse code: 0xBA | Address: 0x0B23 | pulse code: 0x4C |
| Address: 0x0AC0 | pulse code: 0x80 | Address: 0x0AEF | pulse code: 0xC0 | Address: 0x0B24 | pulse code: 0x50 |
| Address: 0x0AC1 | pulse code: 0x84 | Address: 0x0AF0 | pulse code: 0x80 | Address: 0x0B25 | pulse code: 0x55 |
| Address: 0x0AC2 | pulse code: 0x88 | Address: 0x0AF1 | pulse code: 0x84 | Address: 0x0B26 | pulse code: 0x59 |
| Address: 0x0AC3 | pulse code: 0x8C | Address: 0x0AF2 | pulse code: 0x88 | Address: 0x0B27 | pulse code: 0x5D |
| Address: 0x0AC4 | pulse code: 0x90 | Address: 0x0AF3 | pulse code: 0x8C | Address: 0x0B28 | pulse code: 0x61 |
| Address: 0x0AC5 | pulse code: 0x95 | Address: 0x0AF4 | pulse code: 0x90 | Address: 0x0B29 | pulse code: 0x65 |
| Address: 0x0AC6 | pulse code: 0x99 | Address: 0x0AF5 | pulse code: 0x95 | Address: 0x0B2A | pulse code: 0x6A |
| Address: 0x0AC7 | pulse code: 0x9D | Address: 0x0AF6 | pulse code: 0x99 | Address: 0x0B2B | pulse code: 0x6E |
| Address: 0x0AC8 | pulse code: 0xA1 | Address: 0x0AF7 | pulse code: 0x9D | Address: 0x0B2C | pulse code: 0x72 |
| Address: 0x0AC9 | pulse code: 0xA5 | Address: 0x0AF8 | pulse code: 0xA1 | Address: 0x0B2D | pulse code: 0x76 |
| Address: 0x0ACA | pulse code: 0xAA | Address: 0x0AF9 | pulse code: 0xA5 | Address: 0x0B2E | pulse code: 0x7A |
| Address: 0x0ACB | pulse code: 0xAE | Address: 0x0AFA | pulse code: 0xAA | Address: 0x0B2F | pulse code: 0xC0 |
| Address: 0x0ACC | pulse code: 0xB2 | Address: 0x0AFB | pulse code: 0xAE | Address: 0x0B30 | pulse code: 0x40 |
| Address: 0x0ACD | pulse code: 0xB6 | Address: 0x0AFC | pulse code: 0xB2 | Address: 0x0B31 | pulse code: 0x44 |
| Address: 0x0ACE | pulse code: 0xBA | Address: 0x0AFD | pulse code: 0xB6 | Address: 0x0B32 | pulse code: 0x48 |
| Address: 0x0ACF | pulse code: 0xC0 | Address: 0x0AFE | pulse code: 0xBA | Address: 0x0B33 | pulse code: 0x4C |
| Address: 0x0AD0 | pulse code: 0x80 | Address: 0x0AFF | pulse code: 0xC0 | Address: 0x0B34 | pulse code: 0x50 |
| Address: 0x0AD1 | pulse code: 0x84 | Address: 0x0B00 | pulse code: 0x00 | Address: 0x0B35 | pulse code: 0x55 |
| Address: 0x0AD2 | pulse code: 0x88 | Address: 0x0B01 | pulse code: 0xC2 | Address: 0x0B36 | pulse code: 0x59 |
| Address: 0x0AD3 | pulse code: 0x8C | Address: 0x0B02 | pulse code: 0xC4 | Address: 0x0B37 | pulse code: 0x5D |
| Address: 0x0AD4 | pulse code: 0x90 | Address: 0x0B03 | pulse code: 0xC6 | Address: 0x0B38 | pulse code: 0x61 |
| Address: 0x0AD5 | pulse code: 0x95 | Address: 0x0B04 | pulse code: 0xC8 | Address: 0x0B39 | pulse code: 0x65 |
| Address: 0x0AD6 | pulse code: 0x99 | Address: 0x0B05 | pulse code: 0xCA | Address: 0x0B3A | pulse code: 0x6A |
| Address: 0x0AD7 | pulse code: 0x9D | Address: 0x0B06 | pulse code: 0xCC | Address: 0x0B3B | pulse code: 0x6E |
| Address: 0x0AD8 | pulse code: 0xA1 | Address: 0x0B07 | pulse code: 0xCE | Address: 0x0B3C | pulse code: 0x72 |
| Address: 0x0AD9 | pulse code: 0xA5 | Address: 0x0B08 | pulse code: 0xD0 | Address: 0x0B3D | pulse code: 0x76 |
| Address: 0x0ADA | pulse code: 0xAA | Address: 0x0B09 | pulse code: 0xD2 | Address: 0x0B3E | pulse code: 0x7A |
| Address: 0x0ADB | pulse code: 0xAE | Address: 0x0B0A | pulse code: 0xD5 | Address: 0x0B3F | pulse code: 0xC0 |
| Address: 0x0ADC | pulse code: 0xB2 | Address: 0x0B0B | pulse code: 0xD7 | Address: 0x0B40 | pulse code: 0x00 |
| Address: 0x0ADD | pulse code: 0xB6 | Address: 0x0B0C | pulse code: 0xD9 | Address: 0x0B41 | pulse code: 0xC2 |
| Address: 0x0ADE | pulse code: 0xBA | Address: 0x0B0D | pulse code: 0xDB | Address: 0x0B42 | pulse code: 0xC4 |
| Address: 0x0ADF | pulse code: 0xC0 | Address: 0x0B0E | pulse code: 0xDD | Address: 0x0B43 | pulse code: 0xC6 |
| Address: 0x0AE0 | pulse code: 0x80 | Address: 0x0B0F | pulse code: 0xC0 | Address: 0x0B44 | pulse code: 0xC8 |
| Address: 0x0AE1 | pulse code: 0x84 | Address: 0x0B10 | pulse code: 0x00 | Address: 0x0B45 | pulse code: 0xCA |
| Address: 0x0AE2 | pulse code: 0x88 | Address: 0x0B11 | pulse code: 0xC2 | Address: 0x0B46 | pulse code: 0xCC |
| Address: 0x0AE3 | pulse code: 0x8C | Address: 0x0B12 | pulse code: 0xC4 | Address: 0x0B47 | pulse code: 0xCE |
| Address: 0x0AE4 | pulse code: 0x90 | Address: 0x0B13 | pulse code: 0xC6 | Address: 0x0B48 | pulse code: 0xD0 |
| Address: 0x0AE5 | pulse code: 0x95 | Address: 0x0B14 | pulse code: 0xC8 | Address: 0x0B49 | pulse code: 0xD2 |
| Address: 0x0AE6 | pulse code: 0x99 | Address: 0x0B15 | pulse code: 0xCA | Address: 0x0B4A | pulse code: 0xD |
| Address: 0x0AE7 | pulse code: 0x9D | Address: 0x0B16 | pulse code: 0xCC | Address: 0x0B4B | pulse code: 0xD |
| Address: 0x0AE8 | pulse code: 0xA1 | Address: 0x0B17 | pulse code: 0xCE | Address: 0x0B4C | pulse code: 0xD |
| Address: 0x0AE9 | pulse code: 0xA5 | Address: 0x0B18 | pulse code: 0xD0 | Address: 0x0B4D | pulse code: 0xD |
| Address: 0x0AEA | pulse code: 0xAA | Address: 0x0B19 | pulse code: 0xD2 | Address: 0x0B4E | pulse code: 0xD |
| | | Address: 0x0B1A | pulse code: 0xD5 | Address: 0x0B4F | pulse code: 0xC0 |
| | | Address: 0x0B1B | pulse code: 0xD7 | Address: 0x0B50 | pulse code: 0x00 |
| | | Address: 0x0B1C | pulse code: 0xD9 | Address: 0x0B51 | pulse code: 0xC2 |
| | | Address: 0x0B1D | pulse code: 0xDB | Address: 0x0B52 | pulse code: 0xC4 |
| | | Address: 0x0B1E | pulse code: 0xDD | Address: 0x0B53 | pulse code: 0xC6 |
| | | Address: 0x0B1F | pulse code: 0xC0 | Address: 0x0B54 | pulse code: 0xC8 |
| | | | | Address: 0x0B55 | pulse code: 0xCA |

| Address: 0x0B56 | pulse code: 0xCC | Address: 0x0B8C | pulse code: 0xD9 | Address: 0x0BC2 | pulse code: 0x! |
|---|---|---|---|---|---|
| Address: 0x0B57 | pulse code: 0xCE | Address: 0x0B8D | pulse code: 0xDB | Address: 0x0BC3 | pulse code: 0x! |
| Address: 0x0B58 | pulse code: 0xD0 | Address: 0x0B8E | pulse code: 0xDD | Address: 0x0BC4 | pulse code: 0x! |
| Address: 0x0B59 | pulse code: 0xD2 | Address: 0x0B8F | pulse code: 0xC0 | Address: 0x0BC5 | pulse code: 0x! |
| Address: 0x0B5A | pulse code: 0xD5 | Address: 0x0B90 | pulse code: 0x00 | Address: 0x0BC6 | pulse code: 0x! |
| Address: 0x0B5B | pulse code: 0xD7 | Address: 0x0B91 | pulse code: 0xC2 | Address: 0x0BC7 | pulse code: 0x! |
| Address: 0x0B5C | pulse code: 0xD9 | Address: 0x0B92 | pulse code: 0xC4 | Address: 0x0BC8 | pulse code: 0x, |
| Address: 0x0B5D | pulse code: 0xDB | Address: 0x0B93 | pulse code: 0xC6 | Address: 0x0BC9 | pulse code: 0x, |
| Address: 0x0B5E | pulse code: 0xDD | Address: 0x0B94 | pulse code: 0xC8 | Address: 0x0BCA | pulse code: 0xAA |
| Address: 0x0B5F | pulse code: 0xC0 | Address: 0x0B95 | pulse code: 0xCA | Address: 0x0BCB | pulse code: 0x |
| Address: 0x0B60 | pulse code: 0x40 | Address: 0x0B96 | pulse code: 0xCC | Address: 0x0BCC | pulse code: 0x |
| Address: 0x0B61 | pulse code: 0x44 | Address: 0x0B97 | pulse code: 0xCE | Address: 0x0BCD | pulse code: 0x |
| Address: 0x0B62 | pulse code: 0x48 | Address: 0x0B98 | pulse code: 0xD0 | Address: 0x0BCE | pulse code: 0x: |
| Address: 0x0B63 | pulse code: 0x4C | Address: 0x0B99 | pulse code: 0xD2 | Address: 0x0BCF | pulse code: 0x( |
| Address: 0x0B64 | pulse code: 0x50 | Address: 0x0B9A | pulse code: 0xD5 | Address: 0x0BD0 | pulse code: 0x! |
| Address: 0x0B65 | pulse code: 0x55 | Address: 0x0B9B | pulse code: 0xD7 | Address: 0x0BD1 | pulse code: 0x! |
| Address: 0x0B66 | pulse code: 0x59 | Address: 0x0B9C | pulse code: 0xD9 | Address: 0x0BD2 | pulse code: 0x! |
| Address: 0x0B67 | pulse code: 0x5D | Address: 0x0B9D | pulse code: 0xDB | Address: 0x0BD3 | pulse code: 0x! |
| Address: 0x0B68 | pulse code: 0x61 | Address: 0x0B9E | pulse code: 0xDD | Address: 0x0BD4 | pulse code: 0x! |
| Address: 0x0B69 | pulse code: 0x65 | Address: 0x0B9F | pulse code: 0xC0 | Address: 0x0BD5 | pulse code: 0x! |
| Address: 0x0B6A | pulse code: 0x6A | Address: 0x0BA0 | pulse code: 0x40 | Address: 0x0BD6 | pulse code: 0x! |
| Address: 0x0B6B | pulse code: 0x6E | Address: 0x0BA1 | pulse code: 0x44 | Address: 0x0BD7 | pulse code: 0x! |
| Address: 0x0B6C | pulse code: 0x72 | Address: 0x0BA2 | pulse code: 0x48 | Address: 0x0BD8 | pulse code: 0x, |
| Address: 0x0B6D | pulse code: 0x76 | Address: 0x0BA3 | pulse code: 0x4C | Address: 0x0BD9 | pulse code: 0x, |
| Address: 0x0B6E | pulse code: 0x7A | Address: 0x0BA4 | pulse code: 0x50 | Address: 0x0BDA | pulse code: 0xAA |
| Address: 0x0B6F | pulse code: 0xC0 | Address: 0x0BA5 | pulse code: 0x55 | Address: 0x0BDB | pulse code: 0x |
| Address: 0x0B70 | pulse code: 0x40 | Address: 0x0BA6 | pulse code: 0x59 | Address: 0x0BDC | pulse code: 0x |
| Address: 0x0B71 | pulse code: 0x44 | Address: 0x0BA7 | pulse code: 0x5D | Address: 0x0BDD | pulse code: 0x |
| Address: 0x0B72 | pulse code: 0x48 | Address: 0x0BA8 | pulse code: 0x61 | Address: 0x0BDE | pulse code: 0x: |
| Address: 0x0B73 | pulse code: 0x4C | Address: 0x0BA9 | pulse code: 0x65 | Address: 0x0BDF | pulse code: 0x( |
| Address: 0x0B74 | pulse code: 0x50 | Address: 0x0BAA | pulse code: 0x6A | Address: 0x0BE0 | pulse code: 0x8 |
| Address: 0x0B75 | pulse code: 0x55 | Address: 0x0BAB | pulse code: 0x6E | Address: 0x0BE1 | pulse code: 0x8 |
| Address: 0x0B76 | pulse code: 0x59 | Address: 0x0BAC | pulse code: 0x72 | Address: 0x0BE2 | pulse code: 0x8 |
| Address: 0x0B77 | pulse code: 0x5D | Address: 0x0BAD | pulse code: 0x76 | Address: 0x0BE3 | pulse code: 0x8 |
| Address: 0x0B78 | pulse code: 0x61 | Address: 0x0BAE | pulse code: 0x7A | Address: 0x0BE4 | pulse code: 0x! |
| Address: 0x0B79 | pulse code: 0x65 | Address: 0x0BAF | pulse code: 0xC0 | Address: 0x0BE5 | pulse code: 0x! |
| Address: 0x0B7A | pulse code: 0x6A | Address: 0x0BB0 | pulse code: 0x40 | Address: 0x0BE6 | pulse code: 0x! |
| Address: 0x0B7B | pulse code: 0x6E | Address: 0x0BB1 | pulse code: 0x44 | Address: 0x0BE7 | pulse code: 0x! |
| Address: 0x0B7C | pulse code: 0x72 | Address: 0x0BB2 | pulse code: 0x48 | Address: 0x0BE8 | pulse code: 0x/ |
| Address: 0x0B7D | pulse code: 0x76 | Address: 0x0BB3 | pulse code: 0x4C | Address: 0x0BE9 | pulse code: 0x/ |
| Address: 0x0B7E | pulse code: 0x7A | Address: 0x0BB4 | pulse code: 0x50 | Address: 0x0BEA | pulse code: 0xAA |
| Address: 0x0B7F | pulse code: 0xC0 | Address: 0x0BB5 | pulse code: 0x55 | Address: 0x0BEB | pulse code: 0x. |
| Address: 0x0B80 | pulse code: 0x00 | Address: 0x0BB6 | pulse code: 0x59 | Address: 0x0BEC | pulse code: 0x: |
| Address: 0x0B81 | pulse code: 0xC2 | Address: 0x0BB7 | pulse code: 0x5D | Address: 0x0BED | pulse code: 0x |
| Address: 0x0B82 | pulse code: 0xC4 | Address: 0x0BB8 | pulse code: 0x61 | Address: 0x0BEE | pulse code: 0xl |
| Address: 0x0B83 | pulse code: 0xC6 | Address: 0x0BB9 | pulse code: 0x65 | Address: 0x0BEF | pulse code: 0x( |
| Address: 0x0B84 | pulse code: 0xC8 | Address: 0x0BBA | pulse code: 0x6A | Address: 0x0BF0 | pulse code: 0x8 |
| Address: 0x0B85 | pulse code: 0xCA | Address: 0x0BBB | pulse code: 0x6E | Address: 0x0BF1 | pulse code: 0x8 |
| Address: 0x0B86 | pulse code: 0xCC | Address: 0x0BBC | pulse code: 0x72 | Address: 0x0BF2 | pulse code: 0x8 |
| Address: 0x0B87 | pulse code: 0xCE | Address: 0x0BBD | pulse code: 0x76 | Address: 0x0BF3 | pulse code: 0x8 |
| Address: 0x0B88 | pulse code: 0xD0 | Address: 0x0BBE | pulse code: 0x7A | Address: 0x0BF4 | pulse code: 0x9 |
| Address: 0x0B89 | pulse code: 0xD2 | Address: 0x0BBF | pulse code: 0xC0 | | |
| Address: 0x0B8A | pulse code: 0xD5 | Address: 0x0BC0 | pulse code: 0x80 | | |
| Address: 0x0B8B | pulse code: 0xD7 | Address: 0x0BC1 | pulse code: 0x84 | | |

| | | |
|---|---|---|
| Address: 0x0BF5  pulse code: 0x95 | Address: 0x0C2B  pulse code: 0xD7 | Address: 0x0C61  pulse code: 0x |
| Address: 0x0BF6  pulse code: 0x99 | Address: 0x0C2C  pulse code: 0xD9 | Address: 0x0C62  pulse code: 0x |
| Address: 0x0BF7  pulse code: 0x9D | Address: 0x0C2D  pulse code: 0xDB | Address: 0x0C63  pulse code: 0x |
| Address: 0x0BF8  pulse code: 0xA1 | Address: 0x0C2E  pulse code: 0xDD | Address: 0x0C64  pulse code: 0x |
| Address: 0x0BF9  pulse code: 0xA5 | Address: 0x0C2F  pulse code: 0xC0 | Address: 0x0C65  pulse code: 0x |
| Address: 0x0BFA  pulse code: 0xAA | Address: 0x0C30  pulse code: 0x00 | Address: 0x0C66  pulse code: 0x |
| Address: 0x0BFB  pulse code: 0xAE | Address: 0x0C31  pulse code: 0xC2 | Address: 0x0C67  pulse code: 0x |
| Address: 0x0BFC  pulse code: 0xB2 | Address: 0x0C32  pulse code: 0xC4 | Address: 0x0C68  pulse code: 0x |
| Address: 0x0BFD  pulse code: 0xB6 | Address: 0x0C33  pulse code: 0xC6 | Address: 0x0C69  pulse code: 0x |
| Address: 0x0BFE  pulse code: 0xBA | Address: 0x0C34  pulse code: 0xC8 | Address: 0x0C6A  pulse code: 0 |
| Address: 0x0BFF  pulse code: 0xC0 | Address: 0x0C35  pulse code: 0xCA | Address: 0x0C6B  pulse code: 0 |
| Address: 0x0C00  pulse code: 0x00 | Address: 0x0C36  pulse code: 0xCC | Address: 0x0C6C  pulse code: 0 |
| Address: 0x0C01  pulse code: 0xC2 | Address: 0x0C37  pulse code: 0xCE | Address: 0x0C6D  pulse code: 0 |
| Address: 0x0C02  pulse code: 0xC4 | Address: 0x0C38  pulse code: 0xD0 | Address: 0x0C6E  pulse code: 0 |
| Address: 0x0C03  pulse code: 0xC6 | Address: 0x0C39  pulse code: 0xD2 | Address: 0x0C6F  pulse code: 0x |
| Address: 0x0C04  pulse code: 0xC8 | Address: 0x0C3A  pulse code: 0xD5 | Address: 0x0C70  pulse code: 0x |
| Address: 0x0C05  pulse code: 0xCA | Address: 0x0C3B  pulse code: 0xD7 | Address: 0x0C71  pulse code: 0x |
| Address: 0x0C06  pulse code: 0xCC | Address: 0x0C3C  pulse code: 0xD9 | Address: 0x0C72  pulse code: 0x |
| Address: 0x0C07  pulse code: 0xCE | Address: 0x0C3D  pulse code: 0xDB | Address: 0x0C73  pulse code: 0x |
| Address: 0x0C08  pulse code: 0xD0 | Address: 0x0C3E  pulse code: 0xDD | Address: 0x0C74  pulse code: 0x |
| Address: 0x0C09  pulse code: 0xD2 | Address: 0x0C3F  pulse code: 0xC0 | Address: 0x0C75  pulse code: 0x |
| Address: 0x0C0A  pulse code: 0xD5 | Address: 0x0C40  pulse code: 0x00 | Address: 0x0C76  pulse code: 0x |
| Address: 0x0C0B  pulse code: 0xD7 | Address: 0x0C41  pulse code: 0xC2 | Address: 0x0C77  pulse code: 0x |
| Address: 0x0C0C  pulse code: 0xD9 | Address: 0x0C42  pulse code: 0xC4 | Address: 0x0C78  pulse code: 0x |
| Address: 0x0C0D  pulse code: 0xDB | Address: 0x0C43  pulse code: 0xC6 | Address: 0x0C79  pulse code: 0x |
| Address: 0x0C0E  pulse code: 0xDD | Address: 0x0C44  pulse code: 0xC8 | Address: 0x0C7A  pulse code: 0 |
| Address: 0x0C0F  pulse code: 0xC0 | Address: 0x0C45  pulse code: 0xCA | Address: 0x0C7B  pulse code: 0 |
| Address: 0x0C10  pulse code: 0x00 | Address: 0x0C46  pulse code: 0xCC | Address: 0x0C7C  pulse code: 0 |
| Address: 0x0C11  pulse code: 0xC2 | Address: 0x0C47  pulse code: 0xCE | Address: 0x0C7D  pulse code: 0 |
| Address: 0x0C12  pulse code: 0xC4 | Address: 0x0C48  pulse code: 0xD0 | Address: 0x0C7E  pulse code: 0 |
| Address: 0x0C13  pulse code: 0xC6 | Address: 0x0C49  pulse code: 0xD2 | Address: 0x0C7F  pulse code: 0x |
| Address: 0x0C14  pulse code: 0xC8 | Address: 0x0C4A  pulse code: 0xD5 | Address: 0x0C80  pulse code: 0x |
| Address: 0x0C15  pulse code: 0xCA | Address: 0x0C4B  pulse code: 0xD7 | Address: 0x0C81  pulse code: 0x |
| Address: 0x0C16  pulse code: 0xCC | Address: 0x0C4C  pulse code: 0xD9 | Address: 0x0C82  pulse code: 0x |
| Address: 0x0C17  pulse code: 0xCE | Address: 0x0C4D  pulse code: 0xDB | Address: 0x0C83  pulse code: 0x |
| Address: 0x0C18  pulse code: 0xD0 | Address: 0x0C4E  pulse code: 0xDD | Address: 0x0C84  pulse code: 0x |
| Address: 0x0C19  pulse code: 0xD2 | Address: 0x0C4F  pulse code: 0xC0 | Address: 0x0C85  pulse code: 0x |
| Address: 0x0C1A  pulse code: 0xD5 | Address: 0x0C50  pulse code: 0x00 | Address: 0x0C86  pulse code: 0x |
| Address: 0x0C1B  pulse code: 0xD7 | Address: 0x0C51  pulse code: 0xC2 | Address: 0x0C87  pulse code: 0x |
| Address: 0x0C1C  pulse code: 0xD9 | Address: 0x0C52  pulse code: 0xC4 | Address: 0x0C88  pulse code: 0x |
| Address: 0x0C1D  pulse code: 0xDB | Address: 0x0C53  pulse code: 0xC6 | Address: 0x0C89  pulse code: 0x |
| Address: 0x0C1E  pulse code: 0xDD | Address: 0x0C54  pulse code: 0xC8 | Address: 0x0C8A  pulse code: 0 |
| Address: 0x0C1F  pulse code: 0xC0 | Address: 0x0C55  pulse code: 0xCA | Address: 0x0C8B  pulse code: 0 |
| Address: 0x0C20  pulse code: 0x00 | Address: 0x0C56  pulse code: 0xCC | Address: 0x0C8C  pulse code: 0 |
| Address: 0x0C21  pulse code: 0xC2 | Address: 0x0C57  pulse code: 0xCE | Address: 0x0C8D  pulse code: 0 |
| Address: 0x0C22  pulse code: 0xC4 | Address: 0x0C58  pulse code: 0xD0 | Address: 0x0C8E  pulse code: 0 |
| Address: 0x0C23  pulse code: 0xC6 | Address: 0x0C59  pulse code: 0xD2 | Address: 0x0C8F  pulse code: 0x |
| Address: 0x0C24  pulse code: 0xC8 | Address: 0x0C5A  pulse code: 0xD5 | Address: 0x0C90  pulse code: 0x |
| Address: 0x0C25  pulse code: 0xCA | Address: 0x0C5B  pulse code: 0xD7 | Address: 0x0C91  pulse code: 0x |
| Address: 0x0C26  pulse code: 0xCC | Address: 0x0C5C  pulse code: 0xD9 | Address: 0x0C92  pulse code: 0x |
| Address: 0x0C27  pulse code: 0xCE | Address: 0x0C5D  pulse code: 0xDB | Address: 0x0C93  pulse code: 0x |
| Address: 0x0C28  pulse code: 0xD0 | Address: 0x0C5E  pulse code: 0xDD | Address: 0x0C94  pulse code: 0x |
| Address: 0x0C29  pulse code: 0xD2 | Address: 0x0C5F  pulse code: 0xC0 | Address: 0x0C95  pulse code: 0x |
| Address: 0x0C2A  pulse code: 0xD5 | Address: 0x0C60  pulse code: 0x00 | Address: 0x0C96  pulse code: 0x |

| | | |
|---|---|---|
| Address: 0x0C97 pulse code: 0xCE | Address: 0x0CCA pulse code: 0xAA | Address: 0x0CFD pulse code: 0 |
| Address: 0x0C98 pulse code: 0xD0 | Address: 0x0CCB pulse code: 0xAE | Address: 0x0CFE pulse code: 0 |
| Address: 0x0C99 pulse code: 0xD2 | Address: 0x0CCC pulse code: 0xB2 | Address: 0x0CFF pulse code: 0 |
| Address: 0x0C9A pulse code: 0xD5 | Address: 0x0CCD pulse code: 0xB6 | Address: 0x0D00 pulse code: 0 |
| Address: 0x0C9B pulse code: 0xD7 | Address: 0x0CCE pulse code: 0xBA | Address: 0x0D01 pulse code: 0 |
| Address: 0x0C9C pulse code: 0xD9 | Address: 0x0CCF pulse code: 0xC0 | Address: 0x0D02 pulse code: 0 |
| Address: 0x0C9D pulse code: 0xDB | Address: 0x0CD0 pulse code: 0x80 | Address: 0x0D03 pulse code: 0 |
| Address: 0x0C9E pulse code: 0xDD | Address: 0x0CD1 pulse code: 0x84 | Address: 0x0D04 pulse code: 0 |
| Address: 0x0C9F pulse code: 0xC0 | Address: 0x0CD2 pulse code: 0x88 | Address: 0x0D05 pulse code: 0 |
| Address: 0x0CA0 pulse code: 0x00 | Address: 0x0CD3 pulse code: 0x8C | Address: 0x0D06 pulse code: 0 |
| Address: 0x0CA1 pulse code: 0xC2 | Address: 0x0CD4 pulse code: 0x90 | Address: 0x0D07 pulse code: 0 |
| Address: 0x0CA2 pulse code: 0xC4 | Address: 0x0CD5 pulse code: 0x95 | Address: 0x0D08 pulse code: 0 |
| Address: 0x0CA3 pulse code: 0xC6 | Address: 0x0CD6 pulse code: 0x99 | Address: 0x0D09 pulse code: 0 |
| Address: 0x0CA4 pulse code: 0xC8 | Address: 0x0CD7 pulse code: 0x9D | Address: 0x0D0A pulse code: 0 |
| Address: 0x0CA5 pulse code: 0xCA | Address: 0x0CD8 pulse code: 0xA1 | Address: 0x0D0B pulse code: 0 |
| Address: 0x0CA6 pulse code: 0xCC | Address: 0x0CD9 pulse code: 0xA5 | Address: 0x0D0C pulse code: 0 |
| Address: 0x0CA7 pulse code: 0xCE | Address: 0x0CDA pulse code: 0xAA | Address: 0x0D0D pulse code: 0 |
| Address: 0x0CA8 pulse code: 0xD0 | Address: 0x0CDB pulse code: 0xAE | Address: 0x0D0E pulse code: 0 |
| Address: 0x0CA9 pulse code: 0xD2 | Address: 0x0CDC pulse code: 0xB2 | Address: 0x0D0F pulse code: 0 |
| Address: 0x0CAA pulse code: 0xD5 | Address: 0x0CDD pulse code: 0xB6 | Address: 0x0D10 pulse code: 0 |
| Address: 0x0CAB pulse code: 0xD7 | Address: 0x0CDE pulse code: 0xBA | Address: 0x0D11 pulse code: 0 |
| Address: 0x0CAC pulse code: 0xD9 | Address: 0x0CDF pulse code: 0xC0 | Address: 0x0D12 pulse code: 0 |
| Address: 0x0CAD pulse code: 0xDB | Address: 0x0CE0 pulse code: 0x80 | Address: 0x0D13 pulse code: 0 |
| Address: 0x0CAE pulse code: 0xDD | Address: 0x0CE1 pulse code: 0x84 | Address: 0x0D14 pulse code: 0 |
| Address: 0x0CAF pulse code: 0xC0 | Address: 0x0CE2 pulse code: 0x88 | Address: 0x0D15 pulse code: 0 |
| Address: 0x0CB0 pulse code: 0x00 | Address: 0x0CE3 pulse code: 0x8C | Address: 0x0D16 pulse code: 0 |
| Address: 0x0CB1 pulse code: 0xC2 | Address: 0x0CE4 pulse code: 0x90 | Address: 0x0D17 pulse code: 0 |
| Address: 0x0CB2 pulse code: 0xC4 | Address: 0x0CE5 pulse code: 0x95 | Address: 0x0D18 pulse code: 0 |
| Address: 0x0CB3 pulse code: 0xC6 | Address: 0x0CE6 pulse code: 0x99 | Address: 0x0D19 pulse code: 0 |
| Address: 0x0CB4 pulse code: 0xC8 | Address: 0x0CE7 pulse code: 0x9D | Address: 0x0D1A pulse code: 0 |
| Address: 0x0CB5 pulse code: 0xCA | Address: 0x0CE8 pulse code: 0xA1 | Address: 0x0D1B pulse code: 0 |
| Address: 0x0CB6 pulse code: 0xCC | Address: 0x0CE9 pulse code: 0xA5 | Address: 0x0D1C pulse code: 0 |
| Address: 0x0CB7 pulse code: 0xCE | Address: 0x0CEA pulse code: 0xAA | Address: 0x0D1D pulse code: 0 |
| Address: 0x0CB8 pulse code: 0xD0 | Address: 0x0CEB pulse code: 0xAE | Address: 0x0D1E pulse code: 0 |
| Address: 0x0CB9 pulse code: 0xD2 | Address: 0x0CEC pulse code: 0xB2 | Address: 0x0D1F pulse code: 0 |
| Address: 0x0CBA pulse code: 0xD5 | Address: 0x0CED pulse code: 0xB6 | Address: 0x0D20 pulse code: 0 |
| Address: 0x0CBB pulse code: 0xD7 | Address: 0x0CEE pulse code: 0xBA | Address: 0x0D21 pulse code: 0 |
| Address: 0x0CBC pulse code: 0xD9 | Address: 0x0CEF pulse code: 0xC0 | Address: 0x0D22 pulse code: 0 |
| Address: 0x0CBD pulse code: 0xDB | Address: 0x0CF0 pulse code: 0x80 | Address: 0x0D23 pulse code: 0 |
| Address: 0x0CBE pulse code: 0xDD | Address: 0x0CF1 pulse code: 0x84 | Address: 0x0D24 pulse code: 0 |
| Address: 0x0CBF pulse code: 0xC0 | Address: 0x0CF2 pulse code: 0x88 | Address: 0x0D25 pulse code: 0 |
| Address: 0x0CC0 pulse code: 0x80 | Address: 0x0CF3 pulse code: 0x8C | Address: 0x0D26 pulse code: 0 |
| Address: 0x0CC1 pulse code: 0x84 | Address: 0x0CF4 pulse code: 0x90 | Address: 0x0D27 pulse code: 0 |
| Address: 0x0CC2 pulse code: 0x88 | Address: 0x0CF5 pulse code: 0x95 | Address: 0x0D28 pulse code: 0 |
| Address: 0x0CC3 pulse code: 0x8C | Address: 0x0CF6 pulse code: 0x99 | Address: 0x0D29 pulse code: 0 |
| Address: 0x0CC4 pulse code: 0x90 | Address: 0x0CF7 pulse code: 0x9D | Address: 0x0D2A pulse code: 0 |
| Address: 0x0CC5 pulse code: 0x95 | Address: 0x0CF8 pulse code: 0xA1 | Address: 0x0D2B pulse code: 0 |
| Address: 0x0CC6 pulse code: 0x99 | Address: 0x0CF9 pulse code: 0xA5 | Address: 0x0D2C pulse code: 0 |
| Address: 0x0CC7 pulse code: 0x9D | Address: 0x0CFA pulse code: 0xAA | Address: 0x0D2D pulse code: 0 |
| Address: 0x0CC8 pulse code: 0xA1 | Address: 0x0CFB pulse code: 0xAE | Address: 0x0D2E pulse code: 0 |
| Address: 0x0CC9 pulse code: 0xA5 | Address: 0x0CFC pulse code: 0xB2 | Address: 0x0D2F pulse code: 0 |
| | | Address: 0x0D30 pulse code: 0 |
| | | Address: 0x0D31 pulse code: 0 |
| | | Address: 0x0D32 pulse code: 0 |

| Address: 0x0D33 | pulse code: 0x4C | Address: 0x0D69 | pulse code: 0x65 | Address: 0x0D9F | pulse code: ( |
|---|---|---|---|---|---|
| Address: 0x0D34 | pulse code: 0x50 | Address: 0x0D6A | pulse code: 0x6A | Address: 0x0DA0 | pulse code: |
| Address: 0x0D35 | pulse code: 0x55 | Address: 0x0D6B | pulse code: 0x6E | Address: 0x0DA1 | pulse code: |
| Address: 0x0D36 | pulse code: 0x59 | Address: 0x0D6C | pulse code: 0x72 | Address: 0x0DA2 | pulse code: |
| Address: 0x0D37 | pulse code: 0x5D | Address: 0x0D6D | pulse code: 0x76 | Address: 0x0DA3 | pulse code: |
| Address: 0x0D38 | pulse code: 0x61 | Address: 0x0D6E | pulse code: 0x7A | Address: 0x0DA4 | pulse code: |
| Address: 0x0D39 | pulse code: 0x65 | Address: 0x0D6F | pulse code: 0xC0 | Address: 0x0DA5 | pulse code: |
| Address: 0x0D3A | pulse code: 0x6A | Address: 0x0D70 | pulse code: 0x40 | Address: 0x0DA6 | pulse code: |
| Address: 0x0D3B | pulse code: 0x6E | Address: 0x0D71 | pulse code: 0x44 | Address: 0x0DA7 | pulse code: |
| Address: 0x0D3C | pulse code: 0x72 | Address: 0x0D72 | pulse code: 0x48 | Address: 0x0DA8 | pulse code: |
| Address: 0x0D3D | pulse code: 0x76 | Address: 0x0D73 | pulse code: 0x4C | Address: 0x0DA9 | pulse code: |
| Address: 0x0D3E | pulse code: 0x7A | Address: 0x0D74 | pulse code: 0x50 | Address: 0x0DAA | pulse code: |
| Address: 0x0D3F | pulse code: 0xC0 | Address: 0x0D75 | pulse code: 0x55 | Address: 0x0DAB | pulse code: |
| Address: 0x0D40 | pulse code: 0x00 | Address: 0x0D76 | pulse code: 0x59 | Address: 0x0DAC | pulse code: |
| Address: 0x0D41 | pulse code: 0xC2 | Address: 0x0D77 | pulse code: 0x5D | Address: 0x0DAD | pulse code: |
| Address: 0x0D42 | pulse code: 0xC4 | Address: 0x0D78 | pulse code: 0x61 | Address: 0x0DAE | pulse code: |
| Address: 0x0D43 | pulse code: 0xC6 | Address: 0x0D79 | pulse code: 0x65 | Address: 0x0DAF | pulse code: |
| Address: 0x0D44 | pulse code: 0xC8 | Address: 0x0D7A | pulse code: 0x6A | Address: 0x0DB0 | pulse code: ( |
| Address: 0x0D45 | pulse code: 0xCA | Address: 0x0D7B | pulse code: 0x6E | Address: 0x0DB1 | pulse code: ( |
| Address: 0x0D46 | pulse code: 0xCC | Address: 0x0D7C | pulse code: 0x72 | Address: 0x0DB2 | pulse code: ( |
| Address: 0x0D47 | pulse code: 0xCE | Address: 0x0D7D | pulse code: 0x76 | Address: 0x0DB3 | pulse code: ( |
| Address: 0x0D48 | pulse code: 0xD0 | Address: 0x0D7E | pulse code: 0x7A | Address: 0x0DB4 | pulse code: ( |
| Address: 0x0D49 | pulse code: 0xD2 | Address: 0x0D7F | pulse code: 0xC0 | Address: 0x0DB5 | pulse code: ( |
| Address: 0x0D4A | pulse code: 0xD5 | Address: 0x0D80 | pulse code: 0x00 | Address: 0x0DB6 | pulse code: ( |
| Address: 0x0D4B | pulse code: 0xD7 | Address: 0x0D81 | pulse code: 0xC2 | Address: 0x0DB7 | pulse code: ( |
| Address: 0x0D4C | pulse code: 0xD9 | Address: 0x0D82 | pulse code: 0xC4 | Address: 0x0DB8 | pulse code: ( |
| Address: 0x0D4D | pulse code: 0xDB | Address: 0x0D83 | pulse code: 0xC6 | Address: 0x0DB9 | pulse code: ( |
| Address: 0x0D4E | pulse code: 0xDD | Address: 0x0D84 | pulse code: 0xC8 | Address: 0x0DBA | pulse code: |
| Address: 0x0D4F | pulse code: 0xC0 | Address: 0x0D85 | pulse code: 0xCA | Address: 0x0DBB | pulse code: |
| Address: 0x0D50 | pulse code: 0x00 | Address: 0x0D86 | pulse code: 0xCC | Address: 0x0DBC | pulse code: |
| Address: 0x0D51 | pulse code: 0xC2 | Address: 0x0D87 | pulse code: 0xCE | Address: 0x0DBD | pulse code: |
| Address: 0x0D52 | pulse code: 0xC4 | Address: 0x0D88 | pulse code: 0xD0 | Address: 0x0DBE | pulse code: |
| Address: 0x0D53 | pulse code: 0xC6 | Address: 0x0D89 | pulse code: 0xD2 | Address: 0x0DBF | pulse code: ( |
| Address: 0x0D54 | pulse code: 0xC8 | Address: 0x0D8A | pulse code: 0xD5 | Address: 0x0DC0 | pulse code: ( |
| Address: 0x0D55 | pulse code: 0xCA | Address: 0x0D8B | pulse code: 0xD7 | Address: 0x0DC1 | pulse code: ( |
| Address: 0x0D56 | pulse code: 0xCC | Address: 0x0D8C | pulse code: 0xD9 | Address: 0x0DC2 | pulse code: ( |
| Address: 0x0D57 | pulse code: 0xCE | Address: 0x0D8D | pulse code: 0xDB | Address: 0x0DC3 | pulse code: ( |
| Address: 0x0D58 | pulse code: 0xD0 | Address: 0x0D8E | pulse code: 0xDD | Address: 0x0DC4 | pulse code: ( |
| Address: 0x0D59 | pulse code: 0xD2 | Address: 0x0D8F | pulse code: 0xC0 | Address: 0x0DC5 | pulse code: ( |
| Address: 0x0D5A | pulse code: 0xD5 | Address: 0x0D90 | pulse code: 0x00 | Address: 0x0DC6 | pulse code: ( |
| Address: 0x0D5B | pulse code: 0xD7 | Address: 0x0D91 | pulse code: 0xC2 | Address: 0x0DC7 | pulse code: ( |
| Address: 0x0D5C | pulse code: 0xD9 | Address: 0x0D92 | pulse code: 0xC4 | Address: 0x0DC8 | pulse code: ( |
| Address: 0x0D5D | pulse code: 0xDB | Address: 0x0D93 | pulse code: 0xC6 | Address: 0x0DC9 | pulse code: ( |
| Address: 0x0D5E | pulse code: 0xDD | Address: 0x0D94 | pulse code: 0xC8 | Address: 0x0DCA | pulse code: 0xAA |
| Address: 0x0D5F | pulse code: 0xC0 | Address: 0x0D95 | pulse code: 0xCA | | |
| Address: 0x0D60 | pulse code: 0x40 | Address: 0x0D96 | pulse code: 0xCC | Address: 0x0DCB | pulse code: |
| Address: 0x0D61 | pulse code: 0x44 | Address: 0x0D97 | pulse code: 0xCE | Address: 0x0DCC | pulse code: |
| Address: 0x0D62 | pulse code: 0x48 | Address: 0x0D98 | pulse code: 0xD0 | Address: 0x0DCD | pulse code: |
| Address: 0x0D63 | pulse code: 0x4C | Address: 0x0D99 | pulse code: 0xD2 | Address: 0x0DCE | pulse code: ( |
| Address: 0x0D64 | pulse code: 0x50 | Address: 0x0D9A | pulse code: 0xD5 | Address: 0x0DCF | pulse code: ( |
| Address: 0x0D65 | pulse code: 0x55 | Address: 0x0D9B | pulse code: 0xD7 | Address: 0x0DD0 | pulse code: ( |
| Address: 0x0D66 | pulse code: 0x59 | Address: 0x0D9C | pulse code: 0xD9 | Address: 0x0DD1 | pulse code: ( |
| Address: 0x0D67 | pulse code: 0x5D | Address: 0x0D9D | pulse code: 0xDB | Address: 0x0DD2 | pulse code: ( |
| Address: 0x0D68 | pulse code: 0x61 | Address: 0x0D9E | pulse code: 0xDD | Address: 0x0DD3 | pulse code: ( |

| | | |
|---|---|---|
| Address: 0x0DD4 pulse code: 0x90 | Address: 0x0E05 pulse code: 0xCA | Address: 0x0E3B pulse code: 0xD7 |
| Address: 0x0DD5 pulse code: 0x95 | Address: 0x0E06 pulse code: 0xCC | Address: 0x0E3C pulse code: 0xD9 |
| Address: 0x0DD6 pulse code: 0x99 | Address: 0x0E07 pulse code: 0xCE | Address: 0x0E3D pulse code: 0xDB |
| Address: 0x0DD7 pulse code: 0x9D | Address: 0x0E08 pulse code: 0xD0 | Address: 0x0E3E pulse code: 0xDD |
| Address: 0x0DD8 pulse code: 0xA1 | Address: 0x0E09 pulse code: 0xD2 | Address: 0x0E3F pulse code: 0xC0 |
| Address: 0x0DD9 pulse code: 0xA5 | Address: 0x0E0A pulse code: 0xD5 | Address: 0x0E40 pulse code: 0x00 |
| Address: 0x0DDA pulse code: 0xAA | Address: 0x0E0B pulse code: 0xD7 | Address: 0x0E41 pulse code: 0xC2 |
| Address: 0x0DDB pulse code: 0xAE | Address: 0x0E0C pulse code: 0xD9 | Address: 0x0E42 pulse code: 0xC4 |
| Address: 0x0DDC pulse code: 0xB2 | Address: 0x0E0D pulse code: 0xDB | Address: 0x0E43 pulse code: 0xC6 |
| Address: 0x0DDD pulse code: 0xB6 | Address: 0x0E0E pulse code: 0xDD | Address: 0x0E44 pulse code: 0xC8 |
| Address: 0x0DDE pulse code: 0xBA | Address: 0x0E0F pulse code: 0xC0 | Address: 0x0E45 pulse code: 0xCA |
| Address: 0x0DDF pulse code: 0xC0 | Address: 0x0E10 pulse code: 0x00 | Address: 0x0E46 pulse code: 0xCC |
| Address: 0x0DE0 pulse code: 0x80 | Address: 0x0E11 pulse code: 0xC2 | Address: 0x0E47 pulse code: 0xCE |
| Address: 0x0DE1 pulse code: 0x84 | Address: 0x0E12 pulse code: 0xC4 | Address: 0x0E48 pulse code: 0xD0 |
| Address: 0x0DE2 pulse code: 0x88 | Address: 0x0E13 pulse code: 0xC6 | Address: 0x0E49 pulse code: 0xD2 |
| Address: 0x0DE3 pulse code: 0x8C | Address: 0x0E14 pulse code: 0xC8 | Address: 0x0E4A pulse code: 0xD5 |
| Address: 0x0DE4 pulse code: 0x90 | Address: 0x0E15 pulse code: 0xCA | Address: 0x0E4B pulse code: 0xD7 |
| Address: 0x0DE5 pulse code: 0x95 | Address: 0x0E16 pulse code: 0xCC | Address: 0x0E4C pulse code: 0xD9 |
| Address: 0x0DE6 pulse code: 0x99 | Address: 0x0E17 pulse code: 0xCE | Address: 0x0E4D pulse code: 0xDB |
| Address: 0x0DE7 pulse code: 0x9D | Address: 0x0E18 pulse code: 0xD0 | Address: 0x0E4E pulse code: 0xDD |
| Address: 0x0DE8 pulse code: 0xA1 | Address: 0x0E19 pulse code: 0xD2 | Address: 0x0E4F pulse code: 0xC0 |
| Address: 0x0DE9 pulse code: 0xA5 | Address: 0x0E1A pulse code: 0xD5 | Address: 0x0E50 pulse code: 0x00 |
| Address: 0x0DEA pulse code: 0xAA | Address: 0x0E1B pulse code: 0xD7 | Address: 0x0E51 pulse code: 0xC2 |
| Address: 0x0DEB pulse code: 0xAE | Address: 0x0E1C pulse code: 0xD9 | Address: 0x0E52 pulse code: 0xC4 |
| Address: 0x0DEC pulse code: 0xB2 | Address: 0x0E1D pulse code: 0xDB | Address: 0x0E53 pulse code: 0xC6 |
| Address: 0x0DED pulse code: 0xB6 | Address: 0x0E1E pulse code: 0xDD | Address: 0x0E54 pulse code: 0xC8 |
| Address: 0x0DEE pulse code: 0xBA | Address: 0x0E1F pulse code: 0xC0 | Address: 0x0E55 pulse code: 0xCA |
| Address: 0x0DEF pulse code: 0xC0 | Address: 0x0E20 pulse code: 0x00 | Address: 0x0E56 pulse code: 0xCC |
| Address: 0x0DF0 pulse code: 0x80 | Address: 0x0E21 pulse code: 0xC2 | Address: 0x0E57 pulse code: 0xCE |
| Address: 0x0DF1 pulse code: 0x84 | Address: 0x0E22 pulse code: 0xC4 | Address: 0x0E58 pulse code: 0xD0 |
| Address: 0x0DF2 pulse code: 0x88 | Address: 0x0E23 pulse code: 0xC6 | Address: 0x0E59 pulse code: 0xD2 |
| Address: 0x0DF3 pulse code: 0x8C | Address: 0x0E24 pulse code: 0xC8 | Address: 0x0E5A pulse code: 0xD5 |
| Address: 0x0DF4 pulse code: 0x90 | Address: 0x0E25 pulse code: 0xCA | Address: 0x0E5B pulse code: 0xD7 |
| Address: 0x0DF5 pulse code: 0x95 | Address: 0x0E26 pulse code: 0xCC | Address: 0x0E5C pulse code: 0xD9 |
| Address: 0x0DF6 pulse code: 0x99 | Address: 0x0E27 pulse code: 0xCE | Address: 0x0E5D pulse code: 0xDB |
| Address: 0x0DF7 pulse code: 0x9D | Address: 0x0E28 pulse code: 0xD0 | Address: 0x0E5E pulse code: 0xDD |
| Address: 0x0DF8 pulse code: 0xA1 | Address: 0x0E29 pulse code: 0xD2 | Address: 0x0E5F pulse code: 0xC0 |
| Address: 0x0DF9 pulse code: 0xA5 | Address: 0x0E2A pulse code: 0xD5 | Address: 0x0E60 pulse code: 0x00 |
| Address: 0x0DFA pulse code: 0xAA | Address: 0x0E2B pulse code: 0xD7 | Address: 0x0E61 pulse code: 0xC2 |
| Address: 0x0DFB pulse code: 0xAE | Address: 0x0E2C pulse code: 0xD9 | Address: 0x0E62 pulse code: 0xC4 |
| Address: 0x0DFC pulse code: 0xB2 | Address: 0x0E2D pulse code: 0xDB | Address: 0x0E63 pulse code: 0xC6 |
| Address: 0x0DFD pulse code: 0xB6 | Address: 0x0E2E pulse code: 0xDD | Address: 0x0E64 pulse code: 0xC8 |
| Address: 0x0DFE pulse code: 0xBA | Address: 0x0E2F pulse code: 0xC0 | Address: 0x0E65 pulse code: 0xCA |
| Address: 0x0DFF pulse code: 0xC0 | Address: 0x0E30 pulse code: 0x00 | Address: 0x0E66 pulse code: 0xCC |
| Address: 0x0E00 pulse code: 0x00 | Address: 0x0E31 pulse code: 0xC2 | Address: 0x0E67 pulse code: 0xCE |
| Address: 0x0E01 pulse code: 0xC2 | Address: 0x0E32 pulse code: 0xC4 | Address: 0x0E68 pulse code: 0xD0 |
| Address: 0x0E02 pulse code: 0xC4 | Address: 0x0E33 pulse code: 0xC6 | Address: 0x0E69 pulse code: 0xD2 |
| Address: 0x0E03 pulse code: 0xC6 | Address: 0x0E34 pulse code: 0xC8 | Address: 0x0E6A pulse code: 0xD5 |
| Address: 0x0E04 pulse code: 0xC8 | Address: 0x0E35 pulse code: 0xCA | Address: 0x0E6B pulse code: 0xD7 |
| | Address: 0x0E36 pulse code: 0xCC | Address: 0x0E6C pulse code: 0xD9 |
| | Address: 0x0E37 pulse code: 0xCE | Address: 0x0E6D pulse code: 0xDB |
| | Address: 0x0E38 pulse code: 0xD0 | Address: 0x0E6E pulse code: 0xDD |
| | Address: 0x0E39 pulse code: 0xD2 | Address: 0x0E6F pulse code: 0xC0 |
| | Address: 0x0E3A pulse code: 0xD5 | Address: 0x0E70 pulse code: 0x00 |

56

| Address: 0x0E71 | pulse code: 0x04 |
| Address: 0x0E72 | pulse code: 0x08 |
| Address: 0x0E73 | pulse code: 0x0C |
| Address: 0x0E74 | pulse code: 0x10 |
| Address: 0x0E75 | pulse code: 0x15 |
| Address: 0x0E76 | pulse code: 0x19 |
| Address: 0x0E77 | pulse code: 0x1D |
| Address: 0x0E78 | pulse code: 0x21 |
| Address: 0x0E79 | pulse code: 0x25 |
| Address: 0x0E7A | pulse code: 0x2A |
| Address: 0x0E7B | pulse code: 0x2E |
| Address: 0x0E7C | pulse code: 0x32 |
| Address: 0x0E7D | pulse code: 0x36 |
| Address: 0x0E7E | pulse code: 0x3A |
| Address: 0x0E7F | pulse code: 0xC0 |
| Address: 0x0E80 | pulse code: 0x00 |
| Address: 0x0E81 | pulse code: 0xC2 |
| Address: 0x0E82 | pulse code: 0xC4 |
| Address: 0x0E83 | pulse code: 0xC6 |
| Address: 0x0E84 | pulse code: 0xC8 |
| Address: 0x0E85 | pulse code: 0xCA |
| Address: 0x0E86 | pulse code: 0xCC |
| Address: 0x0E87 | pulse code: 0xCE |
| Address: 0x0E88 | pulse code: 0xD0 |
| Address: 0x0E89 | pulse code: 0xD2 |
| Address: 0x0E8A | pulse code: 0xD5 |
| Address: 0x0E8B | pulse code: 0xD7 |
| Address: 0x0E8C | pulse code: 0xD9 |
| Address: 0x0E8D | pulse code: 0xDB |
| Address: 0x0E8E | pulse code: 0xDD |
| Address: 0x0E8F | pulse code: 0xC0 |
| Address: 0x0E90 | pulse code: 0x00 |
| Address: 0x0E91 | pulse code: 0xC2 |
| Address: 0x0E92 | pulse code: 0xC4 |
| Address: 0x0E93 | pulse code: 0xC6 |
| Address: 0x0E94 | pulse code: 0xC8 |
| Address: 0x0E95 | pulse code: 0xCA |
| Address: 0x0E96 | pulse code: 0xCC |
| Address: 0x0E97 | pulse code: 0xCE |
| Address: 0x0E98 | pulse code: 0xD0 |
| Address: 0x0E99 | pulse code: 0xD2 |
| Address: 0x0E9A | pulse code: 0xD5 |
| Address: 0x0E9B | pulse code: 0xD7 |
| Address: 0x0E9C | pulse code: 0xD9 |
| Address: 0x0E9D | pulse code: 0xDB |
| Address: 0x0E9E | pulse code: 0xDD |
| Address: 0x0E9F | pulse code: 0xC0 |
| Address: 0x0EA0 | pulse code: 0x00 |
| Address: 0x0EA1 | pulse code: 0xC2 |
| Address: 0x0EA2 | pulse code: 0xC4 |
| Address: 0x0EA3 | pulse code: 0xC6 |
| Address: 0x0EA4 | pulse code: 0xC8 |
| Address: 0x0EA5 | pulse code: 0xCA |
| Address: 0x0EA6 | pulse code: 0xCC |
| Address: 0x0EA7 | pulse code: 0xCE |
| Address: 0x0EA8 | pulse code: 0xD0 |
| Address: 0x0EA9 | pulse code: 0xD2 |
| Address: 0x0EAA | pulse code: 0xD5 |
| Address: 0x0EAB | pulse code: 0xD7 |
| Address: 0x0EAC | pulse code: 0xD9 |
| Address: 0x0EAD | pulse code: 0xDB |
| Address: 0x0EAE | pulse code: 0xDD |
| Address: 0x0EAF | pulse code: 0xC0 |
| Address: 0x0EB0 | pulse code: 0x00 |
| Address: 0x0EB1 | pulse code: 0xC2 |
| Address: 0x0EB2 | pulse code: 0xC4 |
| Address: 0x0EB3 | pulse code: 0xC6 |
| Address: 0x0EB4 | pulse code: 0xC8 |
| Address: 0x0EB5 | pulse code: 0xCA |
| Address: 0x0EB6 | pulse code: 0xCC |
| Address: 0x0EB7 | pulse code: 0xCE |
| Address: 0x0EB8 | pulse code: 0xD0 |
| Address: 0x0EB9 | pulse code: 0xD2 |
| Address: 0x0EBA | pulse code: 0xD5 |
| Address: 0x0EBB | pulse code: 0xD7 |
| Address: 0x0EBC | pulse code: 0xD9 |
| Address: 0x0EBD | pulse code: 0xDB |
| Address: 0x0EBE | pulse code: 0xDD |
| Address: 0x0EBF | pulse code: 0xC0 |
| Address: 0x0EC0 | pulse code: 0x80 |
| Address: 0x0EC1 | pulse code: 0x84 |
| Address: 0x0EC2 | pulse code: 0x88 |
| Address: 0x0EC3 | pulse code: 0x8C |
| Address: 0x0EC4 | pulse code: 0x90 |
| Address: 0x0EC5 | pulse code: 0x95 |
| Address: 0x0EC6 | pulse code: 0x99 |
| Address: 0x0EC7 | pulse code: 0x9D |
| Address: 0x0EC8 | pulse code: 0xA1 |
| Address: 0x0EC9 | pulse code: 0xA5 |
| Address: 0x0ECA | pulse code: 0xAA |
| Address: 0x0ECB | pulse code: 0xAE |
| Address: 0x0ECC | pulse code: 0xB2 |
| Address: 0x0ECD | pulse code: 0xB6 |
| Address: 0x0ECE | pulse code: 0xBA |
| Address: 0x0ECF | pulse code: 0xC0 |
| Address: 0x0ED0 | pulse code: 0x80 |
| Address: 0x0ED1 | pulse code: 0x84 |
| Address: 0x0ED2 | pulse code: 0x88 |
| Address: 0x0ED3 | pulse code: 0x8C |
| Address: 0x0ED4 | pulse code: 0x90 |
| Address: 0x0ED5 | pulse code: 0x95 |
| Address: 0x0ED6 | pulse code: 0x99 |
| Address: 0x0ED7 | pulse code: 0x9D |
| Address: 0x0ED8 | pulse code: 0xA1 |
| Address: 0x0ED9 | pulse code: 0xA5 |
| Address: 0x0EDA | pulse code: 0xAA |
| Address: 0x0EDB | pulse code: 0xAE |
| Address: 0x0EDC | pulse code: 0xB2 |
| Address: 0x0EDD | pulse code: 0xB6 |
| Address: 0x0EDE | pulse code: 0xBA |
| Address: 0x0EDF | pulse code: 0xC0 |
| Address: 0x0EE0 | pulse code: 0x80 |
| Address: 0x0EE1 | pulse code: 0x84 |
| Address: 0x0EE2 | pulse code: 0x88 |
| Address: 0x0EE3 | pulse code: 0x8C |
| Address: 0x0EE4 | pulse code: 0x90 |
| Address: 0x0EE5 | pulse code: 0x95 |
| Address: 0x0EE6 | pulse code: 0x99 |
| Address: 0x0EE7 | pulse code: 0x9D |
| Address: 0x0EE8 | pulse code: 0xA1 |
| Address: 0x0EE9 | pulse code: 0xA5 |
| Address: 0x0EEA | pulse code: 0xAA |
| Address: 0x0EEB | pulse code: 0xAE |
| Address: 0x0EEC | pulse code: 0xB2 |
| Address: 0x0EED | pulse code: 0xB6 |
| Address: 0x0EEE | pulse code: 0xBA |
| Address: 0x0EEF | pulse code: 0xC0 |
| Address: 0x0EF0 | pulse code: 0x80 |
| Address: 0x0EF1 | pulse code: 0x84 |
| Address: 0x0EF2 | pulse code: 0x88 |
| Address: 0x0EF3 | pulse code: 0x8C |
| Address: 0x0EF4 | pulse code: 0x90 |
| Address: 0x0EF5 | pulse code: 0x95 |
| Address: 0x0EF6 | pulse code: 0x99 |
| Address: 0x0EF7 | pulse code: 0x9D |
| Address: 0x0EF8 | pulse code: 0xA1 |
| Address: 0x0EF9 | pulse code: 0xA5 |
| Address: 0x0EFA | pulse code: 0xAA |
| Address: 0x0EFB | pulse code: 0xAE |
| Address: 0x0EFC | pulse code: 0xB2 |
| Address: 0x0EFD | pulse code: 0xB6 |
| Address: 0x0EFE | pulse code: 0xBA |
| Address: 0x0EFF | pulse code: 0xC0 |
| Address: 0x0F00 | pulse code: 0x00 |
| Address: 0x0F01 | pulse code: 0xC2 |
| Address: 0x0F02 | pulse code: 0xC4 |
| Address: 0x0F03 | pulse code: 0xC6 |
| Address: 0x0F04 | pulse code: 0xC8 |
| Address: 0x0F05 | pulse code: 0xCA |
| Address: 0x0F06 | pulse code: 0xCC |
| Address: 0x0F07 | pulse code: 0xCE |
| Address: 0x0F08 | pulse code: 0xD0 |
| Address: 0x0F09 | pulse code: 0xD2 |
| Address: 0x0F0A | pulse code: 0xD5 |
| Address: 0x0F0B | pulse code: 0xD7 |
| Address: 0x0F0C | pulse code: 0xD9 |
| Address: 0x0F0D | pulse code: 0xDB |
| Address: 0x0F0E | pulse code: 0xDD |

57

| | | |
|---|---|---|
| Address: 0x0F0F  pulse code: 0xC0 | Address: 0x0F45  pulse code: 0xCA | Address: 0x0F7B  pulse code: 0x6E |
| Address: 0x0F10  pulse code: 0x00 | Address: 0x0F46  pulse code: 0xCC | Address: 0x0F7C  pulse code: 0x72 |
| Address: 0x0F11  pulse code: 0xC2 | Address: 0x0F47  pulse code: 0xCE | Address: 0x0F7D  pulse code: 0x76 |
| Address: 0x0F12  pulse code: 0xC4 | Address: 0x0F48  pulse code: 0xD0 | Address: 0x0F7E  pulse code: 0x7A |
| Address: 0x0F13  pulse code: 0xC6 | Address: 0x0F49  pulse code: 0xD2 | Address: 0x0F7F  pulse code: 0xC0 |
| Address: 0x0F14  pulse code: 0xC8 | Address: 0x0F4A  pulse code: 0xD5 | Address: 0x0F80  pulse code: 0x00 |
| Address: 0x0F15  pulse code: 0xCA | Address: 0x0F4B  pulse code: 0xD7 | Address: 0x0F81  pulse code: 0xC2 |
| Address: 0x0F16  pulse code: 0xCC | Address: 0x0F4C  pulse code: 0xD9 | Address: 0x0F82  pulse code: 0xC4 |
| Address: 0x0F17  pulse code: 0xCE | Address: 0x0F4D  pulse code: 0xDB | Address: 0x0F83  pulse code: 0xC6 |
| Address: 0x0F18  pulse code: 0xD0 | Address: 0x0F4E  pulse code: 0xDD | Address: 0x0F84  pulse code: 0xC8 |
| Address: 0x0F19  pulse code: 0xD2 | Address: 0x0F4F  pulse code: 0xC0 | Address: 0x0F85  pulse code: 0xCA |
| Address: 0x0F1A  pulse code: 0xD5 | Address: 0x0F50  pulse code: 0x00 | Address: 0x0F86  pulse code: 0xCC |
| Address: 0x0F1B  pulse code: 0xD7 | Address: 0x0F51  pulse code: 0xC2 | Address: 0x0F87  pulse code: 0xCE |
| Address: 0x0F1C  pulse code: 0xD9 | Address: 0x0F52  pulse code: 0xC4 | Address: 0x0F88  pulse code: 0xD0 |
| Address: 0x0F1D  pulse code: 0xDB | Address: 0x0F53  pulse code: 0xC6 | Address: 0x0F89  pulse code: 0xD2 |
| Address: 0x0F1E  pulse code: 0xDD | Address: 0x0F54  pulse code: 0xC8 | Address: 0x0F8A  pulse code: 0xD5 |
| Address: 0x0F1F  pulse code: 0xC0 | Address: 0x0F55  pulse code: 0xCA | Address: 0x0F8B  pulse code: 0xD7 |
| Address: 0x0F20  pulse code: 0x40 | Address: 0x0F56  pulse code: 0xCC | Address: 0x0F8C  pulse code: 0xD9 |
| Address: 0x0F21  pulse code: 0x44 | Address: 0x0F57  pulse code: 0xCE | Address: 0x0F8D  pulse code: 0xDB |
| Address: 0x0F22  pulse code: 0x48 | Address: 0x0F58  pulse code: 0xD0 | Address: 0x0F8E  pulse code: 0xDD |
| Address: 0x0F23  pulse code: 0x4C | Address: 0x0F59  pulse code: 0xD2 | Address: 0x0F8F  pulse code: 0xC0 |
| Address: 0x0F24  pulse code: 0x50 | Address: 0x0F5A  pulse code: 0xD5 | Address: 0x0F90  pulse code: 0x00 |
| Address: 0x0F25  pulse code: 0x55 | Address: 0x0F5B  pulse code: 0xD7 | Address: 0x0F91  pulse code: 0xC2 |
| Address: 0x0F26  pulse code: 0x59 | Address: 0x0F5C  pulse code: 0xD9 | Address: 0x0F92  pulse code: 0xC4 |
| Address: 0x0F27  pulse code: 0x5D | Address: 0x0F5D  pulse code: 0xDB | Address: 0x0F93  pulse code: 0xC6 |
| Address: 0x0F28  pulse code: 0x61 | Address: 0x0F5E  pulse code: 0xDD | Address: 0x0F94  pulse code: 0xC8 |
| Address: 0x0F29  pulse code: 0x65 | Address: 0x0F5F  pulse code: 0xC0 | Address: 0x0F95  pulse code: 0xCA |
| Address: 0x0F2A  pulse code: 0x6A | Address: 0x0F60  pulse code: 0x40 | Address: 0x0F96  pulse code: 0xCC |
| Address: 0x0F2B  pulse code: 0x6E | Address: 0x0F61  pulse code: 0x44 | Address: 0x0F97  pulse code: 0xCE |
| Address: 0x0F2C  pulse code: 0x72 | Address: 0x0F62  pulse code: 0x48 | Address: 0x0F98  pulse code: 0xD0 |
| Address: 0x0F2D  pulse code: 0x76 | Address: 0x0F63  pulse code: 0x4C | Address: 0x0F99  pulse code: 0xD2 |
| Address: 0x0F2E  pulse code: 0x7A | Address: 0x0F64  pulse code: 0x50 | Address: 0x0F9A  pulse code: 0xD5 |
| Address: 0x0F2F  pulse code: 0xC0 | Address: 0x0F65  pulse code: 0x55 | Address: 0x0F9B  pulse code: 0xD7 |
| Address: 0x0F30  pulse code: 0x40 | Address: 0x0F66  pulse code: 0x59 | Address: 0x0F9C  pulse code: 0xD9 |
| Address: 0x0F31  pulse code: 0x44 | Address: 0x0F67  pulse code: 0x5D | Address: 0x0F9D  pulse code: 0xDB |
| Address: 0x0F32  pulse code: 0x48 | Address: 0x0F68  pulse code: 0x61 | Address: 0x0F9E  pulse code: 0xDD |
| Address: 0x0F33  pulse code: 0x4C | Address: 0x0F69  pulse code: 0x65 | Address: 0x0F9F  pulse code: 0xC0 |
| Address: 0x0F34  pulse code: 0x50 | Address: 0x0F6A  pulse code: 0x6A | Address: 0x0FA0  pulse code: 0x40 |
| Address: 0x0F35  pulse code: 0x55 | Address: 0x0F6B  pulse code: 0x6E | Address: 0x0FA1  pulse code: 0x44 |
| Address: 0x0F36  pulse code: 0x59 | Address: 0x0F6C  pulse code: 0x72 | Address: 0x0FA2  pulse code: 0x48 |
| Address: 0x0F37  pulse code: 0x5D | Address: 0x0F6D  pulse code: 0x76 | Address: 0x0FA3  pulse code: 0x4C |
| Address: 0x0F38  pulse code: 0x61 | Address: 0x0F6E  pulse code: 0x7A | Address: 0x0FA4  pulse code: 0x50 |
| Address: 0x0F39  pulse code: 0x65 | Address: 0x0F6F  pulse code: 0xC0 | Address: 0x0FA5  pulse code: 0x55 |
| Address: 0x0F3A  pulse code: 0x6A | Address: 0x0F70  pulse code: 0x40 | Address: 0x0FA6  pulse code: 0x59 |
| Address: 0x0F3B  pulse code: 0x6E | Address: 0x0F71  pulse code: 0x44 | Address: 0x0FA7  pulse code: 0x5D |
| Address: 0x0F3C  pulse code: 0x72 | Address: 0x0F72  pulse code: 0x48 | Address: 0x0FA8  pulse code: 0x61 |
| Address: 0x0F3D  pulse code: 0x76 | Address: 0x0F73  pulse code: 0x4C | Address: 0x0FA9  pulse code: 0x65 |
| Address: 0x0F3E  pulse code: 0x7A | Address: 0x0F74  pulse code: 0x50 | Address: 0x0FAA  pulse code: 0x6A |
| Address: 0x0F3F  pulse code: 0xC0 | Address: 0x0F75  pulse code: 0x55 | Address: 0x0FAB  pulse code: 0x6E |
| Address: 0x0F40  pulse code: 0x00 | Address: 0x0F76  pulse code: 0x59 | Address: 0x0FAC  pulse code: 0x72 |
| Address: 0x0F41  pulse code: 0xC2 | Address: 0x0F77  pulse code: 0x5D | Address: 0x0FAD  pulse code: 0x76 |
| Address: 0x0F42  pulse code: 0xC4 | Address: 0x0F78  pulse code: 0x61 | Address: 0x0FAE  pulse code: 0x7A |
| Address: 0x0F43  pulse code: 0xC6 | Address: 0x0F79  pulse code: 0x65 | Address: 0x0FAF  pulse code: 0xC0 |
| Address: 0x0F44  pulse code: 0xC8 | Address: 0x0F7A  pulse code: 0x6A | Address: 0x0FB0  pulse code: 0x40 |

58

| | | | |
|---|---|---|---|
| Address: 0x0FB1 | pulse code: 0x44 | Address: 0x0FE7 | pulse code: 0x9D |
| Address: 0x0FB2 | pulse code: 0x48 | Address: 0x0FE8 | pulse code: 0xA1 |
| Address: 0x0FB3 | pulse code: 0x4C | Address: 0x0FE9 | pulse code: 0xA5 |
| Address: 0x0FB4 | pulse code: 0x50 | Address: 0x0FEA | pulse code: 0xAA |
| Address: 0x0FB5 | pulse code: 0x55 | Address: 0x0FEB | pulse code: 0xAE |
| Address: 0x0FB6 | pulse code: 0x59 | Address: 0x0FEC | pulse code: 0xB2 |
| Address: 0x0FB7 | pulse code: 0x5D | Address: 0x0FED | pulse code: 0xB6 |
| Address: 0x0FB8 | pulse code: 0x61 | Address: 0x0FEE | pulse code: 0xBA |
| Address: 0x0FB9 | pulse code: 0x65 | Address: 0x0FEF | pulse code: 0xC0 |
| Address: 0x0FBA | pulse code: 0x6A | Address: 0x0FF0 | pulse code: 0x80 |
| Address: 0x0FBB | pulse code: 0x6E | Address: 0x0FF1 | pulse code: 0x84 |
| Address: 0x0FBC | pulse code: 0x72 | Address: 0x0FF2 | pulse code: 0x88 |
| Address: 0x0FBD | pulse code: 0x76 | Address: 0x0FF3 | pulse code: 0x8C |
| Address: 0x0FBE | pulse code: 0x7A | Address: 0x0FF4 | pulse code: 0x90 |
| Address: 0x0FBF | pulse code: 0xC0 | Address: 0x0FF5 | pulse code: 0x95 |
| Address: 0x0FC0 | pulse code: 0x80 | Address: 0x0FF6 | pulse code: 0x99 |
| Address: 0x0FC1 | pulse code: 0x84 | Address: 0x0FF7 | pulse code: 0x9D |
| Address: 0x0FC2 | pulse code: 0x88 | Address: 0x0FF8 | pulse code: 0xA1 |
| Address: 0x0FC3 | pulse code: 0x8C | Address: 0x0FF9 | pulse code: 0xA5 |
| Address: 0x0FC4 | pulse code: 0x90 | Address: 0x0FFA | pulse code: 0xAA |
| Address: 0x0FC5 | pulse code: 0x95 | Address: 0x0FFB | pulse code: 0xAE |
| Address: 0x0FC6 | pulse code: 0x99 | Address: 0x0FFC | pulse code: 0xB2 |
| Address: 0x0FC7 | pulse code: 0x9D | Address: 0x0FFD | pulse code: 0xB6 |
| Address: 0x0FC8 | pulse code: 0xA1 | Address: 0x0FFE | pulse code: 0xBA |
| Address: 0x0FC9 | pulse code: 0xA5 | Address: 0x0FFF | pulse code: 0xC0 |
| Address: 0x0FCA | pulse code: 0xAA | | |
| Address: 0x0FCB | pulse code: 0xAE | | |
| Address: 0x0FCC | pulse code: 0xB2 | | |
| Address: 0x0FCD | pulse code: 0xB6 | | |
| Address: 0x0FCE | pulse code: 0xBA | | |
| Address: 0x0FCF | pulse code: 0xC0 | | |
| Address: 0x0FD0 | pulse code: 0x80 | | |
| Address: 0x0FD1 | pulse code: 0x84 | | |
| Address: 0x0FD2 | pulse code: 0x88 | | |
| Address: 0x0FD3 | pulse code: 0x8C | | |
| Address: 0x0FD4 | pulse code: 0x90 | | |
| Address: 0x0FD5 | pulse code: 0x95 | | |
| Address: 0x0FD6 | pulse code: 0x99 | | |
| Address: 0x0FD7 | pulse code: 0x9D | | |
| Address: 0x0FD8 | pulse code: 0xA1 | | |
| Address: 0x0FD9 | pulse code: 0xA5 | | |
| Address: 0x0FDA | pulse code:0xAA | | |
| Address: 0x0FDB | pulse code: 0xAE | | |
| Address: 0x0FDC | pulse code: 0xB2 | | |
| Address: 0x0FDD | pulse code: 0xB6 | | |
| Address: 0x0FDE | pulse code: 0xBA | | |
| Address: 0x0FDF | pulse code: 0xC0 | | |
| Address: 0x0FE0 | pulse code: 0x80 | | |
| Address: 0x0FE1 | pulse code: 0x84 | | |
| Address: 0x0FE2 | pulse code: 0x88 | | |
| Address: 0x0FE3 | pulse code: 0x8C | | |
| Address: 0x0FE4 | pulse code: 0x90 | | |
| Address: 0x0FE5 | pulse code: 0x95 | | |
| Address: 0x0FE6 | pulse code: 0x99 | | |

I claim:

1. A system for producing graphic features on paper, said features encoded as an array of pixels, each having an associated value, comprising:

a marking engine for producing marks on said paper in a plurality of pixel locations in response to energizing pulses, each of said pixel locations being disposed on an associated scan line;

a memory storing a gray level value for each pixel in the array as a plurality of binary bits;

a feature detection circuit comprising electronic means for accessing a plurality of said pixel values in a feature detection window and for providing said plurality of pixel values as output;

a detection circuit comprising decoding logic receiving said plurality of pixel values in said feature detection window and responsively providing an address indication;

a look-up table providing one of a plurality of stored pulse code values as output in response to said address indication; and a pulse generator receiving said pulse code output value and responsively providing an energizing pulse pattern to said marking engine;

said feature detection window accessing a first pixel value on a first scan line, a plurality of pixels adjacent said first pixel on said first scan line, and a plurality of pixels adjacent said first pixel on a plurality of scan lines adjacent said first scan line;

said energizing pulse pattern being provided within a pixel period and having a duration and position based on a feature pattern detected in said feature detection window;

said duration ranging from a fraction of said pixel period to said full pixel period;

said position corresponding to one of (1) the beginning of said pixel period; (2) the end of said pixel period; (3) the center of said pixel period; (4) the beginning and end of said pixel period; and said marks being responsively produced by said marking engine in patterns adapted for near-optimal simulation of graphic features including (1) highlights, (2) midtones, (3) shadows, and (4) edges, thereby enhancing the quality of a simulated image produced by said marking engine.

2. A system for enhancing graphic features produced by a marking engine, wherein graphic data is available from a multi-bit per pixel raster source having a resolution equivalent to a native resolution of said marking engine, comprising:

a pulse generator providing an energization pulse for a current pixel in a current pixel period to an energizing element of said marking engine in response to a pulse code indication;

a table containing a plurality of pulse code values optimized to enhance graphic features produced by said marking engine; and a feature detection circuit decoding multi-bit value patterns for each of a plurality of pixels in said raster source and responsively indexing a pulse code value in said table to be provided to said pulse generator as said pulse code indication;

said feature detection circuit detecting one of a plurality of graphic features by detecting one of a plurality of value patterns in at least four pixels adjacent said current pixel and responsively indexing a corresponding graphic feature sub-table in said table containing a plurality of pulse code values optimized to enhance said detected graphic feature produced by said marking engine.

3. The system of claim 2 in which said feature detection circuit further decodes said current pixel value and responsively indexes a pulse code value from within said indexed sub-table.

4. The system of claim 2, in which said pulse code values are optimized by:

dividing said pixel period into a predetermined number of intervals n;

providing energization pulses to occur in at least one of a plurality of positions in said pixel period;

encoding a plurality of pulse codes for producing energization pulses in a pixel period, said pulses ranging in duration from one interval to n intervals incrementally in each of said plurality of positions;

providing each of said plurality of pulse codes to said pulse generator as said pulse code indication in predetermined sequence causing said marking engine to produce a plurality of graphic features in corresponding predetermined regions;

selecting a subset of said plurality of pulse codes corresponding to the best production of each of said plurality of graphic features; and providing said subset of pulse codes in a corresponding graphic feature sub-table.

5. A system for enhancing graphic features produced by a marking engine, wherein graphic data is available from a multi-bit per pixel raster source having a resolution equivalent to a native resolution of said marking engine, comprising;

a pulse generator providing an energization pulse for a current pixel in a current pixel period to an energizing element of said marking engine in response to a pulse code indication;

a table containing a plurality of pulse code values optimized to enhance graphic features produced by said marking engine; and a feature detection circuit decoding multi-bit value patterns for each of a plurality of pixels in said raster source and responsively indexing a pulse code value in said table to be provided to said pulse generator as said pulse code indication;

each pulse code value encoding a predetermined duration for said energization pulse and at least one predetermined position of said energization pulse disposed within said current pixel period.

6. A system for enhancing graphic features produced by a marking engine, wherein graphic data is available from a multi-bit per pixel raster source having a resolution equivalent to a native resolution of said marking engine, comprising:

a pulse generator providing an energization pulse for a current pixel in a current pixel period to an energizing element of said marking engine in response to a pulse code indication;

a table containing a plurality of pulse code values optimized to enhance graphic features produced by said marking engine; and a feature detection circuit decoding multi-bit value patterns for each of a plurality of pixels in said raster source and responsively indexing a pulse code value in said table to be provided to said pulse generator as said pulse code indication;

said feature detection circuit detecting graphic features comprising highlight features and shadow features by detecting, respectively, one of a first and second threshold values in each of said plurality of pixels adjacent said current pixel and responsively indexing a respective sub-table in said table comprising one of (1) a plurality of pulse code values optimized to enhance highlight features produced by said marking engine, and (2) a plurality of pulse code values optimized to enhance shadow features produced by said marking engine.

7. A system for enhancing graphic features produced by a marking engine, wherein graphic data is available from a multi-bit per pixel raster source having a resolution equivalent to a native resolution of said marking engine, comprising:

a pulse generator providing an energization pulse for a current pixel in a current pixel period to an energizing element of said marking engine in response to a pulse code indication;

a table containing a plurality of pulse code values optimized to enhance graphic features produced by said marking engine; and a feature detection circuit decoding multi-bit value patterns for each of a plurality of pixels in said raster source and responsively indexing a pulse code value in said table to be provided to said pulse generator as said pulse code indication;

said feature detection circuit detecting graphic features including right and left edges by comparing multi-bit values of said plurality of pixels adjacent said current pixel and responsively indexing a respective sub-table in said table comprising one of (1) a plurality of pulse code values optimized to enhance right edge features produced by said marking engine, and (2) a plurality of pulse code values optimized to enhance left edge features produced by said marking engine.

8. A system for enhancing graphic features produced by a marking engine, wherein graphic data is available from a multi-bit per pixel raster source having a resolution equivalent to a native resolution of said marking engine, comprising:

a pulse generator providing an energization pulse for a current pixel in a current pixel period to an energizing element of said marking engine in response to a pulse code indication;

a table containing a plurality of pulse code values optimized to enhance graphic features produced by said marking engine; and a feature detection circuit decoding multi-bit value patterns for each of a plurality of pixels in said raster source and responsively indexing a pulse code value in said table to be provided to said pulse generator as said pulse code indication;

said table comprising a memory storing said plurality of pulse code values in a plurality of storage locations and providing one of said stored values as said pulse code indication in response to an address input; and said feature detection circuit comprising combinatorial logic receiving multi-bit values for a plurality of pixels in said raster source and responsively providing said address input;

wherein one of a plurality of graphic features is detected from predetermined value patterns in said plurality of pixels and a corresponding pulse code value is indexed in said table causing said pulse generator to provide an optimized energization pulse in said corresponding pixel period, such that said marking engine produces an enhanced graphic feature.

9. A system for producing graphic features on paper, said features encoded as an array of pixels, each having an associated value, comprising:

a marking engine for producing marks on said paper in a plurality of pixel locations in response to driving pulses, each of said pixel locations being located on an associated scan line;

a memory buffer storing a value for each pixel in said array as a plurality of binary bits;

a transformation circuit receiving and determining the value of a first pixel and the value of at least one pixel adjacent said first pixel and responsively providing a pulse code output; and a pulse generator receiving said pulse code output and responsively providing said driving pulses as output to said marking engine;

wherein said transformation circuit further receives and determines a plurality of values in a feature detection window corresponding to a plurality of pixels adjacent said first pixel on a same scan line and on adjacent scan lines, respectively, and responsively provides a pulse code output corresponding to the value pattern detected in said window;

wherein said driving pulses comprise pulse patterns which range in duration from a fraction of a pixel period to a full pixel period and are positioned within said pixel period responsively to said value pattern in said feature detection window;

wherein said pulse patterns are positioned at a location in said pixel period corresponding to one of (1) the beginning of said pixel period; (2) the center of said pixel period; (3) the end of said pixel period; (4) both the beginning and end of said pixel period; and said marks are responsively produced by said marking engine in patterns adapted to optimally simulate graphic features including (1) edges, (2) highlights, and (3) shadows, thereby enhancing the quality of a simulated gray image produced by said marking engine.

10. The system of claim 9, wherein said marking engine produces a charge region on said paper in each of said pixel locations in response to driving pulses during a corresponding pixel period;

said pulse generator provides pulse patterns in said pixel periods based on a value of said pulse code output;

said pulse patterns produce charge regions on said paper having predetermined charge densities; and said marks are produced in a plurality of sizes and locations corresponding to regions of said paper where a predetermined charge density is exceeded.

11. The system of claim 9, wherein said transformation circuit further comprises a look-up table in a memory device.

12. The system of claim 11, wherein said transformation circuit further includes selection logic receiving and decoding said values and responsively providing an address output; and said memory device receives said address output and responsively provides said pulse code output.

13. A method of enhancing graphic features produced by a marking engine, said graphic features encoded as a plurality of pixels, each having an assigned value selected from a predetermined value range, said marking engine generating marks by energizing pixel locations disposed on scan lines in response to driving pulses in corresponding pixel periods, comprising the steps of:

(a) determining the value of a current pixel;

(b) detecting a predetermined value of at least one pixel adjacent said current pixel; and (c) responsively generating a driving pulse in a corresponding pixel period, said pulse having a predetermined duration and position within said pixel period corresponding to the value determined in step (a) and at least one value detected at step (b);

wherein said marking engine responsively produces marks in a plurality of shapes and sizes enhancing the production of graphic features detected at steps (a) and (b).

14. The method of claim 13, in which step (b) comprises:

detecting at least one predetermined value for a plurality of pixels in a feature detection window;

said window comprising a plurality of pixels adjacent said current pixel on a same scan line and on adjacent scan lines, respectively.

15. The method of claim 14, in which step (c) further comprises the steps of:

(d) providing said predetermined pulse duration to be a fractional value of said pixel period duration; and (e) generating a pulse of said predetermined duration at one of the following locations of said pixel period;
 (1) at the beginning of said pixel period;
 (2) at the end of said pixel period;
 (3) at the center of said pixel period;
 (4) at the beginning and end of said pixel period.

16. The method of claim 15, in which step (b) further comprises the steps of:

(a) comparing the values of a first pixel and a second pixel disposed adjacent said current pixel on said same scan line;

(b) detecting whether said values of said first and second pixel are equivalent to at least one threshold value;

(c) detecting whether the values of a third pixel and a fourth pixel are equivalent to at least one threshold value, said third and fourth pixels disposed adjacent said current pixel on adjacent scan lines, respectively; and (d) responsively generating a pulse selection indication; and in which step (c) further comprises:
 (1) generating said driving pulse in response to said pulse selection indication.

17. The method of claim 16, in which steps (a), (b) and (c) detect one of a plurality of graphic feature contexts for said current pixel such as highlight, shadow and edge conditions.

18. The method of claim 17, in which step (c) further comprises the steps of:

(a) providing said predetermined pulse duration to be a fractional value of said pixel period duration; and (b) generating a pulse of said predetermined duration at one of the following locations of said pixel period;
 (1) at the beginning of said pixel period when a first edge condition is detected;
 (2) at the end of said pixel period when a second edge condition is detected;
 (3) at the center of said pixel period when a highlight condition is detected;
 (4) at the beginning and end of said pixel period when a shadow condition is detected.

19. The method of claim 18, in which:

said pulse selection indication indexes a plurality of pulse code values contained in a table;

said pulse code values encoding position and duration information for said driving pulses;

said driving pulses being generated in response to said pulse code values; and said table of pulse code values being optimized to enhance graphic features produced by said marking engine.

* * * * *